US010487520B2

(12) United States Patent
Ciuperca

(10) Patent No.: US 10,487,520 B2
(45) Date of Patent: Nov. 26, 2019

(54) INSULATED CONCRETE SLIP FORM AND METHOD OF ACCELERATING CONCRETE CURING USING SAME

(71) Applicant: Romeo Ilarian Ciuperca, Atlanta, GA (US)

(72) Inventor: Romeo Ilarian Ciuperca, Atlanta, GA (US)

( * ) Notice: Subject to any disclaimer, the term of this patent is extended or adjusted under 35 U.S.C. 154(b) by 225 days.

(21) Appl. No.: 15/709,109

(22) Filed: Sep. 19, 2017

(65) Prior Publication Data

US 2018/0009712 A1    Jan. 11, 2018

Related U.S. Application Data

(63) Continuation of application No. 14/480,948, filed on Sep. 9, 2014, now Pat. No. 9,776,920.
(Continued)

(51) Int. Cl.
*E04G 9/10* (2006.01)
*B28B 7/34* (2006.01)
(Continued)

(52) U.S. Cl.
CPC ............... *E04G 9/10* (2013.01); *B28B 7/02* (2013.01); *B28B 7/22* (2013.01); *B28B 7/263* (2013.01); *B28B 7/348* (2013.01); *B28B 7/36* (2013.01); *B28B 7/364* (2013.01); *C04B 7/02* (2013.01); *C04B 7/14* (2013.01); *C04B 7/26* (2013.01); *C04B 28/021* (2013.01); *C04B 28/04* (2013.01); *C04B 28/08* (2013.01); *C04B 40/02* (2013.01); *E04G 9/02* (2013.01); *E04G 11/20* (2013.01);
(Continued)

(58) Field of Classification Search
None
See application file for complete search history.

(56) References Cited

U.S. PATENT DOCUMENTS 357,855   A   *   2/1887   Phillippi ............... A47G 27/065
                                                        16/14
2,053,135 A   *   9/1936   Dalton .................... E04C 2/423
                                                        14/73
(Continued)

FOREIGN PATENT DOCUMENTS

DE          20205592 U1      7/2002
EP           0315323         5/1989
(Continued)

OTHER PUBLICATIONS

U.S. Appl. No. 16/404,718, filed May 6, 2019, first named inventor: Ciuperca.
(Continued)

*Primary Examiner* — Benjamin A Schiffman
(74) *Attorney, Agent, or Firm* — Robert E. Richards; Richards IP Law

(57) ABSTRACT

The invention comprises a concrete form. The form comprises a first concrete forming panel having a first primary surface adapted for forming and contacting plastic concrete and a second primary surface opposite the first primary surface; a layer of insulating material contacting and substantially covering the second primary surface of the first concrete forming panel; and an insulating blanket adjacent the first concrete forming panel. A method of using the concrete form is also disclosed.

18 Claims, 14 Drawing Sheets

Related U.S. Application Data

(60) Provisional application No. 61/875,167, filed on Sep. 9, 2013.

(51) Int. Cl.

| | | |
|---|---|---|
| *C04B 28/08* | (2006.01) | |
| *C04B 7/02* | (2006.01) | |
| *C04B 28/02* | (2006.01) | |
| *C04B 40/02* | (2006.01) | |
| *C04B 7/14* | (2006.01) | |
| *C04B 7/26* | (2006.01) | |
| *C04B 28/04* | (2006.01) | |
| *B28B 7/26* | (2006.01) | |
| *B28B 7/02* | (2006.01) | |
| *B28B 7/22* | (2006.01) | |
| *B28B 7/36* | (2006.01) | |
| *E04G 11/20* | (2006.01) | |
| *E04G 9/02* | (2006.01) | |
| *E04G 11/22* | (2006.01) | |
| *E04G 13/02* | (2006.01) | |
| *E04G 21/06* | (2006.01) | |

(52) U.S. Cl.
CPC .............. *E04G 11/22* (2013.01); *E04G 13/02* (2013.01); *E04G 21/06* (2013.01); *C04B 2201/50* (2013.01); *E04G 2009/028* (2013.01)

(56) References Cited

U.S. PATENT DOCUMENTS

| | | | | |
|---|---|---|---|---|
| 2,057,732 A | | 10/1936 | Navarre | |
| 2,158,732 A | | 5/1939 | Shannon | |
| 2,307,348 A | | 1/1943 | Anderson | |
| 2,667,680 A | | 2/1954 | Sato | |
| 3,022,196 A | | 2/1962 | Jenkins et al. | |
| 3,144,701 A | | 8/1964 | Bowden | |
| 3,163,911 A | | 1/1965 | Kenney | |
| 3,199,828 A | * | 8/1965 | Newton | E04G 17/0721 249/191 |
| 3,418,776 A | | 6/1966 | Manderbach et al. | |
| 3,260,495 A | | 7/1966 | Buyken | |
| 3,381,929 A | | 5/1968 | Bancker | |
| 3,435,573 A | | 4/1969 | Krone | |
| 3,596,351 A | | 8/1971 | Tilton | |
| 3,649,725 A | * | 3/1972 | Olson | B28B 7/42 264/40.6 |
| 3,732,138 A | * | 5/1973 | Almog | E04C 2/205 428/114 |
| 3,847,340 A | | 11/1974 | Ficken et al. | |
| 3,892,516 A | * | 7/1975 | McGrew | B28B 7/243 425/443 |
| 3,905,574 A | | 9/1975 | Brauer | |
| 3,919,143 A | | 11/1975 | Morris | |
| 3,962,841 A | | 6/1976 | Carroll | |
| 3,985,329 A | * | 10/1976 | Liedgens | E04B 2/8647 249/40 |
| 3,996,713 A | | 12/1976 | Haeussler | |
| 4,052,031 A | | 10/1977 | Melfi | |
| 4,059,936 A | | 11/1977 | Lukens | |
| 4,085,495 A | * | 4/1978 | Hebert | E04G 11/12 249/191 |
| 4,090,336 A | * | 5/1978 | Carroll | E04D 13/1606 428/141 |
| 4,138,892 A | | 2/1979 | Davis | |
| 4,150,808 A | | 4/1979 | Sawyer | |
| 4,157,638 A | * | 6/1979 | Della-Donna | B32B 27/10 52/309.9 |
| 4,191,521 A | | 3/1980 | Muldery et al. | |
| 4,211,385 A | | 7/1980 | Johanson et al. | |
| 4,221,097 A | | 9/1980 | Dingler | |
| 4,283,896 A | | 8/1981 | Fricker et al. | |
| 4,334,394 A | | 6/1982 | Mader | |
| 4,349,398 A | * | 9/1982 | Kearns | E04D 7/00 156/280 |
| 4,351,873 A | | 9/1982 | Davis | |
| 4,370,840 A | * | 2/1983 | Bisbee | F27D 1/144 403/393 |
| 4,385,745 A | | 5/1983 | Bennett | |
| 4,394,529 A | | 7/1983 | Gounder | |
| 4,426,061 A | | 1/1984 | Taggart | |
| 4,462,949 A | * | 7/1984 | Fehlmann | B28B 7/08 249/137 |
| 4,489,121 A | | 12/1984 | Lukanuck | |
| 4,516,372 A | * | 5/1985 | Grutsch | E04B 2/8617 52/309.12 |
| 4,534,924 A | * | 8/1985 | Kariakin | E02D 31/00 249/120 |
| 4,553,729 A | | 11/1985 | Connors | |
| 4,585,685 A | | 4/1986 | Forry et al. | |
| 4,628,653 A | | 12/1986 | Nash | |
| 4,646,498 A | * | 3/1987 | Schneller | E04B 2/92 52/309.12 |
| 4,669,234 A | * | 6/1987 | Wilnau | E04B 2/8647 52/381 |
| 4,744,849 A | * | 5/1988 | Michaud-Soret | B29C 33/02 156/153 |
| 4,765,109 A | * | 8/1988 | Boeshart | E04B 2/8641 52/426 |
| 4,784,902 A | | 11/1988 | Crompton | |
| 4,811,927 A | * | 3/1989 | Slonimsky | E04G 9/02 249/191 |
| 4,829,733 A | | 5/1989 | Long | |
| 4,832,308 A | | 5/1989 | Slonimsky et al. | |
| 4,841,702 A | | 6/1989 | Huettemann | |
| 4,866,897 A | * | 9/1989 | Yount | B32B 29/02 52/363 |
| 4,885,888 A | * | 12/1989 | Young | E04B 1/86 52/426 |
| 4,889,310 A | * | 12/1989 | Boeshart | E04B 2/8641 249/41 |
| 4,907,386 A | * | 3/1990 | Ekroth | E02D 31/008 52/169.14 |
| 4,947,600 A | | 8/1990 | Porter | |
| 4,974,381 A | | 12/1990 | Marks | |
| 5,001,005 A | | 3/1991 | Blanpied | |
| 5,095,674 A | | 3/1992 | Huettemann | |
| 5,107,648 A | * | 4/1992 | Roby | E04B 2/8647 52/309.12 |
| 5,171,118 A | * | 12/1992 | Rothenbuhler | E04B 1/762 411/480 |
| 5,217,339 A | * | 6/1993 | O'Connor | E04D 3/3603 411/161 |
| 5,323,578 A | * | 6/1994 | Chagnon | E04B 2/8647 52/426 |
| D357,855 S | | 5/1995 | Keith et al. | |
| 5,440,845 A | | 8/1995 | Tadros et al. | |
| 5,451,451 A | | 9/1995 | Minnick | |
| 5,464,680 A | | 11/1995 | Hauser et al. | |
| 5,493,837 A | * | 2/1996 | Hepler | E04C 2/296 52/363 |
| 5,497,592 A | * | 3/1996 | Boeshart | E04B 2/8647 249/43 |
| 5,537,797 A | | 7/1996 | Harkenrider et al. | |
| 5,549,956 A | * | 8/1996 | Handwerker | B32B 15/08 428/73 |
| 5,570,550 A | | 11/1996 | Roby | |
| 5,595,171 A | | 1/1997 | Makin | |
| 5,606,832 A | * | 3/1997 | Keith | B28B 19/003 411/439 |
| 5,611,182 A | * | 3/1997 | Spude | E04B 2/8652 52/274 |
| 5,624,491 A | | 4/1997 | Liskowitz et al. | |
| 5,707,179 A | | 1/1998 | Bruckelmyer | |
| 5,761,874 A | * | 6/1998 | Hayakawa | E04G 17/06 249/40 |
| 5,765,318 A | * | 6/1998 | Michelsen | E04B 1/7662 428/43 |
| 5,780,367 A | | 7/1998 | Handwerker | |

(56) References Cited

U.S. PATENT DOCUMENTS

| | | | | |
|---|---|---|---|---|
| 5,792,552 A * | 8/1998 | Langkamp | B32B 13/12 | |
| | | | 428/309.9 | |
| 5,809,723 A * | 9/1998 | Keith | E04C 2/288 | |
| | | | 411/475 | |
| 5,809,725 A * | 9/1998 | Cretti | E04B 2/8647 | |
| | | | 52/309.15 | |
| 5,809,726 A * | 9/1998 | Spude | E02D 27/02 | |
| | | | 52/274 | |
| 5,809,728 A * | 9/1998 | Tremelling | E04B 2/8617 | |
| | | | 52/426 | |
| 5,836,126 A * | 11/1998 | Harkenrider | E04G 9/05 | |
| | | | 52/410 | |
| 5,836,715 A | 11/1998 | Hendrix et al. | | |
| 5,849,489 A * | 12/1998 | Heller | B82Y 10/00 | |
| | | | 435/6.12 | |
| 5,852,907 A | 12/1998 | Tobin et al. | | |
| 5,855,978 A * | 1/1999 | Handwerker | B32B 5/26 | |
| | | | 428/57 | |
| 5,874,150 A | 2/1999 | Handwerker | | |
| 5,930,965 A | 8/1999 | Carver | | |
| 5,966,885 A * | 10/1999 | Chatelain | E04C 2/22 | |
| | | | 52/309.4 | |
| 5,976,670 A | 11/1999 | Fugazzi | | |
| 5,992,114 A * | 11/1999 | Zelinsky | E04B 2/8652 | |
| | | | 249/216 | |
| 5,996,297 A | 12/1999 | Keith | | |
| 6,026,620 A | 2/2000 | Spude | | |
| 6,079,176 A | 6/2000 | Westra et al. | | |
| 6,086,349 A * | 7/2000 | Del Monte | B28B 7/0008 | |
| | | | 249/109 | |
| 6,088,985 A | 7/2000 | Clark | | |
| 6,123,879 A | 9/2000 | Hendrix et al. | | |
| 6,134,861 A * | 10/2000 | Spude | E02D 27/02 | |
| | | | 52/169.12 | |
| 6,138,981 A * | 10/2000 | Keith | E04G 11/18 | |
| | | | 249/19 | |
| 6,230,462 B1 | 5/2001 | Beliveau | | |
| 6,234,736 B1 * | 5/2001 | Miescher | E04B 1/7633 | |
| | | | 411/480 | |
| 6,256,957 B1 | 7/2001 | Kelly | | |
| 6,263,629 B1 | 7/2001 | Brown, Jr. | | |
| 6,263,638 B1 * | 7/2001 | Long, Sr. | B28B 19/003 | |
| | | | 52/309.11 | |
| 6,272,805 B1 | 8/2001 | Ritter et al. | | |
| 6,276,104 B1 | 8/2001 | Long, Sr. et al. | | |
| 6,279,285 B1 | 8/2001 | Kubica | | |
| 6,296,067 B1 | 9/2001 | Meendering | | |
| 6,296,224 B1 | 10/2001 | Hayakawa | | |
| 6,305,135 B1 * | 10/2001 | Inaba | B32B 3/30 | |
| | | | 52/309.12 | |
| 6,314,694 B1 * | 11/2001 | Cooper | E04B 2/8611 | |
| | | | 249/190 | |
| 6,318,040 B1 | 11/2001 | Moore, Jr. | | |
| 6,336,301 B1 | 1/2002 | Moore, Jr. | | |
| 6,360,505 B1 * | 3/2002 | Johns | E04F 13/147 | |
| | | | 249/15 | |
| 6,412,245 B1 | 7/2002 | Lane et al. | | |
| 6,426,029 B1 * | 7/2002 | Hiscock | B28B 19/0046 | |
| | | | 264/241 | |
| 6,454,889 B1 | 9/2002 | Hendrix et al. | | |
| 6,609,340 B2 | 8/2003 | Moore, Jr. et al. | | |
| 6,612,083 B1 * | 9/2003 | Richards | E04B 1/161 | |
| | | | 52/127.12 | |
| 6,632,309 B1 | 10/2003 | Hendrix et al. | | |
| 6,647,686 B2 | 11/2003 | Dunn et al. | | |
| 6,688,066 B1 * | 2/2004 | Cottier | E04B 2/7854 | |
| | | | 52/426 | |
| 6,705,055 B2 | 3/2004 | Ritter et al. | | |
| 6,711,862 B1 | 3/2004 | Long | | |
| 6,725,616 B1 * | 4/2004 | Pease | E04B 1/762 | |
| | | | 52/309.12 | |
| 6,729,090 B2 * | 5/2004 | Messenger | E04C 2/044 | |
| | | | 52/309.12 | |
| 6,761,007 B2 | 7/2004 | Lancelot, III et al. | | |
| 6,817,150 B1 | 11/2004 | Boeshart | | |
| 6,818,058 B2 | 11/2004 | Ronin | | |
| 6,874,749 B2 | 4/2005 | Wells | | |
| 6,898,908 B2 * | 5/2005 | Messenger | E04C 2/044 | |
| | | | 52/268 | |
| 6,898,912 B2 | 5/2005 | Bravinski | | |
| 6,915,613 B2 | 7/2005 | Wostal et al. | | |
| 6,935,081 B2 * | 8/2005 | Dunn | E04B 2/8641 | |
| | | | 249/191 | |
| 6,945,506 B2 | 9/2005 | Long, Sr. | | |
| 6,948,289 B2 | 9/2005 | Bravinski | | |
| 7,000,359 B2 * | 2/2006 | Meyer | E02D 31/02 | |
| | | | 52/309.17 | |
| 7,100,336 B2 | 9/2006 | Messenger et al. | | |
| 7,124,547 B2 | 10/2006 | Bravinski | | |
| 7,138,346 B2 | 11/2006 | Bush et al. | | |
| 7,148,160 B2 | 12/2006 | Porter | | |
| 7,183,524 B2 | 2/2007 | Naylor et al. | | |
| 7,206,726 B2 | 4/2007 | Seeber et al. | | |
| 7,230,213 B2 | 6/2007 | Naylor et al. | | |
| 7,368,150 B2 | 5/2008 | Pritchett | | |
| 7,398,131 B2 * | 7/2008 | Trost | G01N 33/383 | |
| | | | 700/108 | |
| 7,409,800 B2 * | 8/2008 | Budge | E04B 2/60 | |
| | | | 52/241 | |
| 7,491,268 B2 | 2/2009 | Hoffis | | |
| 7,523,591 B2 | 4/2009 | Di Lorenzo | | |
| 7,617,640 B2 | 11/2009 | Bradley | | |
| 7,625,827 B2 | 12/2009 | Egan et al. | | |
| 7,765,761 B2 * | 8/2010 | Paradis | E04C 2/243 | |
| | | | 428/316.6 | |
| 7,818,935 B2 * | 10/2010 | Velickovic | E04B 2/8652 | |
| | | | 52/426 | |
| 7,846,278 B2 | 12/2010 | Porter | | |
| 7,867,927 B2 | 1/2011 | Bush et al. | | |
| 7,871,055 B1 | 1/2011 | Dagher et al. | | |
| 7,934,693 B2 | 5/2011 | Bravinski | | |
| 7,984,591 B2 | 7/2011 | Cashin et al. | | |
| 8,032,244 B2 | 10/2011 | Trost et al. | | |
| 8,181,580 B2 | 5/2012 | Roth et al. | | |
| 8,277,931 B1 | 10/2012 | Kumar | | |
| 8,322,600 B2 | 12/2012 | Vitt | | |
| 8,532,815 B1 * | 9/2013 | Ciuperca | B29C 39/00 | |
| | | | 700/198 | |
| 8,545,749 B2 | 10/2013 | Ciuperca | | |
| 8,555,583 B2 | 10/2013 | Ciuperca | | |
| 8,555,584 B2 | 10/2013 | Ciuperca | | |
| 8,636,941 B1 * | 1/2014 | Ciuperca | E01C 23/03 | |
| | | | 264/333 | |
| 8,745,943 B2 | 6/2014 | Ciuperca | | |
| 8,754,143 B2 | 6/2014 | Delaviz et al. | | |
| 8,756,890 B2 | 6/2014 | Ciuperca | | |
| 8,844,227 B1 | 9/2014 | Ciuperca | | |
| 8,855,803 B2 | 10/2014 | Ciuperca | | |
| 8,877,329 B2 | 11/2014 | Ciuperca | | |
| 8,950,137 B2 | 2/2015 | Ciuperca | | |
| 8,951,460 B2 | 2/2015 | Ciuperca | | |
| 8,966,845 B1 * | 3/2015 | Ciuperca | E04B 1/80 | |
| | | | 52/309.12 | |
| 8,969,222 B2 | 3/2015 | Keese et al. | | |
| 9,003,740 B2 | 4/2015 | Ciuperca | | |
| 9,017,495 B2 | 4/2015 | Porter | | |
| 9,074,379 B2 | 7/2015 | Ciuperca | | |
| 9,114,549 B2 | 8/2015 | Ciuperca | | |
| 9,115,503 B2 | 8/2015 | Ciuperca | | |
| 9,145,695 B2 | 9/2015 | Ciuperca | | |
| 9,181,699 B2 | 11/2015 | Ciuperca | | |
| 9,290,939 B2 | 3/2016 | Ciuperca | | |
| 9,366,023 B2 | 6/2016 | Ciuperca | | |
| 9,458,637 B2 | 10/2016 | Ciuperca | | |
| 9,505,657 B2 | 11/2016 | Ciuperca | | |
| 9,574,341 B2 | 2/2017 | Ciuperca | | |
| 9,624,679 B2 | 4/2017 | Ciuperca | | |
| 9,745,749 B2 | 8/2017 | Ciuperca | | |
| 9,776,920 B2 | 10/2017 | Ciuperca | | |
| 9,809,981 B2 | 11/2017 | Ciuperca | | |
| 9,822,037 B1 | 11/2017 | Ciuperca | | |

(56) References Cited

U.S. PATENT DOCUMENTS

| | | |
|---|---|---|
| 9,828,289 B1 | 11/2017 | Ciuperca |
| 9,982,445 B2 | 5/2018 | Ciuperca |
| 10,047,005 B1 | 8/2018 | Ciuperca |
| 10,047,006 B1 | 8/2018 | Ciuperca |
| 10,059,628 B2 | 8/2018 | Ciuperca |
| 10,065,339 B2 | 9/2018 | Ciuperca |
| 10,065,886 B1 | 9/2018 | Ciuperca |
| 10,071,503 B2 | 9/2018 | Ciuperca |
| 10,166,697 B2 | 1/2019 | Ciuperca |
| 10,167,629 B2 | 1/2019 | Ciuperca |
| 10,220,542 B2 | 3/2019 | Ciuperca |
| 10,280,622 B2 | 5/2019 | Ciuperca |
| 2001/0057090 | 3/2001 | Spude et al. |
| 2002/0005725 A1* | 1/2002 | Scott .................. G01N 22/00 324/637 |
| 2002/0014048 A1 | 2/2002 | Meendering |
| 2002/0017070 A1 | 2/2002 | Batch |
| 2002/0092253 A1* | 7/2002 | Beliveau ............. B29C 44/1271 52/426 |
| 2003/0115831 A1 | 6/2003 | Long, Sr. |
| 2003/0170093 A1 | 9/2003 | Janeway |
| 2003/0192272 A1* | 10/2003 | Bravinski ............ E04B 2/8635 52/309.11 |
| 2004/0020147 A1 | 2/2004 | Martella et al. |
| 2004/0040239 A1 | 3/2004 | Baillargeon |
| 2004/0129857 A1* | 7/2004 | Musk .................. E04G 17/047 249/43 |
| 2004/0177580 A1 | 9/2004 | Tremelling |
| 2004/0252745 A1 | 12/2004 | Park et al. |
| 2005/0086904 A1 | 4/2005 | Foley |
| 2005/0102968 A1 | 5/2005 | Long, Sr. et al. |
| 2005/0108985 A1* | 5/2005 | Bravinski ............ E04B 2/8647 52/782.1 |
| 2006/0080923 A1 | 4/2006 | Fleischhacker |
| 2006/0179787 A1 | 8/2006 | Bilowol |
| 2007/0062143 A1* | 3/2007 | Noushad .................. B32B 3/12 52/426 |
| 2007/0094974 A1 | 3/2007 | Velickovic |
| 2007/0095255 A1* | 5/2007 | Abbate ............... C04B 28/04 106/713 |
| 2007/0144110 A1 | 6/2007 | Aalbers et al. |
| 2007/0144653 A1* | 6/2007 | Padilla .................. B29C 65/14 156/64 |
| 2007/0231576 A1 | 10/2007 | Davis et al. |
| 2008/0041004 A1* | 2/2008 | Gibbar .................. E04C 2/288 52/309.12 |
| 2008/0173788 A1* | 7/2008 | Brewka ............... E04G 11/10 249/189 |
| 2008/0221815 A1 | 9/2008 | Trost et al. |
| 2008/0313991 A1* | 12/2008 | Chouinard .......... E04C 2/044 52/506.01 |
| 2009/0000241 A1 | 1/2009 | Long, Sr. |
| 2009/0173870 A1 | 7/2009 | Long, Sr. |
| 2009/0202307 A1* | 8/2009 | Au ....................... E02D 27/02 405/233 |
| 2009/0218474 A1* | 9/2009 | Bowman ............. E04B 2/8611 249/18 |
| 2009/0229214 A1 | 9/2009 | Nelson |
| 2009/0277103 A1* | 11/2009 | De Jaham ............ E04B 1/26 52/93.1 |
| 2010/0050553 A1 | 3/2010 | Schofield |
| 2010/0062667 A1* | 3/2010 | Pan ....................... B32B 5/26 442/102 |
| 2010/0090089 A1 | 4/2010 | Koegel |
| 2010/0162659 A1* | 7/2010 | Laprise ................. E04B 1/14 52/762 |
| 2010/0192498 A1* | 8/2010 | Gleckman ........... E04C 2/384 52/475.1 |
| 2010/0212552 A1 | 8/2010 | Stratton et al. |
| 2010/0232877 A1* | 9/2010 | Sanvik .................. E02D 3/11 404/77 |
| 2010/0255277 A1 | 10/2010 | Platt et al. |
| 2010/0319295 A1* | 12/2010 | Nelson .................. E04C 5/20 52/677 |
| 2011/0008629 A1 | 1/2011 | Davidson et al. |
| 2011/0057090 A1 | 3/2011 | Spude et al. |
| 2011/0061329 A1 | 3/2011 | Tadros et al. |
| 2011/0131892 A1 | 6/2011 | Del Pino |
| 2011/0218261 A1 | 9/2011 | Loh et al. |
| 2011/0239566 A1* | 10/2011 | Ciuperca ............... B23P 11/00 52/259 |
| 2012/0058299 A1* | 3/2012 | Serwin ................. E04C 2/288 428/131 |
| 2012/0097073 A1 | 4/2012 | Lambrechts |
| 2013/0074432 A1* | 3/2013 | Ciuperca ................. E04B 1/21 52/309.4 |
| 2013/0074433 A1* | 3/2013 | Ciuperca ................ E04B 1/355 52/426 |
| 2013/0119576 A1* | 5/2013 | Ciuperca ............... C04B 28/04 264/232 |
| 2013/0280477 A1 | 10/2013 | Davis et al. |
| 2013/0337709 A1 | 12/2013 | Paradis et al. |
| 2013/0343734 A1 | 12/2013 | Dock, II et al. |
| 2014/0041329 A1 | 2/2014 | Ciuperca |
| 2014/0083333 A1 | 3/2014 | Ciuperca |
| 2014/0084132 A1* | 3/2014 | Ciuperca ................. E04G 9/04 249/1 |
| 2014/0087158 A1* | 3/2014 | Ciuperca ................. B32B 7/02 428/215 |
| 2014/0088756 A1 | 3/2014 | Ciuperca |
| 2014/0174647 A1 | 6/2014 | Ciuperca |
| 2014/0212643 A1 | 7/2014 | Ciuperca |
| 2014/0260034 A1* | 9/2014 | Ciuperca ............... E04C 2/296 52/405.3 |
| 2014/0263942 A1* | 9/2014 | Ciuperca ............... B29C 33/02 249/78 |
| 2014/0272302 A1* | 9/2014 | Ciuperca ............... B44C 5/04 428/150 |
| 2014/0290165 A1 | 10/2014 | Spanton et al. |
| 2014/0333004 A1* | 11/2014 | Ciuperca ............... B28B 7/245 264/232 |
| 2014/0333010 A1* | 11/2014 | Ciuperca ................. E04G 9/10 264/338 |
| 2015/0007524 A1 | 1/2015 | Ciuperca |
| 2015/0014300 A1 | 1/2015 | Ciuperca |
| 2015/0069647 A1 | 3/2015 | Ciuperca |
| 2015/0069664 A1 | 3/2015 | Ciuperca |
| 2015/0266783 A1 | 9/2015 | Ciuperca |

FOREIGN PATENT DOCUMENTS

| | | |
|---|---|---|
| EP | 2065530 A2 | 6/2009 |
| JP | 7224478 | 8/1995 |
| JP | H11256734 | 9/1999 |
| JP | H11350732 A | 12/1999 |
| JP | 2000240214 A | 9/2000 |
| JP | 2002128559 | 5/2002 |
| WO | WO99/18302 A1 | 4/1994 |
| WO | WO2005/113228 A1 | 12/2005 |
| WO | WO2009/072795 A1 | 6/2009 |
| WO | WO2011/141400 | 11/2011 |
| WO | WO 2012/080323 | 6/2012 |
| WO | WO 2012/080326 | 6/2012 |

OTHER PUBLICATIONS

U.S. Appl. No. 15/218,729, filed Jul. 25, 2016, first named inventor: Ciuperca.
U.S. Appl. No. 15/180,002, filed Jun. 11, 2016, first named inventor: Ciuperca.
U.S. Appl. No. 15/708,436, filed Sep. 19, 2017, first named inventor: Ciuperca.
U.S. Appl. No. 15/168,133, filed May 30, 2016, first named inventor: Ciuperca.
U.S. Appl. No. 14/734,184, filed Jun. 9, 2015, first named inventor: Ciuperca.
U.S. Appl. No. 16/157,754, filed Jan. 8, 2018, first named inventor: Ciuperca.

(56) References Cited

OTHER PUBLICATIONS

U.S. Appl. No. 16/157,754, filed Oct. 11, 2018, first named inventor: Ciuperca.
U.S. Appl. No. 15/671,798, filed Aug. 8, 2017, first named inventor: Ciuperca.
U.S. Appl. No. 15/990,759, filed May 28, 2018, first named inventor: Ciuperca.
U.S. Appl. No. 16/126,068, filed Sep. 10, 2018, first named inventor: Ciuperca.
U.S. Appl. No. 15/804,701, filed Nov. 6, 2017, first named inventor: Ciuperca.

* cited by examiner

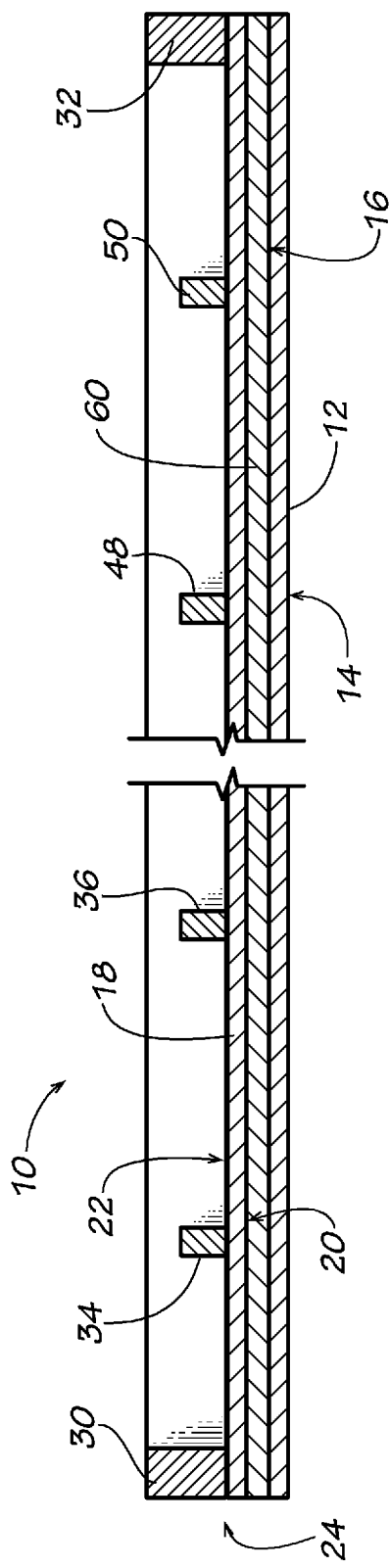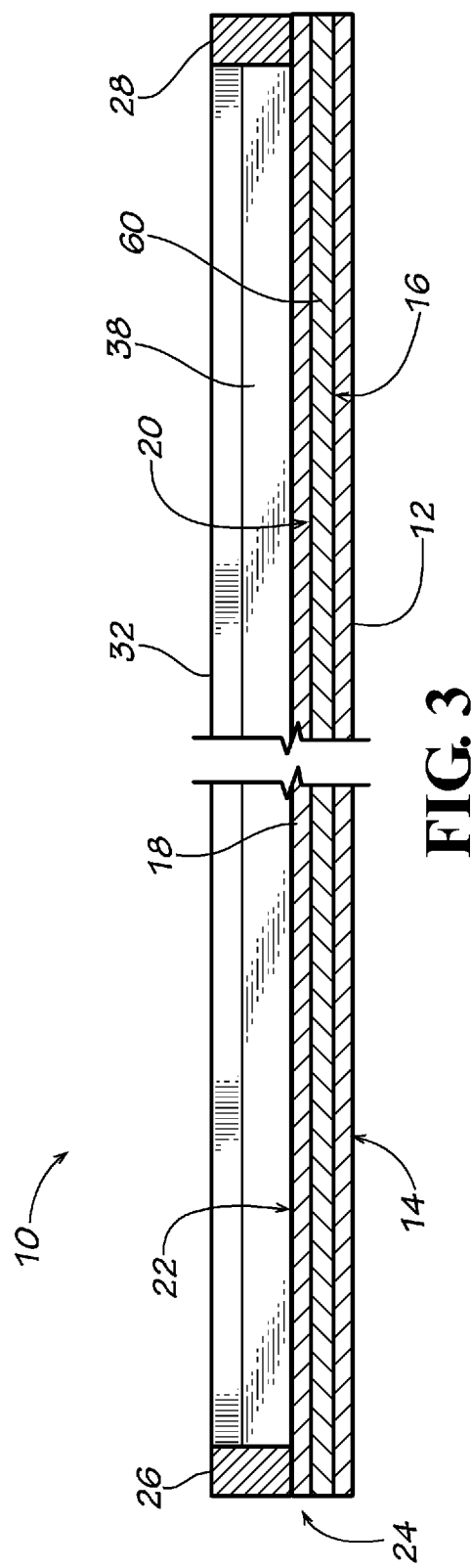

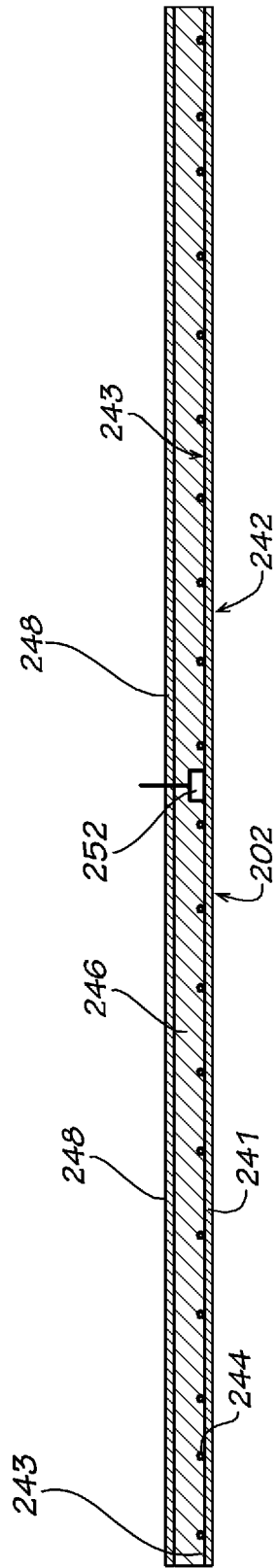
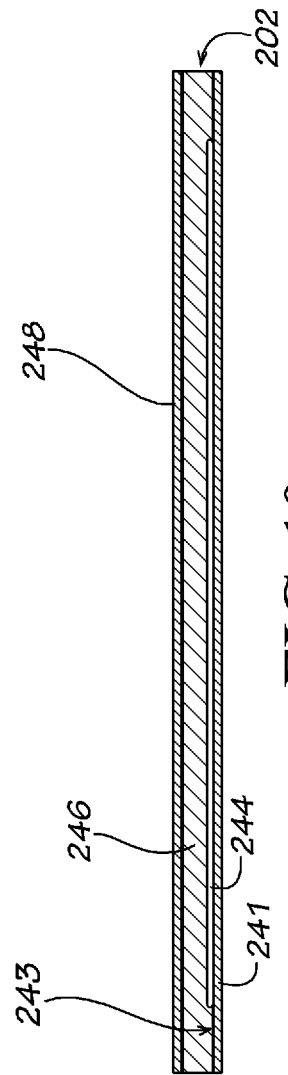
FIG. 9
FIG. 10

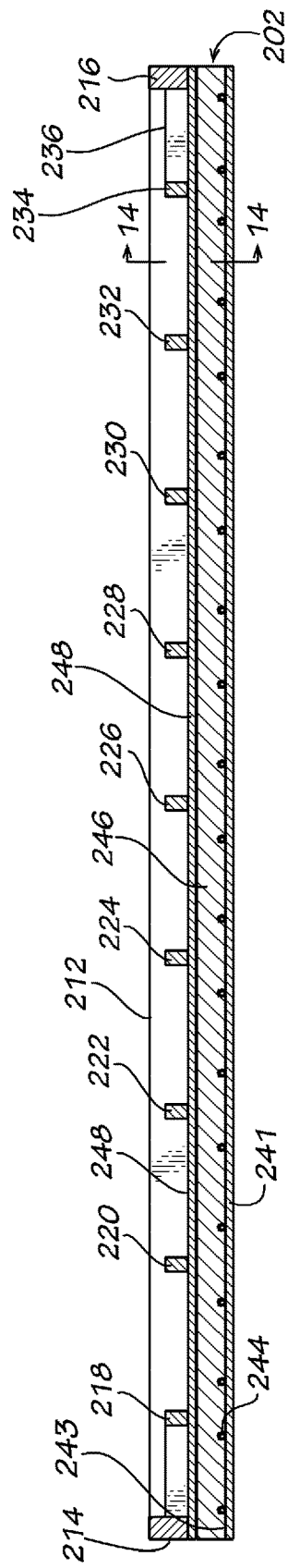
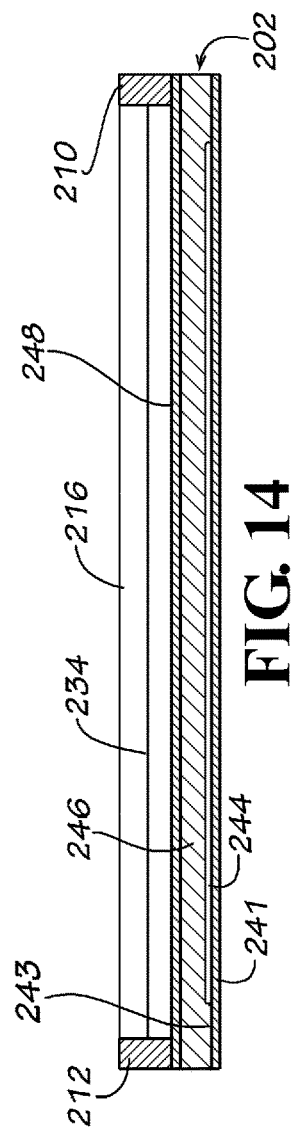
FIG. 13
FIG. 14

INSULATED CONCRETE SLIP FORM AND METHOD OF ACCELERATING CONCRETE CURING USING SAME

CROSS-REFERENCE TO RELATED APPLICATIONS

The present application is a continuation of application Ser. No. 14/480,948 filed Sep. 9, 2014, now U.S. Pat. No. 9,776,920, which claims the benefit of the filing date of U.S. provisional patent application Ser. No. 61/875,167 filed Sep. 9, 2013.

FIELD OF THE INVENTION

The present invention generally relates to a form for cement-based materials. More particularly, this invention relates to a concrete slip form, particularly an insulated concrete slip form. The present invention also relates to an electrically heated concrete slip form. The present invention also relates to a method of curing concrete by retaining the heat of hydration. The present invention also relates to a method for accelerating concrete curing using an insulated concrete slip form. The present invention also relates to a method of curing concrete with reduced amounts of portland cement, which produces a concrete that cures faster and is stronger and more durable.

BACKGROUND OF THE INVENTION

Concrete is a composite material usually comprising a mineral-based hydraulic binder which acts to adhere mineral particulates together in a solid mass; those particulates may consist of coarse aggregate (rock or gravel), fine aggregate (natural sand or crushed fines), and/or unhydrated or unreacted cementitious or pozzolanic material. Concrete typically is made from portland cement ("PC"), water and aggregate. Curing concrete requires two elements: suitable temperature and water. To achieve maximum strength, all cement particles must be hydrated. The initial process of hydration is exothermic; it generates a considerable amount of energy called the "heat of hydration." Fluid (plastic) concrete is poured in various forms or molds. These prior art uninsulated forms are exposed to the environment, and, therefore, the energy from the heat of hydration is generally lost to the environment in the first 8-36 hrs. In the next few days, most of the free moisture is also lost from the concrete. Therefore, the two elements required to hydrate the cement are often lost during the initial stage of concrete curing. Thus, the cement may never fully hydrate, and, therefore, may never achieve its maximum strength. Industry practice indicates that portland cement concrete achieves 90% of its maximum strength under ideal curing conditions in about 28 days.

Portland cement manufacture causes environmental impacts at all stages of the process. During manufacture, a metric ton of $CO_2$ is released for every metric ton of portland cement made. Worldwide $CO_2$ emissions from portland cement manufacture amount to about 5%-7% of total $CO_2$ emissions. The average energy input required to make one ton of portland cement is about 4.7 million Btu—the equivalent of about 418 pounds of coal. The production of portland cement is therefore highly energy intensive, accounting for about 2% of primary energy consumption globally. In 2010 the world production of hydraulic cement was about 3,300 million tons.

Concrete can also be made with slag cement ("SC") and various other pozzolans, such as fly ash ("FA"), but are not frequently used. Slag cement and fly ash generate relatively low amounts of heat of hydration, which result in extremely slow setting times and strength gain. Slag cement and fly ash can be mixed with portland cement but industry practice in building construction limits use of slag cement and fly ash to no more than 30% replacement of portland cement and only during warm weather conditions. Concrete made with slag cement and fly ash may take up to 90 days to achieve 80%-90% of maximum strength. Mass concrete structures use more slag cement and fly ash, replacing up to 80% of portland cement, as a means to reduce the heat of hydration to reduce cracking. Slag cement and fly ash use less water to hydrate, may have finer particles than portland cement and produce concretes that achieve higher compressive and flexural strength. Such concrete is also less permeable, and, therefore, structures built with slag cement and fly ash have far longer service lives or lifecycles.

Slag cement is obtained by quenching molten iron slag (a by-product of iron and steel-making) from a blast furnace in water or steam, to produce a glassy, granular product that is then dried and ground into a fine powder. Slag cement manufacture uses only 15% of the energy needed to make portland cement. Since slag cement is made from waste materials; no virgin materials are required and the amount of landfill space otherwise used for disposal is reduced. For each metric ton of pig iron produced, approximately ⅓ metric ton of slag is produced. In 2009, worldwide pig iron production was about 1.211 billion tons. There was an estimated 400 million tons of slag produced that could potentially be made into slag cement. However, only a relatively small percentage of slag is used to make slag cement in the USA.

Fly ash is a by-product of the combustion of pulverized coal in electric power generation plants. When pulverized coal is ignited in a combustion chamber, the carbon and volatile materials are burned off. However, some of the mineral impurities of clay, shale, feldspars, etc. are fused in suspension and carried out of the combustion chamber in the exhaust gases. As the exhaust gases cool, the fused materials solidify into spherical glassy particles called fly ash. The quantity of fly ash produced worldwide is growing along with the steady global increase in coal use. According to Obada Kayali, a civil engineer at the University of New South Wales Australian Defense Force Academy, only 9% of the 600 million tons of fly ash produced worldwide in 2000 was recycled and even smaller amount used in concrete; most of the rest is disposed of in landfills. Since fly ash is a waste product, no additional energy is required to make it.

Concrete can also be made from a combination of portland cement and pozzolanic material or from pozzolanic material alone. There are a number of pozzolans that historically have been used in concrete. A pozzolan is a siliceous or siliceous and aluminous material which, in itself, possesses little or no cementitious value but which will, in finely divided form and in the presence of water, react chemically with calcium hydroxide at ordinary temperatures to form compounds possessing cementitious properties (ASTM C618). The broad definition of a pozzolan imparts no bearing on the origin of the material, only on its capability of reacting with calcium hydroxide and water. The general definition of a pozzolan embraces a large number of materials, which vary widely in terms of origin, composition and properties. Both natural and artificial (man-made) materials show pozzolanic activity and are used as supplementary cementitious materials. Artificial pozzolans can be produced deliberately, for instance by thermal activation of kaolin-clays to obtain metakaolin, or can be obtained as waste or by-products from high-temperature process, such as fly ashes from coal-fired electricity production. The most commonly used pozzolans today are industrial by-products, such as slag cement (ground granulated blast furnace slag), fly ash, silica fume from silicon smelting, highly reactive metakaolin, and burned organic matter residues rich in silica, such as rice husk ash. Alternatives to the established pozzolanic by-products are to be found on the one hand in an expansion of the range of industrial by-products or societal waste considered and on the other hand in an increased usage of naturally occurring pozzolans. Silica fume (also known as microsilica) is an amorphous form of silicon dioxide. Silica fume consists of sub-micron spherical primary particles.

Natural pozzolans are abundant in certain locations and are used as an addition to portland cement in some countries. The great majority of natural pozzolans in use today are of volcanic origin. Volcanic ashes and pumices largely composed of volcanic glass are commonly used, as are deposits in which the volcanic glass has been altered to zeolites by interaction with alkaline waters. Deposits of sedimentary origin are less common. Diatomaceous earths, formed by the accumulation of siliceous diatom microskeletons, are a prominent source material here. Romans used volcanic ash mixed with lime to make concrete over 2,000 years ago.

Concrete walls, and other concrete structures and objects, traditionally are made by building a form or a mold. The forms and molds are usually made from wood, plywood, metal and other structural members. Unhardened (plastic) concrete is poured into the space defined by opposed spaced form members. Once the concrete hardens sufficiently, although not completely, the forms are removed leaving a concrete wall or other concrete structure, structural member or concrete object exposed to ambient temperatures. Concrete forms are typically made of various types of plywood or metal supported and/or reinforced by a frame structure. These forms are not insulated which means that concrete contained in such forms is exposed to the elements during the curing process. During the curing process, the heat generated by the hydration of cement is lost to the environment. This often makes the curing of the concrete a slow process and the ultimate strength difficult to control or predict. To compensate for these losses and increase the rate of setting and strength development, larger amounts of portland cement are used than otherwise would be necessary.

The curing of plastic concrete requires two elements, water and heat, to fully hydrate the cementitious material. Cement hydration is an exothermic process. This heat is produced by the hydration of the portland cement, or other pozzolanic or cementitious materials, that make up the concrete paste. Initially, the hydration process produces a relatively large amount of heat. Concrete placed in conventional forms (i.e., uninsulated forms) loses this heat of hydration to the environment in a very short time, generally in the first 8-36 hours, depending on the ambient temperature. Also, concrete placed in conventional forms may not reach its maximum potential temperature. As the hydration process proceeds, relatively less heat of hydration is generated due to slowing reaction rates. At the same time, moisture in the concrete is lost to the environment. If one monitors the temperature of concrete during the curing process, it produces a relatively large increase in temperature, which then decreases relatively rapidly over time. This chemical reaction is temperature dependent. That is, the hydration process, and consequently the strength gain, proceeds faster at higher temperature and slower at lower temperature. In conventional forms, both heat and moisture are lost in a relatively short time, which makes it difficult, or impossible, for the cementitious material to fully hydrate, and, therefore, the concrete may not achieve its maximum potential strength.

Conventional forms or molds provide little or no insulation to the concrete contained therein. Therefore, heat produced within the concrete form or mold due to the hydration process usually is lost through a conventional concrete form or mold relatively quickly. Thus, the temperature of the plastic concrete may initially rise 20 to 40° C., or more, above ambient temperature due to the initial hydration process and then fall relatively quickly to ambient temperature, such as within 8 to 36 hours depending on the climate and season and size of the concrete element. This initial relatively large temperature drop may result in significant concrete shrinkage and/or thermal effects which can lead to concrete cracking. The remainder of the curing process is then conducted at approximately ambient temperatures, because the relatively small amount of additional heat produced by the remaining hydration process is relatively quickly lost through the uninsulated concrete form or mold. The concrete is therefore subjected to the hourly or daily fluctuations of ambient temperature from hour-to-hour, from day-to-night and from day-to-day. Failure to cure the concrete under ideal temperature and moisture conditions affects the ultimate strength and durability of the concrete. In colder weather, concrete work may even come to a halt since concrete will freeze, or not gain much strength at all, at relatively low temperatures. By definition (ACI 306), cold weather conditions exist when " . . . for more than 3 consecutive days, the average daily temperature is less than 40 degrees Fahrenheit and the air temperature is not greater than 50 degrees Fahrenheit for more than one-half of any 24 hour period." Therefore, in order for hydration to take place, the temperature of concrete must be above 40° F.; below 40° F., the hydration process slows and at some point may stop altogether. Under conventional forming and curing methods, the concrete takes a relatively long time to fully hydrate the cementitious materials. Since both the initial heat and moisture are quickly lost in conventional forms, it is typically recommended that concrete by moisture cured for 28 days to fully hydrate the concrete. However, moisture curing for 28 days is seldom possible to administer in commercial practice. Therefore, concrete poured in various applications in conventional forms seldom develops it maximum potential strength and durability.

Insulated concrete form systems are known in the prior art and typically are made from a plurality of modular form members. U.S. Pat. Nos. 5,497,592; 5,809,725; 6,668,503; 6,898,912 and 7,124,547 (the disclosures of which are all incorporated herein by reference in their entirety) are exemplary of prior art modular insulated concrete form systems. Full-height insulated concrete forms are also known in the prior art. U.S. Patent Application Publication No. 2011/0239566 and 2013/007432 (the disclosures of which are both incorporated herein by reference in their entirety) disclose full-height insulated concrete forms.

In accordance with the present invention, insulated concrete forms retain the heat of hydration and improve or accelerate concrete curing properties. However, prior art insulated concrete forms are designed to remain in place on the concrete structure. Conventional removable concrete forms are not insulated and therefore cannot retain the heat of hydration.

Prior art concrete forms have not been proposed or used as a method to cure concrete or to improve the performance and properties of concrete. The present invention has discovered that when the initial heat generated by the hydration of cementitious material is retained in an insulated concrete form, the concrete achieves a greater internal temperature and such temperature is sustained for much longer periods of time before it is lost to the environment. During this time, there is sufficient moisture in the concrete to more fully hydrate the cementitious material.

In the construction of certain concrete structures, such as high-rise buildings, it is desirable to use a concrete slip form. Concrete slip forming is a construction method in which concrete is poured into a continuously moving form. Slip forming is typically used for relatively tall structures, such as bridges, towers, high-rise buildings, silos, grain elevators and the like, as well as horizontal structures, such as aircraft runways and automotive highways. Slip forming enables continuous, uninterrupted, cast-in-place concrete structures, usually without joints, which thereby provides the concrete with superior performance characteristics relative to construction using discrete form elements. Slip forming relies on the relatively quick-setting properties of concrete, and requires a careful balance between quick-setting capability and concrete workability. Concrete needs to be sufficiently workable to be placed into a form and, if necessary, consolidated, such as by vibration. On the other hand, in slip forming concrete must be sufficiently quick-setting to emerge from the moving form with sufficient strength to support its own weight. Such strength is necessary because the freshly set concrete must not only permit the form to "slip," but in vertical applications, the slip formed concrete must also support the weight of freshly poured concrete above it.

Due to the quick-setting properties required for slip forming concrete, concrete mixes employing reduced amounts of portland cement and relatively large amounts of supplementary cementitious or pozzolanic materials are not used for slip forming processes.

SUMMARY OF THE INVENTION

The present invention satisfies the foregoing needs by providing an improved concrete slip forming system to retain the heat of hydration of curing concrete.

In one disclosed embodiment, the present invention comprises a concrete form. The form comprises a first concrete forming panel having a first primary surface adapted for forming and contacting plastic concrete and a second primary surface opposite the first primary surface; a layer of insulating material contacting and substantially covering the second primary surface of the first concrete forming panel; and an insulating blanket adjacent the first concrete forming panel.

In another disclosed embodiment, the present invention comprises a method. The method comprises placing a first quantity of plastic concrete in a concrete form, wherein the concrete form comprises: a first concrete forming panel having a first primary surface adapted for forming and contacting plastic concrete and a second primary surface opposite the first primary surface; and a layer of insulating material contacting and substantially covering the second primary surface of the first concrete forming panel. The method also comprises moving the concrete form to an adjacent position, wherein at least a portion of the first quantity of plastic concrete is not within the concrete form. The method further comprises placing a second quantity of plastic concrete in the concrete form and substantially covering the portion of the first quantity of plastic concrete not within the concrete form with an insulating blanket.

In another disclosed embodiment, the present invention comprises a method. The method comprises selectively adding heat to a first quantity of concrete so that the first quantity of concrete follows a first predetermined temperature profile. The method also comprises selectively adding heat to a second quantity of concrete adjacent to the first quantity of concrete so that the second quantity of concrete follows a second predetermined temperature profile different from the first predetermined temperature profile Therefore, it is an object of the present invention to provide an improved insulated concrete slip form.

Another object of the present invention is to provide an insulated concrete slip form that can be used in the same manner as conventional prior art concrete slip forms.

A further object of the present invention is to provide a method of curing concrete by retaining the heat of hydration within the concrete thereby accelerating the hydration and curing of cementitious materials to achieve concrete with improved properties.

Another object of the present invention is to provide an improved method for curing concrete by more fully hydrating the cementitious material before needed heat and moisture are lost to the environment.

Another object of the present invention is to provide a system for curing concrete such that the concrete develops its maximum strength as early as possible.

A further object of the present invention is to provide a concrete curing system that uses reduced amounts of portland cement while producing concrete having an ultimate strength equivalent to concrete made with conventional amounts of portland cement.

Another object of the present invention is to provide a concrete curing system that substantially reduces the use of portland cement while producing concrete having an ultimate strength equivalent to concrete made with conventional amounts of portland cement.

A further object of the present invention is to provide a concrete curing system that uses relatively large amounts of recycled industrial waste material, such as slag cement, fly ash, silica fume, pulverized glass and/or rice husk ash, while producing concrete having an ultimate strength equivalent to, or better than, concrete made with conventional amounts of portland cement.

A further object of the present invention is to provide a concrete curing system that uses inert or filler material, such as ground limestone, calcium carbonate, titanium dioxide, or quartz, while producing concrete having an ultimate strength equivalent to, or better than, concrete made with conventional amounts of portland cement.

A further object of the present invention is to provide a concrete curing system that uses relatively large amounts of recycled industrial waste material, such as slag cement, fly ash, silica fume, pulverized glass and/or rice husk ash, in combination with inert or filler material, such as ground limestone, calcium carbonate, titanium dioxide, or quartz, while producing concrete having an ultimate strength equivalent to, or better than, concrete made with conventional amounts of portland cement.

Another object of the present invention is to provide a system for curing concrete such that concrete mixes containing reduced amounts of portland cement can be cured efficiently and effectively therein while having compressive strengths equivalent to, or better than, conventional concrete mixes.

A further object of the present invention is to provide a concrete curing system that uses pozzolanic materials as a partial, or full, replacement for portland cement, while producing concrete having an ultimate strength equivalent to, or better than, concrete made with conventional amounts of portland cement.

A further object of the present invention is to provide a concrete curing system that uses artificial pozzolans, such as fly ash, metakaolin, rice husk ash and silica fume, as a partial, or full, replacement for portland cement, while producing concrete having an ultimate strength equivalent to, or better than, concrete made with conventional amounts of portland cement.

A further object of the present invention is to provide a concrete curing system that uses natural pozzolans, such as volcanic ash similar to the Roman concrete, as a partial, or full, replacement for portland cement, while producing concrete having an ultimate strength equivalent to, or better than, concrete made with conventional amounts of portland cement.

Yet another object of the present invention is to provide a system for curing concrete such that the concrete develops its maximum durability.

Another object of the present invention is to provide a system for curing concrete more quickly.

Another object of the present invention is to provide an improved concrete slip form.

Another object of the present invention is to provide an insulated concrete slip form that provides insulation for conductive heat loss.

Another object of the present invention is to provide an insulated concrete slip form that provides insulation for radiant heat loss.

A further object of the present invention is to provide an electrically heated concrete slip form.

Another object of the present invention is to provide heat to concrete as it is being slip formed.

Another object of the present invention it is provide heat to concrete as it is being slip formed so that the temperature of the concrete follows a predetermined temperature profile.

Another object of the present invention is to provide insulation to slip formed concrete after the concrete slip form has moved (e.g., raised for the addition of additional concrete to the slip form) so as to retain the heat of hydration.

Another object of the present invention is to provide heat to slip formed concrete after the concrete slip form has moved (e.g., raised for the addition of additional concrete to the slip form) so as to maintain the concrete at a desired temperature.

Yet another object of the present invention is to provide heat to slip formed concrete after the concrete slip form has moved (e.g., raised for the addition of additional concrete to the slip form) so that the temperature of the concrete follows a predetermined temperature profile.

These and other objects, features and advantages of the present invention will become apparent after a review of the following detailed description of the disclosed embodiments and the appended drawing and claims.

BRIEF DESCRIPTION OF THE DRAWINGS

FIG. 2 is a partially broken away cross-sectional view taken along the line 2-2 of the insulated concrete slip form shown in FIG. 1.

FIG. 3 is a cross-sectional view taken along the line 3-3 of the insulated concrete slip form shown in FIG. 1.

FIG. 9 is a partially broken away side view of the electrically heated concrete forming panel shown in FIG. 8.

FIG. 10 is a cross-sectional view taken along the line 10-10 of the electrically heated concrete forming panel shown in FIG. 8.

FIG. 13 is a cross-sectional view taken along the line 13-13 of the electrically heated concrete slip form shown in FIG. 12.

FIG. 14 is a cross-sectional view taken along the line 14-14 of the electrically heated concrete slip form shown in FIG. 13.

DETAILED DESCRIPTION OF THE DISCLOSED EMBODIMENTS

Figure 1:
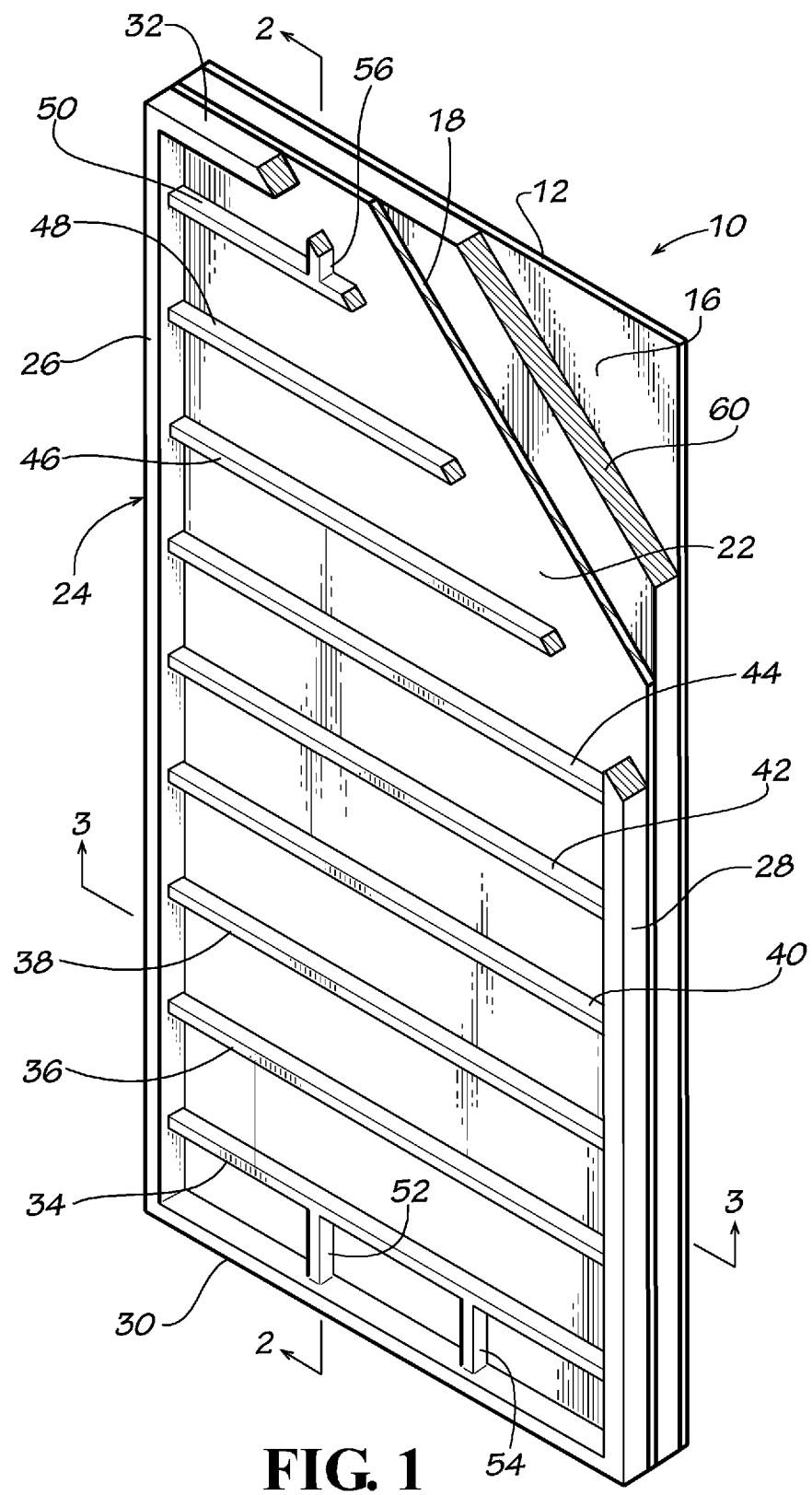
FIG. 1 is a partially broken away perspective view of a disclosed embodiment of an insulated concrete slip form in accordance with the present invention.

Referring now to the drawing in which like numbers indicate like elements throughout the several views, there is shown in FIG. 1 a disclosed embodiment of an insulated concrete slip form 10 in accordance with the present invention. The insulated concrete slip form 10 comprises a rectangular concrete forming face or first panel 12 made of any suitable material typically used in prior art concrete forms or any other materials that are sufficiently strong to withstand the hydrostatic pressure of plastic concrete applied to it. The concrete forming first panel 12 can be made from any suitable material including, but not limited to, wood, plywood, high density overlay (HDO) plywood, wood composite materials, wood or composite materials with polymer coatings, plastic, plastic composites, and metal, such as steel or aluminum. The concrete forming first panel is preferably made from a conductive heat insulating material or a poor heat conducting material. A preferred material for the first panel 12 is a sheet of high density overlay (HDO) plywood. The first panel 12 can be any useful thickness depending on the anticipated loads to which the form will be subjected. However, plywood thicknesses of ⅛ inch to ⅞ inches can be used. The first panel 12 has a first primary surface 14 for contacting plastic concrete and an opposite second primary surface 16. The first primary surface 14 is usually smooth and flat. The first primary surface 14 can also include a polymer coating to make the surface smoother, more durable and/or provide better release properties. The first primary surface 14 of the concrete forming first panel 12 contacts concrete that is placed between a pair of opposed insulated concrete slip form 10 in accordance with the present invention. The first panel 12 defines a plane. Optionally, but preferably, there is a second panel 18 that is the same size as the first panel 12. The second panel 18 can be made from the same material as the first panel 12, or it can be made from a different material. The second panel 18 has a first primary surface 20 and an opposite second primary surface 22.

The first panel 12 and/or the second panel 18 are attached directly or indirectly to a frame 24 by any means known in the art. The rectangular frame 24 comprises two elongate longitudinal members 26, 28 and two elongate transverse members 30, 32. The longitudinal members 26, 28 and the transverse members 30, 32 are attached to each other and to the first panel 12 and/or the second panel 18 by any suitable means used in the prior art. The frame 24 also comprises at least one, and preferably a plurality, of transverse bracing members 34, 36, 38, 40, 42, 44, 46, 48, 50. The transverse bracing members 34-50 are attached to the longitudinal members 26, 28 and optionally to the first panel 12 and/or the second panel 18 by any suitable means used in the prior art. The frame 24 also includes bracing members 52, 54 and 56 (a fourth bracing member is not shown). The bracing members 52, 54 extend between the transverse member 26 and the bracing member 28. The bracing members 52, 54 are attached to the transverse member 30 and the bracing member 34 by any suitable means used in the prior art. The bracing member 56 (and a bracing member not shown) extends between the transverse member 32 and the bracing member 50. The bracing member 56 is attached to the transverse member 32 and the bracing member 50 by any suitable means used in the prior art. The frame 24 helps prevent the first and second panels 12, 18 from flexing or deforming under the hydrostatic pressure of plastic concrete when placed between two opposed insulated concrete slip forms 10. Therefore, the frame 24 must be made in such a way so as to withstand the anticipated hydrostatic pressure to which the frame 24 will be subjected. The frame 24 can be made from any suitable material used in the prior art including, but not limited to, wood or metal, such as aluminum or steel, depending on the load to which the insulated concrete slip form 10 will be subjected. The particular design of the frame 24 is not critical to the present invention. There are many different sizes, shapes and designs of frames for concrete slip forms and they are all applicable to the present invention. Preferably, no portion of the frame 24 is in the plane defined by the first panel 12. Preferably there is no substantial thermal bridging between the first panel 12 and the second panel 18. Preferably there is no substantial thermal bridging between the first panel 12 and the frame 24. As used herein the term "thermal bridging" means direct contact with a material having heat conducting properties equivalent to metal, such as steel or aluminum. As used herein the term "no substantial thermal bridging" means no more thermal bridging than would be associated with attaching the first panel 12 to the second panel 14 and/or attaching the first panel to the frame 24, such as by screws or nails or similar connectors.

The present invention departs from conventional prior art concrete slip forms, as explained below. Disposed between the first panel 12 and second panel 18 is a layer of insulating material 60. The layer of insulating material 60 covers, or substantially covers, the second primary surface 16 of the first panel 12 and the first primary surface 20 of the second panel 18. As used herein the term "substantially covers" means covering at least 80% of the primary surface area of the first and/or second panels 12, 18. The layer of insulating material 60 is made from any suitable material providing heat insulating properties, preferably a sheet of closed cell polymeric foam. The layer of insulating material 60 is preferably made from closed cell foams including, but not limited to, polyvinyl chloride, urethane, polyurethane, polyisocyanurate, phenol, polyethylene, polyimide or polystyrene. Such polymeric foam sheet preferably has a density of 1 to 3 pounds per cubic foot, or more. The layer of insulating material 60 preferably has insulating properties equivalent to at least 0.25 inches of expanded polystyrene foam, preferably equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam, especially equivalent to at least 8 inches of expanded polystyrene foam. There is no maximum thickness for the layer of insulting material equivalent to expanded polystyrene foam useful in the present invention. The maximum thickness is usually dictated by economics, weight, ease of handling and building or structure design. However, for most applications a maximum insulating equivalence of 8 inches of expanded polystyrene foam can be used. In another embodiment of the present invention, the layer of insulating material 60 has insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties for the layer of insulating material 60 include all of the intermediate values. Thus, the layer of insulating material 60 used in another disclosed embodiment of the present invention has insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layer of insulating material 60 should have an R-value of greater than 1.5, preferably greater than 4, more preferably greater than 8, most preferably greater than 12, especially greater than 20, more especially greater than 30, most especially greater than 40. The layer of insulating material 60 preferably has an R-value of approximately 1.5 to approximately 40; more preferably between approximately 4 to approximately 40; especially approximately 8 to approximately 40; more especially approximately 12 to approximately 40. The layer of insulating material 60 preferably has an R-value of approximately 1.5, more preferably approximately 4, most preferably approximately 8, especially approximately 20, more especially approximately 30, most especially approximately 40.

The layer of insulating material 60 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various forms including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit to the thickness of the refractory insulating material; this is usually dictated by economics and weight. However, refractory insulating material useful in the present invention can range from $\frac{1}{32}$ inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, cement or epoxy, and used as a coating or a polymeric foam to create a refractory insulating material layer, for example covering, or substantially covering, one of the primary surfaces 16, 20 of the first or second panels 12, 18, or both. Such a refractory insulating material layer can be used as the layer of insulating material 60 to block excessive ambient heat loads and retain the heat of hydration of concrete within the insulated concrete slip forms 10 of the present invention. Ceramic fibers suspended in a polymer binder, such as latex, are commercially available as Super Therm®, Epoxotherm and HPC Coating from Superior Products, II, Inc., Weston, Fla., USA.

The layer of insulating material 60 is preferably a multi-layer material with a first layer of refractory insulating material and a second layer of closed cell polymeric foam insulating material. The layer of insulating material 60 more preferably comprises a layer of ceramic fibers suspended in a polymer, especially a polymeric foam including, but not limited to, polystyrene foam, polyurethane foam, polyisocyanurate foam, latex foam or any other suitable type of polymeric foam.

The first and second panels 12, 18 are preferably made from rigid sheets of wood, plywood, metal, plastic, fibers or composite materials. The first and second panels 12, 18 are preferably made from the same material. However, it is also contemplated that one of the first and second panels 12, 18 can be made from one of wood, plywood, metal, plastic, fibers or composite materials and the other made from a different one of wood, plywood, metal, plastic, fibers or composite materials. Suitable metals include, but are not limited to, steel and aluminum. Suitable plastics include, but are not limited to, polyethylene (PE), poly(ethylene terephthalate) (PET), polypropylene (PP), polyvinyl chloride (PVC), chlorinated polyvinyl chloride (CPVC), acrylonitrile butadiene styrene (ABS), polycarbonate, polystyrene, nylon, urethane, polyurethane (PU), polyisocyanurate, phenol, polyimide, acrylic polymers such as polyacrylate, poly(methyl methacrylate) (PMMA), and the like. Fiberboard is a type of engineered wood product that is made out of wood fibers. Composite materials include fiberglass board, which is a laminated product of glass and epoxy resin and other laminates. Fiberglass boards are commercially available from Owens Corning, Monsey, N.Y.; Current, Inc., East Have, Conn. and under the designation Exact-O-Board from Pacor, Inc., Bordentown, N.J. Other composite laminates include laminated products comprised of layers of cloth or paper with thermosetting resins cured under elevated pressure and temperature.

A particularly preferred plastic sheet for use as the first and/or second panels 12, 18 is corrugated plastic. Corrugated plastic sheet typically comprises two planar plastic sheets spaced from each other but connected to each other by a plurality of small I-beam formed plastic connections. The I-beam formed plastic connections between the planar sheets of plastic can be either perpendicular to the planar sheets of plastic or slanted. Corrugated plastic sheets can also be made by sandwiching a fluted sheet of plastic between two flat sheets of plastic (also called facings). The sheets can be joined together by gluing. The corrugated plastic sheet can be single wall corrugated sheets, double wall corrugated sheets or triple wall corrugated sheets. The layer of insulating material 60 can then be applied to one or both of the corrugated sheets that form the first and second panels 12, 18 or the layer of insulating material can be adhered to one or both of the corrugated sheets.

It is typical for wood or wood composite panels used for concrete forming panels to include a polymer coating on the surface that contacts the concrete. This provides better concrete release properties to the panel. It is a part of the present invention that a polymer coating is optionally applied to the first primary surface 14 of the concrete forming first panel 12 and that the polymer coating includes heat insulating materials, such as refractory insulating materials. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. It is a part of the present invention that a polymer coating is optionally applied to the first primary surface 14 of the concrete forming first panel 12 and that the polymer coating includes heat reflective materials. Heat reflective materials are made from materials including, but not limited to, mica, aluminum flakes, magnetite, graphite, carbon, other types of silicates and combinations thereof. The above heat reflective materials can be used in any number ways and combination percentages, not just as a single element added to the polymeric material. The heat reflective elements can also be used in conjunction with the ceramic fibers mentioned above in any number of ways and percentage combinations. The heat insulating materials and/or the heat reflective materials can be added to the polymeric material used to coat the first primary surface 14 of the concrete forming first panel 12 in amounts of approximately 0.1% to approximately 50% by weight heat reflective elements, preferably approximately 0.1% to approximately 40% by weight, more preferably approximately 0.1% to approximately 30% by weight, most preferably approximately 0.1% to approximately 20% by weight, especially approximately 0.1% to approximately 15% by weight, more especially approximately 0.1% to approximately 10% by weight, most especially approximately 0.1% to approximately 5% by weight. The polymeric material used to coating the first primary surface 14 of the concrete forming first panel 12 includes, but is not limited to, polyethylene (PE), poly(ethylene terephthalate) (PET), polypropylene (PP), polyvinyl chloride (PVC), chlorinated polyvinyl chloride (CPVC), acrylonitrile butadiene styrene (ABS), polycarbonate, polystyrene, nylon, urethane, polyurethane (PU), polyisocyanurate, phenol, polyimide, acrylic polymers such as polyacrylate, poly(methyl methacrylate) (PMMA), latex polymers, epoxy resin and the like.

In another disclosed embodiment, if the corrugations of a corrugated plastic sheet are large enough; e.g., approximately 0.5 inches between the facings, the two facings of the corrugated sheet can be use as the first and second panels 12, 18. The layer of insulating material 60 then preferably can be injected between the two facings and between the corrugations. In this case, the layer of insulating material 60 is preferably foamed liquid plastic or a liquid plastic that blows in situ to form a foam. The foamed liquid plastic or a liquid plastic that blows in situ is then allowed to set and cure inside the corrugated plastic sheet. A corrugated metal sheet can also be used in the present invention and made in the same manner as the corrugated plastic sheet, as described above.

In another disclosed embodiment a first plastic sheet can be laid on a work surface. A layer of plastic foam, or a layer of liquid plastic that blows in situ, can then be deposited on the first plastic sheet. A second plastic sheet can then be disposed on the layer of plastic foam or the layer of liquid plastic that blows in situ. After the layer of plastic foam, or the layer of liquid plastic that blows in situ, is deposited between the first and second plastic sheets, or after the layer of liquid plastic blows in situ has blown (i.e., expanded), the first and second plastic sheets can be gauged to a desired thickness, such as by passing the first and second plastic sheets between a pair of spaced gauge rollers. After the first and second plastic sheets have been gauged to a desired thickness, the layer of plastic foam or the layer of liquid plastic that blows in situ is allowed to cure. If necessary, the sandwich of the first and second plastic sheets with the layer of plastic foam in between can be cut to a desired size and/or shape.

In another disclosed embodiment a first metal sheet can be laid on a work surface. A layer of plastic foam, or a layer of liquid plastic that blows in situ, can then be deposited on the first metal sheet. A second metal sheet can then be disposed on the layer of plastic foam, or a layer of liquid plastic that blows in situ after the liquid plastic is blown (i.e., expanded). Before the layer of plastic foam, or the blown layer of liquid plastic, sets up, the first and second metal sheets can be gauged to a desired thickness, such as by passing the first and second metal sheets between a pair of spaced gauge rollers. After the first and second metal sheets have been gauged to a desired thickness, the layer of plastic foam, or the blown layer of liquid plastic, is allowed to cure. If necessary, the sandwich of the first and second metal sheets with the layer of plastic foam in between can be cut to a desired size and/or shape. Any of the foregoing plastic foams can have ceramic fibers suspended therein, so as to provide an efficient conductive heat insulating and radiant heat reflective material.

Optionally, the layer of insulating material 60 can include a layer of radiant heat reflective material. The layer of radiant heat reflective material can be made from any suitable material that reflects radiant heat, such as metal foil, especially aluminum foil, or a metalized polymeric film, more preferably, metalized biaxially-oriented polyethylene terephthalate film, especially aluminized biaxially-oriented polyethylene terephthalate film. Biaxially-oriented polyethylene terephthalate film is commercially available under the designation Mylar®, Melinex® and Hostaphen®. Mylar® film is typically available in thicknesses of approximately 1 mil or 2 mil. Aluminized Mylar® film is commercially available from the Cryospares division of Oxford Instruments Nanotechnology Tools Ltd., Abingdon, Oxfordshire, United Kingdom and from New England Hydroponics, Southampton, Mass., USA.

Use of the insulated concrete slip form 10 will now be considered. A particular advantage of the present invention is that the insulated concrete slip form 10 can be used in the same manner as a conventional prior art concrete slip form. As shown in FIGS. 4-7, two insulated concrete slip forms 100, 102 identical to the insulated concrete slip form 10 are placed vertically and horizontally spaced from each other, in a manner well known in the art. Two additional insulated concrete slip forms 104, 106 identical to the insulated concrete slip form 10 are placed vertically and horizontally spaced from each other, in a manner well known in the art. In the present embodiment, the concrete slip forms 100-106 are attached to each other and are arranged to form a square concrete column or pier. However, the insulated concrete slip form 10 of the present invention can be sized, shaped and arranged with other insulated concrete slip forms in accordance with the present invention to form a concrete slip form of any desired size, shape or design. It is specifically contemplated that the insulated concrete slip form 10 in accordance with the present invention can be used to form columns, walls, piers and the like.

Figure 4:
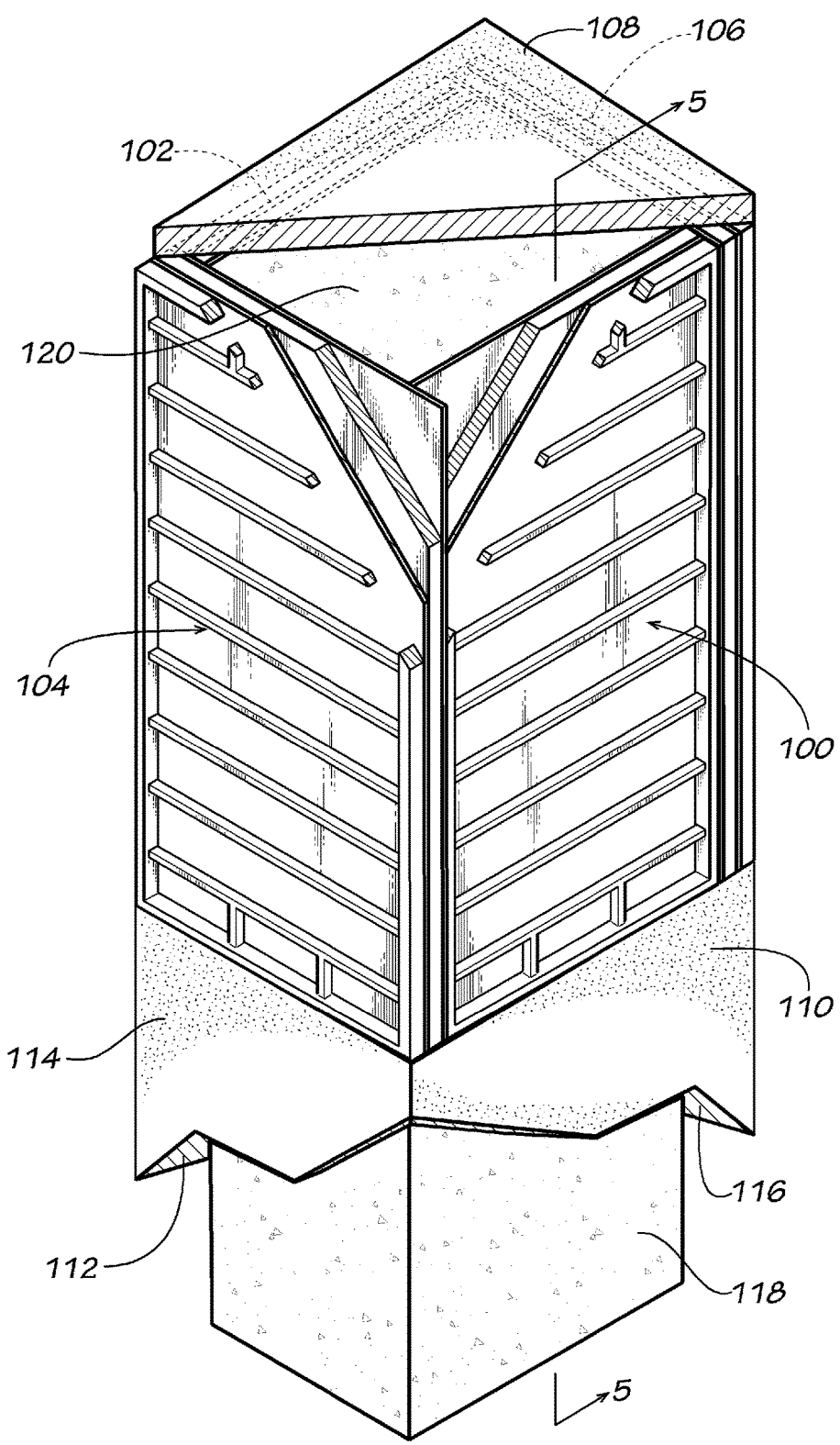
FIG. 4 is a partially broken away perspective view of a disclosed embodiment of an insulated concrete slip form assembly in accordance with the present invention for forming a concrete column.
Figure 5:
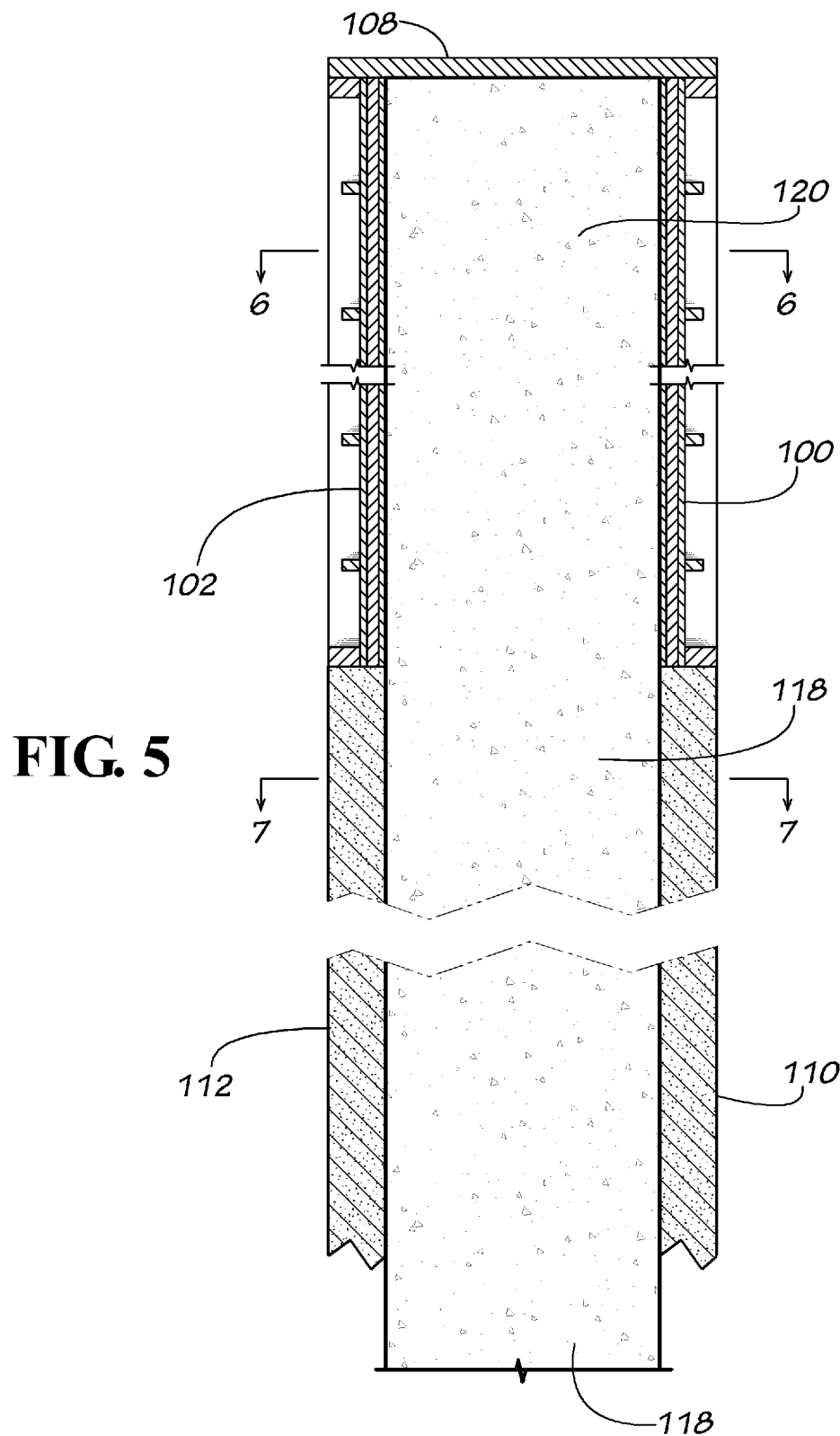
FIG. 5 is a partially broken away cross-sectional view taken along the line 5-5 of the insulated concrete slip form assembly shown in FIG. 4.
Figure 6:
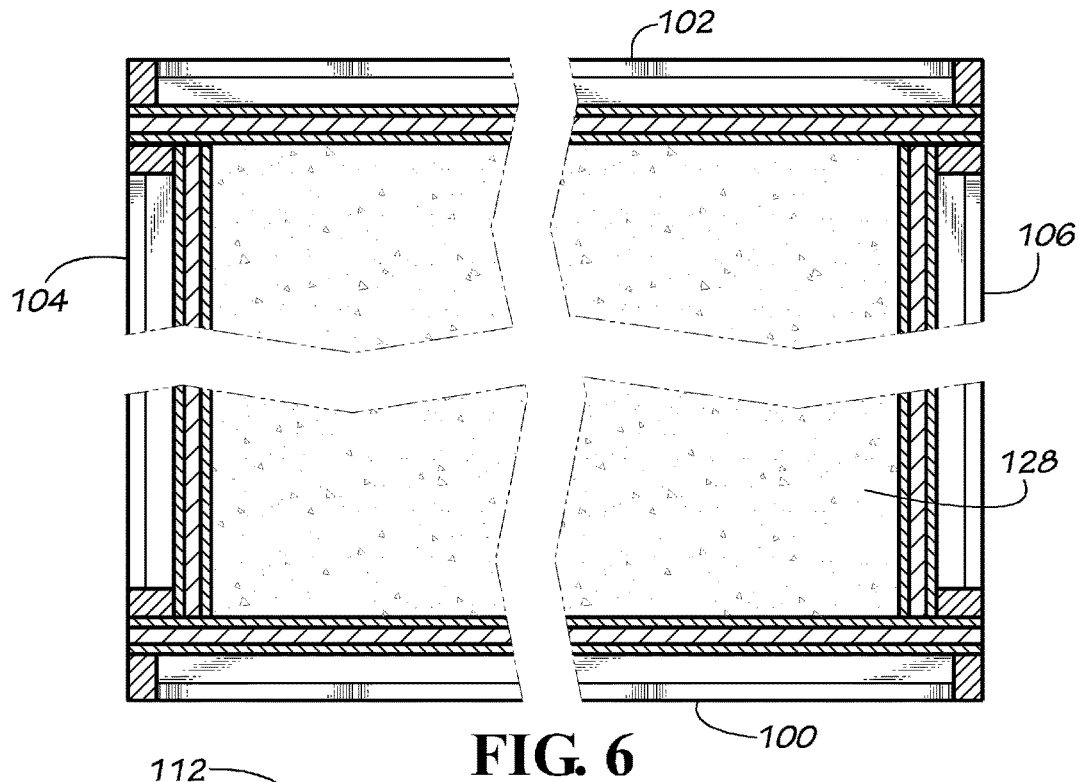
FIG. 6 is a partially broken away cross-sectional view taken along the line 6-6 of the insulated concrete slip form assembly shown in FIG. 5.
Figure 7:
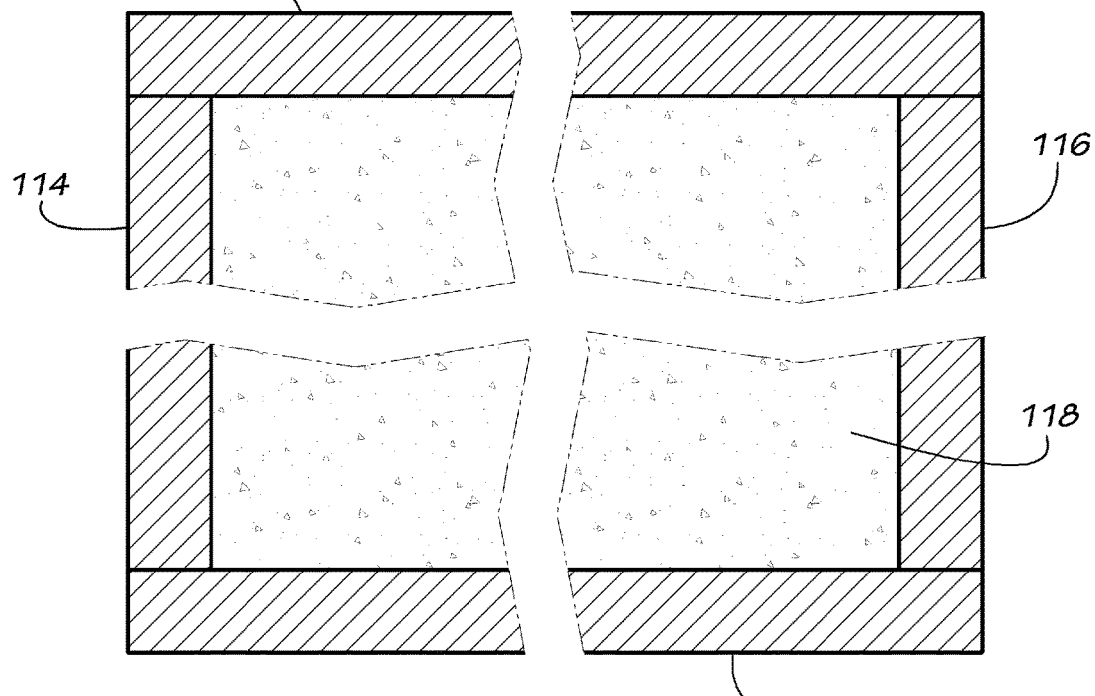
FIG. 7 is a partially broken away cross-sectional view taken along the line 7-7 of the insulated concrete slip form assembly shown in FIG. 5.
Figure 8:
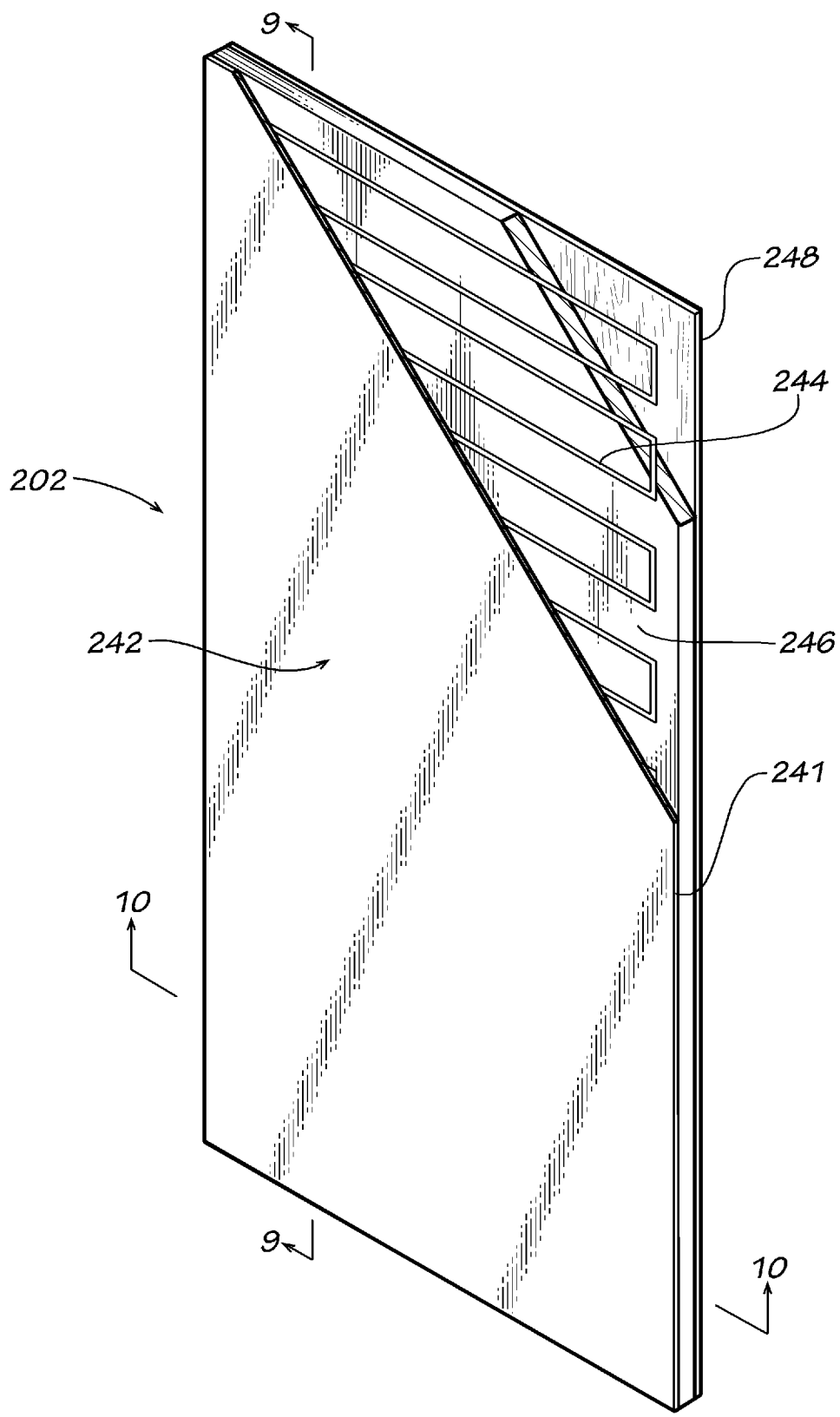
FIG. 8 is a partially broken away perspective view of an electrically heated concrete forming panel for use with a concrete slip form in accordance with the present invention.

After the insulated concrete slip forms 100-106 are erected in the desired configuration, plastic concrete is placed in the space defined by the four opposed insulated concrete slip forms (FIGS. 4-7). Optionally, but preferably, after the plastic concrete is placed in the insulated concrete slip forms 100-106, a layer of insulating material 108 is placed on top of the four insulated concrete slip forms and over the plastic concrete contained therein, as shown in FIG. 4. The layer of insulating material 108 is made from any suitable material providing conductive heat insulating properties, preferably a sheet of closed cell polymeric foam. The layer of insulating material 108 is preferably made from closed cell foams including, but not limited to, polyvinyl chloride, urethane, polyurethane, polyisocyanurate, phenol, polyethylene, polyimide or polystyrene. Such foam preferably has a density of 1 to 3 pounds per cubic foot, or more. The layer of insulating material 108 preferably has insulating properties equivalent to at least 0.25 inches of expanded polystyrene foam, preferably equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam, especially equivalent to at least 8 inches of expanded polystyrene foam. There is no maximum thickness for the layer of insulting material 108 equivalent to expanded polystyrene foam useful in the present invention. The maximum thickness is usually dictated by economics, weight, ease of handling and building or structure design. However, for most applications a maximum insulating equivalence of 8 inches of expanded polystyrene foam can be used. In another embodiment of the present invention, the layer of insulating material 108 has insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties for the layer of insulating material 108 include all of the intermediate values. Thus, the layer of insulating material 108 used in another disclosed embodiment of the present invention has insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layer of insulating material 108 should have an R-value of greater than 1.5, preferably greater than 4, more preferably greater than 8, most preferably greater than 12, especially greater than 20, more especially greater than 30, most especially greater than 40. The layer of insulating material 108 preferably has an R-value of approximately 1.5 to approximately 40; more preferably between approximately 4 to approximately 40; especially approximately 8 to approximately 40; more especially approximately 12 to approximately 40. The layer of insulating material 108 preferably has an R-value of approximately 1.5, more preferably approximately 4, most preferably approximately 8, especially approximately 20, more especially approximately 30, most especially approximately 40.

The layer of insulating material 108 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various forms including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from 1/32 inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, cement or epoxy, and used as a coating or a polymeric foam to create a refractory insulating material layer. Such a refractory insulating material layer can be used as the layer of insulating material 108 to block excessive ambient heat loads and retain the heat of hydration of concrete within the insulated concrete slip forms of the present invention. Ceramic fibers suspended in a polymer binder, such as latex, are commercially available as Super Therm®, Epoxotherm and HPC Coating from Superior Products, II, Inc., Weston, Fla., USA.

The layer of insulating material 108 is preferably a multi-layer material with a first layer of refractory insulating material and a second layer of polymeric foam insulating material. The layer of insulating material 108 more preferably comprises a layer of ceramic fibers suspended in polymeric foam and a layer of expanded polystyrene foam. The layer of insulating material 108 optionally can include a layer of radiant heat reflecting material, such as a layer of polymeric foam with a radiant heat reflective metal foil, such as aluminum foil, laminated to one primary surface thereof.

The layer of insulating material 108 is preferably a concrete insulating blanket having the insulating properties described above. Concrete insulating blankets, are commercially available under the designation concrete insulating blankets from Pregis Corp., Lake Forest, Ill. and concrete curing blankets from Granite City Tool, Waite Park, Minn. Alternatively, the layer of insulating material 108 is an electrically heated blanket. Such electrically heated insulating blankets have been used in highway construction in the northern United States to prevent plastic concrete from freezing in winter weather. Suitable electrically heated insulating blankets are commercially available under the designation Powerblanket from Power Blanket LLC, Salt Lake City, Utah.

The insulated concrete slip forms 100-106 and layer of insulating material 108 are left in place for a time sufficient for the plastic concrete within the forms to at least partially cure. While the insulated concrete slip forms 100-106 and the layer of insulating material 108 are in place, the layer of insulating material 60 and the layer of insulating material 108 retain at least a portion, preferably a major portion, of the heat of hydration from the curing concrete within the insulated concrete slip forms. By retaining at least a portion of the heat of hydration, the plastic concrete in the insulated concrete slip forms 100-106 cures more quickly and achieves better physical properties than it would have had it been cured in a conventional concrete slip form; i.e., a non-insulated concrete slip form. This is true for conventional portland cement concrete, but even more so for concrete including significant amounts of supplementary cementitious material, such as slag cement and/or fly ash, or other pozzolans, as described below. Furthermore, it is desirable to leave the insulated concrete slip forms 100-106 and the layer of insulating material 108 in place with the curing concrete therein for a period of approximately 3 hours to approximately 7 days, preferably approximately 3 hours to approximately 3 days, preferably approximately 6 hours to approximately 3 days, more preferably approximately 12 hours to approximately 3 days, especially approximately 12 hours to approximately 2 days, more especially approximately 12 hours to approximately 24 hours, most especially approximately 1 hour to 24 hours. After the concrete has cured to a desired degree, the insulated concrete slip forms 100-106 are moved upwardly in a conventional manner known in the art. The insulated concrete slip forms of the present invention, such as the insulated concrete slip forms 100-106, can be moved continuously as plastic concrete is continuously added to the insulated concrete slip forms or the insulated concrete slip forms can be moved intermittently with each new lift of concrete.

The insulated concrete slip form 10 of the present invention is advantageous over the prior art because it can be used in the same manner as a prior art concrete slip form. Therefore, there is no new training required to install, move (i.e., raise) or remove these forms. However, the insulated concrete slip form 10 produces cured concrete more quickly and concrete having improved physical properties without using increased amounts of portland cement, without adding expensive chemical additives and without adding energy to the curing concrete. The insulated concrete slip form 10 also provides the option of reducing the amount of portland cement in the concrete mix, and, therefore, reducing the cost thereof while improving concrete properties and performance.

After the insulated concrete slip forms 100-106 have been moved upwardly, to set up for a new lift of concrete, a layer of insulating material 110, 112, 114, 116 is attached to the bottom of each of the fours insulated concrete slip forms, respectively. The layers of insulating material 110-116 surround the still curing concrete 118 from the previous concrete pour that is exposed by the uplifted insulated concrete slip forms 100-106. The layers of insulating material 110-116 are of a length sufficient to cover, or substantially cover, the exposed previous concrete 118 pour lift. As used herein, the term "substantially cover" shall mean covering at least 80% of the surface area of an object. Preferably, the layers of insulating material 110-116 are the same length as the insulated concrete slip forms 110-106. However, under certain conditions it may be desirable to have one or more additional layers of insulating material (not shown) identical to the layers of insulating material 110-116 attached to the bottom of the layers of insulating material 110-116 so that they hang below the layers of insulating material 110-116 and surround the concrete 118 pour lift and potentially other previous concrete pour lifts (not shown). Alternatively, the layers of insulating material 110-116 can have a length that is two or three times the length of the insulated concrete slip forms 100-106. The length is only dictated by the number of concrete pour lifts desired to be covered by the layers of insulating material 110-116 in order to retain the heat of hydration for a desired time.

The layers of insulating material 110-116 are made from any suitable material providing heat insulating properties, preferably a sheet of closed cell polymeric foam. The layers of insulating material 110-116 are preferably made from closed cell foams including, but not limited to, polyvinyl chloride, urethane, polyurethane, polyisocyanurate, phenol, polyethylene, polyimide or polystyrene. Such polymeric foam preferably has a density of 1 to 3 pounds per cubic foot, or more. The layers of insulating material 110-116 preferably have insulating properties equivalent to at least 0.25 inches of expanded polystyrene foam, preferably equivalent to at least 0.5 inches of expanded polystyrene foam, preferably equivalent to at least 1 inch of expanded polystyrene foam, more preferably equivalent to at least 2 inches of expanded polystyrene foam, more preferably equivalent to at least 3 inches of expanded polystyrene foam, most preferably equivalent to at least 4 inches of expanded polystyrene foam, especially equivalent to at least 8 inches of expanded polystyrene foam. There is no maximum thickness for the layers of insulating material 110-116 equivalent to expanded polystyrene foam useful in the present invention. The maximum thickness is usually dictated by economics, weight, ease of handling and building or structure design. However, for most applications a maximum insulating equivalence of 8 inches of expanded polystyrene foam can be used. In another embodiment of the present invention, the layers of insulating material 110-116 have insulating properties equivalent to approximately 0.25 to approximately 8 inches of expanded polystyrene foam, preferably approximately 0.5 to approximately 8 inches of expanded polystyrene foam, preferably approximately 1 to approximately 8 inches of expanded polystyrene foam, preferably approximately 2 to approximately 8 inches of expanded polystyrene foam, more preferably approximately 3 to approximately 8 inches of expanded polystyrene foam, most preferably approximately 4 to approximately 8 inches of expanded polystyrene foam. These ranges for the equivalent insulating properties for the layers of insulating material 110-116 include all of the intermediate values. Thus, the layers of insulating material 110-116 used in another disclosed embodiment of the present invention have insulating properties equivalent to approximately 0.25 inches of expanded polystyrene foam, approximately 0.5 inches of expanded polystyrene foam, approximately 1 inch of expanded polystyrene foam, approximately 2 inches of expanded polystyrene foam, approximately 3 inches of expanded polystyrene foam, approximately 4 inches of expanded polystyrene foam, approximately 5 inches of expanded polystyrene foam, approximately 6 inches of expanded polystyrene foam, approximately 7 inches of expanded polystyrene foam, or approximately 8 inches of expanded polystyrene foam. Expanded polystyrene foam has an R-value of approximately 4 to 6 per inch thickness. Therefore, the layers of insulating material 110-116 should have an R-value of greater than 1.5, preferably greater than 4, more preferably greater than 8, most preferably greater than 12, especially greater than 20, more especially greater than 30, most especially greater than 40. The layers of insulating material 110-116 preferably have an R-value of approximately 1.5 to approximately 40; more preferably between approximately 4 to approximately 40; especially approximately 8 to approximately 40; more especially approximately 12 to approximately 40. The layers of insulating material 110-116 preferably have an R-value of approximately 1.5, more preferably approximately 4, most preferably approximately 8, especially approximately 20, more especially approximately 30, most especially approximately 40.

The layers of insulating material 110-116 can also be made from a refractory insulating material, such as a refractory blanket, a refractory board or a refractory felt or paper. Refractory insulation is typically used to line high temperature furnaces or to insulate high temperature pipes. Refractory insulating material is typically made from ceramic fibers made from materials including, but not limited to, silica, silicon carbide, alumina, aluminum silicate, aluminum oxide, zirconia, calcium silicate; glass fibers, mineral wool fibers, Wollastonite and fireclay. Refractory insulating material is commercially available in various forms including, but not limited to, bulk fiber, foam, blanket, board, felt and paper form. Refractory insulation is commercially available in blanket form as Fiberfrax Durablanket® insulation blanket from Unifrax I LLC, Niagara Falls, N.Y., USA and RSI4-Blank and RSI8-Blank from Refractory Specialties Incorporated, Sebring, Ohio, USA. Refractory insulation is commercially available in board form as Duraboard® from Unifrax I LLC, Niagara Falls, N.Y., USA and CS85, Marinite and Transite boards from BNZ Materials Inc., Littleton, Colo., USA. Refractory insulation in felt form is commercially available as Fibrax Felts and Fibrax Papers from Unifrax I LLC, Niagara Falls. The refractory insulating material can be any thickness that provides the desired insulating properties, as set forth above. There is no upper limit on the thickness of the refractory insulating material; this is usually dictated by economics. However, refractory insulating material useful in the present invention can range from 1/32 inch to approximately 2 inches. Similarly, ceramic fiber materials including, but not limited to, silica, silicon carbide, alumina, aluminum silicate, aluminum oxide, zirconia, calcium silicate; glass fibers, mineral wool fibers, Wollastonite and fireclay, can be suspended in a polymer, such as polyurethane, latex, cement or epoxy, and used as a coating or a polymeric foam to create a refractory insulating material layer. Such a refractory insulating material layer can be used as the layers of insulating material 110-116 to block excessive ambient heat loads and retain the heat of hydration of concrete within the insulated concrete slip forms of the present invention. Ceramic fibers suspended in a polymer binder, such as latex, are commercially available as Super Therm®, Epoxotherm and HPC Coating from Superior Products, II, Inc., Weston, Fla., USA.

The layers of insulating material 110-116 are preferably a multi-layer material with a first layer of refractory insulating material and a second layer of polymeric foam insulating material. The layers of insulating material 110-116 more preferably each comprises a layer of ceramic fibers suspended in polymeric foam and a layer of expanded polystyrene foam. The layers of insulating material 110-116 optionally can each include a layer of radiant heat reflecting material. The layers of insulating material 110-116 are especially preferably each a concrete insulating blanket having the insulating properties described above. Concrete insulating blankets can be made from one or more layers of insulating foam and optionally one or more layers of radiant heat reflective material, such as radiant heat reflective foils, such as aluminum foil. Concrete insulating blankets are commercially available under the designation Micro Foam from Pregis, Lake Forest, Ill.

The layers of insulating material 110-116 are left in place for a time sufficient for the curing concrete there within to further cure. While the layers of insulating material 110-116 are in place, the layers of insulating material 110-116 retain at least a portion, preferably a major portion, of the heat of hydration from the curing concrete 118 surrounded by the layers of insulating material 110-116. By retaining at least a portion of the heat of hydration, the concrete 118 surrounded by the layers of insulating material 110-116 cures more quickly and achieves better physical properties than it would have had it been cured in a conventional concrete slip form; i.e., a non-insulated concrete slip form. This is true for conventional portland cement concrete, but even more so for concrete including significant amounts of supplementary cementitious material, such as slag cement and/or fly ash, as described below. Furthermore, it is desirable to leave the layers of insulating material 110-116 in place with the curing concrete 118 surrounded thereby for a period of approximately 3 hours to approximately 7 days, preferably approximately 3 hours to approximately 3 days, preferably approximately 6 hours to approximately 3 days, more preferably approximately 12 hours to approximately 3 days, especially approximately 12 hours to approximately 2 days, more especially approximately 12 hours to approximately 24 hours, most especially approximately 1 hour to 24 hours. After the concrete 118 has cured to a desired amount or degree, the layers of insulating material 110-116 can be moved upwardly along with the insulated concrete slip forms 100-106, thereby exposing the concrete 118 to the environment.

After the insulated concrete slip forms 100-106 have been moved upwardly, the layer of insulating material 108 is removed from the top of the insulated concrete slip forms and additional plastic concrete 120 is added to the space defined between the insulated concrete slip forms. The layer of insulating material 108 is then placed back on top of the insulated concrete slip forms 100-106 and the plastic concrete 120 therein. The insulated concrete slip forms 100-106 and the layer of insulating material 108 are left in place until the concrete 120 has achieve a desired amount or degree of cure. The insulated concrete slip forms 100-106 and the layer of insulating material 108 are left in place for a period of time as disclosed above. After the concrete 120 within the insulated concrete slip forms 100-106 has achieved a desired amount or degree of cure, the insulated concrete slip forms 100-106 are then moved upwardly and the process repeated until the concrete structure has achieve a desired height or size.

While the plastic concrete 120 of the top or most recent pour lift in the insulated concrete slip forms 100-106 is poured fresh, it will reach its maximum temperature and maintain that temperature for a desired amount of time; while the concrete 118 from the previous concrete pour lift bellow the insulated concrete slip forms 100-106 and surrounded by the layers of insulating material 110-116, will either retain the maximum temperature for a desired amount of time or the temperature of the concrete will gradually be reduced. Therefore as the insulated concrete slip form 100-106 assembly elevates one lift at a time, the hottest concrete 120 is at the top of the slip form assembly where the most recent concrete lift is placed. Below, the concrete 118 is preferably gradually cooled from its maximum temperature to ambient temperature over several days. If the length of the layers of insulated material 110-116 is the same as the slip form 100-106, then the concrete 118 bellow the most recent concrete 120 will also retain some of the heat of hydration. As the slip form advances upwardly, the concrete lift pour bellow the concrete 118 is exposed to the environment at the point where it would have achieved the desired cure and strength properties. Once the concrete lift pour bellow the insulated layers 110-116 is exposed to the environment, it will loose the heat of hydration and moisture at an accelerated rate, thereby slowing the curing and maturity process. If the concrete lift pours bellow the concrete 118 has not achieved the desired cure or properties and therefore cannot yet be exposed to the environment and allowed to lose heat and moisture, then the layers of insulated material 110-116 can be of greater length than the length of the insulated concrete slip forms 100-106. For example, if the layers of insulating material 110-116 are twice the length of the insulated concrete slip forms 100-106, two previous concrete lift pours would be covered by the layers of insulating material 110-116 thereby preventing heat and moisture loss for an additional period of time. The purpose of the insulated concrete slip forms 100-106, along with the layers of insulating material 110-116, is to retain as much of the heat of hydration and moisture within the curing concrete structure for as long as possible to accelerate concrete curing and reduce temperature shrinkage cracking. Also, as the entire concrete slip form assembly moves vertically upwardly, it will allow for a gradual exposure of the curing concrete to the environment, so that the loss of heat and moisture will not adversely impact the concrete curing and concrete properties in the same manner as conventional non-insulating concrete slip forms do. By retaining the heat of hydration, the concrete matures faster thereby achieving its maximum properties much earlier than it would in a conventional form. By gradually losing heat from the top concrete 120 lift of the most recent concrete pour to the concrete 118 lifts bellow, the concrete is cooled after it has achieved far greater strength than in a conventional form. Therefore, the gradual cooling achieved by the concrete slip forms 100-106 and layer of insulating material 110-116 of the present invention reduces, or completely eliminates, temperature shrinkage cracking associated with conventional concrete curing while accelerating concrete curing and strength gain.

In some applications, it may be desirable to use an electrically heated concrete slip form. FIGS. 8-14 show a disclosed embodiment of an electrically heated concrete slip form 200 in accordance with the present invention. The electrically heated concrete slip form 200 comprises a rectangular concrete forming panel 202 supported by a rectangular frame 208, which is made from a rigid material, such as wood, steel or aluminum. The frame 208 comprises two elongate longitudinal members 210, 212 and two elongate transverse members 214, 216. The longitudinal members 210, 212 and the transverse members 214, 216 are attached to each other and to the panel 202 by any suitable means, such as by welding or bolting. The frame 208 also comprises at least one, and preferably a plurality, of transverse bracing members 218, 220, 222, 224, 226, 228, 230, 232, 234. The transverse bracing members 218-234 are attached to the longitudinal members 210, 212 and to the panel 202 by any suitable means known in the art. The frame 208 also includes bracing members 236, 238 and 240 (and a fourth bracing member not shown). The bracing members 236, 238 extend between the transverse member 214 and the bracing member 218. The bracing members 236, 238 are attached to the transverse member 214 and the bracing member 218 and to the panel 202 by any suitable means, such as by welding. The bracing member 240 extends between the transverse member 216 and the bracing member 234 (a second bracing member is used between the transverse member 216 and the bracing member 234 but is not shown). The bracing member 240 is attached to the transverse member 216 and the bracing member 234 and to the panel 202 by any suitable means, such as by welding. The frame 208 helps prevent the panel 202 from flexing or deforming under the hydrostatic pressure of plastic concrete placed between two identical forms 200. Aluminum frames of the foregoing design are available from Wall-Ties & Forms, Inc., Shawnee, Kans. and Wall Formwork of Doka, Amstetten, Austria and Lawrenceville, Ga., USA. However, the particular design of the frame 208 is not critical to the present invention. There are many different designs of frames for concrete slip forms and they are all applicable to the present invention.

The present invention departs from conventional prior art concrete slip forms, as explained below. The concrete forming panel 202 comprises a concrete forming face or first panel 241 made from a heat conducting material, such as aluminum or steel. Most prior art concrete forms use wood, plywood, wood composite materials, or wood or composite materials with polymer coatings for the concrete forming panel of their concrete forms. Although wood, plywood, wood composite materials, plastic or wood or composite materials with polymer coatings are not very good conductors of heat, they do conduct some heat. Therefore, wood, plywood, wood composite materials, and wood or composite materials with polymer coatings are considered useful materials from which to make the panel 202, although they are not preferred. The first panel 241 has a first primary surface 242 for contacting plastic concrete and an opposite second primary surface 243. The first primary surface 242 is usually smooth and flat and is designed for contacting and forming plastic concrete.

Disposed on the second primary surface 243 of the first panel 241 is an electric resistance heating ribbon, tape or wire 244. The electric resistance heating wire 244 produces heat when an electric current is passed through the wire. Electric resistance heating ribbons, tapes or wires are known and are the same type as used in electric blankets and other electric heating devices. The electric resistance heating wire 244 is electrically insulated so that it will not make electrical contact with the first panel 241. However, the electric resistance heating wire 244 is in thermal contact with the first panel 241 so that when an electric current is passed through the electric resistance heating wire it heats the first panel. The electric resistance heating wire 244 is placed in a serpentine path on the second primary surface 243 of the first panel 241 so that the first panel is heated uniformly. The electric resistance heating wire 244 is of a type and the amount of wire in contact with the first panel 241 is selected so that the electric resistance heating wire will heat the panel to a temperature at least as high as the desired temperature of the concrete. The electrically heated concrete slip form 200 can also be used to accelerate the curing of conventional concrete, as described below. Therefore, it is desirable that the first panel 241 be able to be heated to temperatures sufficient to accelerate the curing of the concrete, such as at least as high as 50 to 70° C.

Also disposed on the second primary surface 243 of the first panel 241 is a layer of insulating material 246. The layer of insulating material 246 is preferably a closed cell polymeric foam, such as expanded polystyrene, polyisocyanurate, polyurethane, and the like. The layer of insulating material 246 has insulating properties equivalent to at least 0.5 inches of expanded polystyrene foam; preferably equivalent to at least 1 inch of expanded polystyrene foam, preferably equivalent to at least 2 inches of expanded polystyrene foam, more preferably equivalent to at least 3 inches of expanded polystyrene foam, most preferably equivalent to at least 4 inches of expanded polystyrene foam. The layer of insulating material 246 can have insulating properties equivalent to approximately 0.5 inches to approximately 8 inches of expanded polystyrene foam. The layer of insulating material 246 can have insulating properties equivalent to approximately 0.5 inches, approximately 1 inch, approximately 2 inches, approximately 3 inches or approximately 4 inches of expanded polystyrene foam. The layer of insulating material 246 can have an R-value of greater than 2.5, preferably greater than 5, preferably greater than 10, more preferably greater than 15, especially greater than 20. The layer of insulating material 246 preferably has an R-value of approximately 5 to approximately 40; more preferably between approximately 10 to approximately 40; especially approximately 15 to approximately 40; more especially approximately 20 to approximately 40. The layer of insulating material 246 preferably has an R-value of approximately 5, more preferably approximately 10, especially approximately 15, most preferably approximately 20.

The electric resistance heating wire 244 is disposed between the layer of insulating material 246 and the second primary surface 243 of the first panel 241. Optionally, the surface of the layer of insulating material 246 opposite the second primary surface 243 of the first panel 241 includes a layer of radiant heat reflective material (not shown), such as metal foil, especially aluminum foil. The layer of radiant heat reflective material helps direct the heat from the electric resistance heating wire 244 toward the first panel 241. The layer of insulating material 246 can be preformed and affixed in place on the second primary surface 243 of the first panel 241, or the layer of insulating material can be formed in situ, such as by spraying a foamed or self-foaming polymeric material onto the second primary surface of the first panel. Another preferred material for the layer of insulating material 246 is metalized plastic bubble pack type insulating material or metalized closed cell polymeric foam. Such material is commercially available as Space Age® reflective insulation from Insulation Solutions, Inc., East Peoria, Ill. 61611. The Space Age® product is available as two layers of polyethylene air bubble pack sandwiched between one layer of white polyethylene and one layer of reflective foil; two layers air bubble pack sandwiched between two layers of reflective foil; or a layer of closed cell polymeric foam (such as high density polyethylene foam) disposed between one layer of polyethylene film and one layer of reflective foil. All three of these Space Age® product configurations are useful in the present invention for the radiant heat reflective material 246.

Disposed on the layer of insulating material 246 is a second panel 248 of heat insulating material. The second panel 248 is disposed between the layer of insulating material 246 and the frame 208. The second panel 248 is made from heat insulating material or poor heat conducting material including, but not limited to, wood, plywood, wood composite materials and plastic. The second panel 248 is preferably made from a sheet of high density overlay (HDO) plywood. The second panel 248 can be any useful thickness depending on the anticipated loads to which the form will be subjected. However, plywood thicknesses of ⅛ inch to ⅞ inches can be used. The first panel 241, the layer of insulating material 246 and the second panel 248 are preferably laminated into a single unit either adhesively or mechanically.

Figure 15:
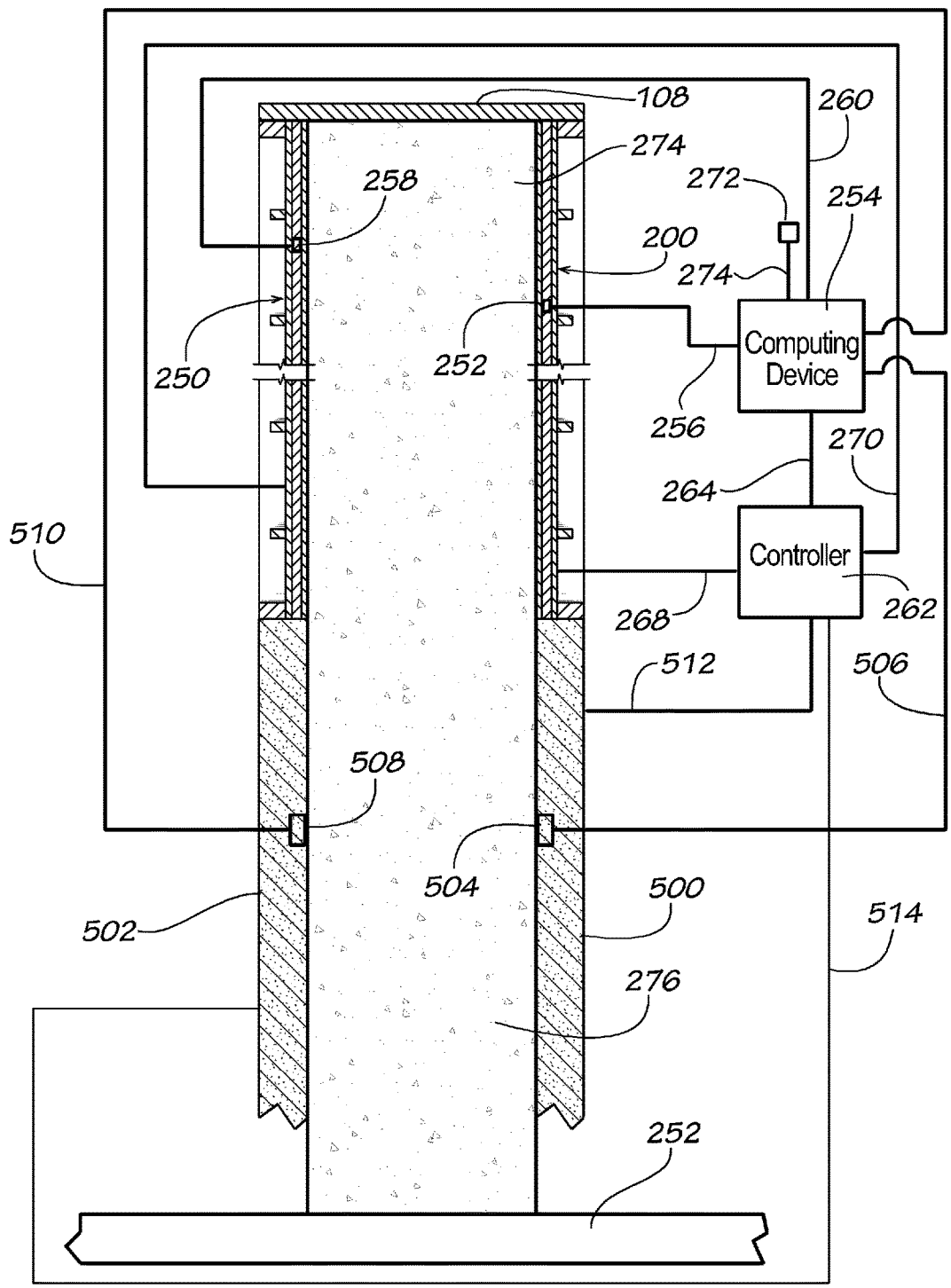
FIG. 15 is a schematic view of a disclosed embodiment of an electrically heated concrete slip form assembly in accordance with the present invention.

Use of the electrically heated concrete slip form 200 will now be considered in another disclosed embodiment. The electrically heated concrete slip form 200 can be used in the same manner as the insulated concrete slip forms 100-106 as described above. In another disclosed embodiment, as shown in FIG. 15, there is a first vertically oriented electrically heated concrete slip form 200 and an identical second vertically oriented electrically heated concrete slip form 250 horizontally spaced from the first form to provide a concrete receiving space there between. The electrically heated concrete slip forms 200, 250 can be used to form conventional elevated structures or mass concrete structures, such as walls, piers, columns, etc. The electrically heated concrete slip forms 200, 250 sit on a concrete footing or concrete slab 252 (FIG. 15).

Figure 11:
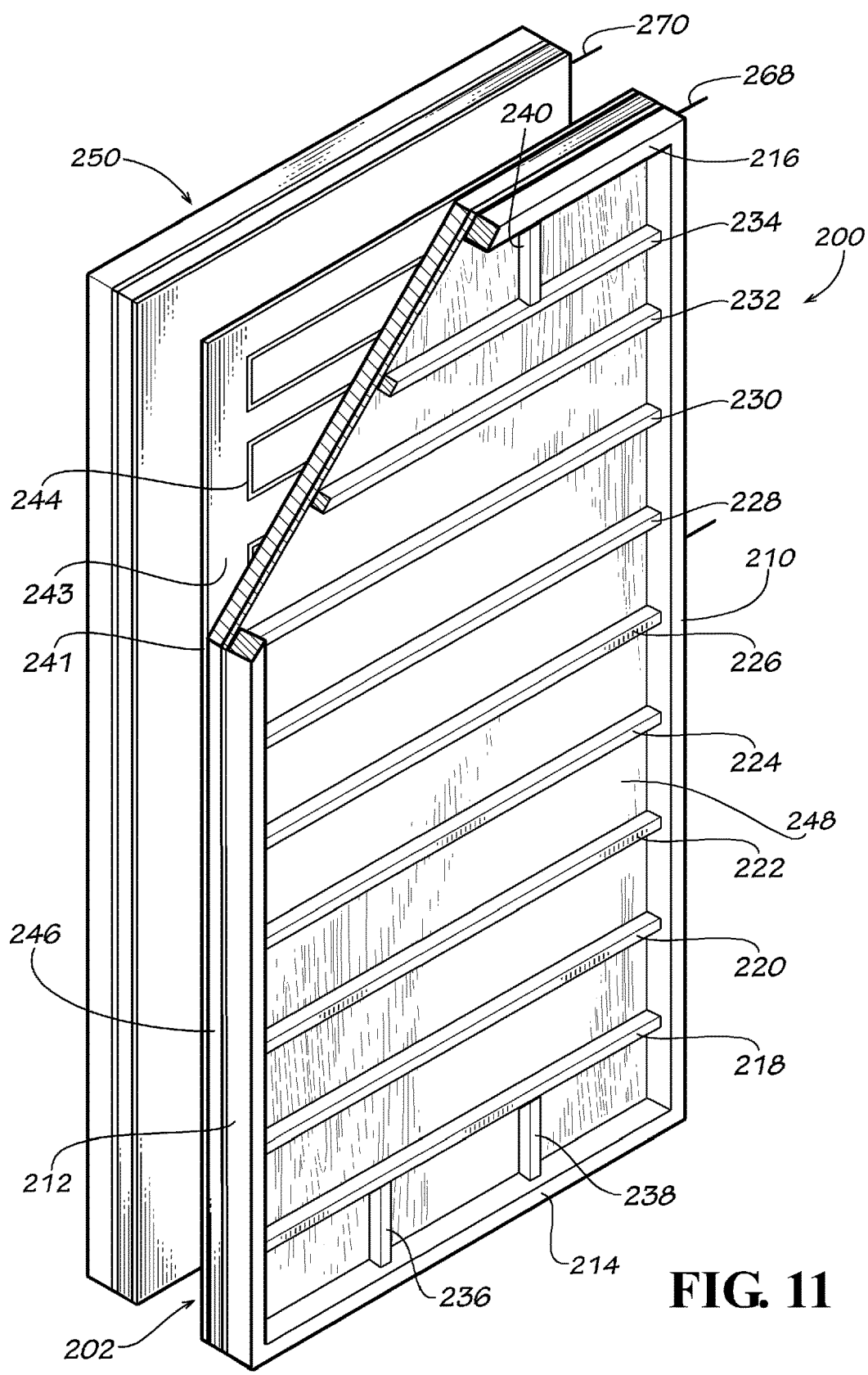
FIG. 11 is a partially broken away perspective view of an electrically heated concrete slip form in accordance with the present invention.
Figure 12:
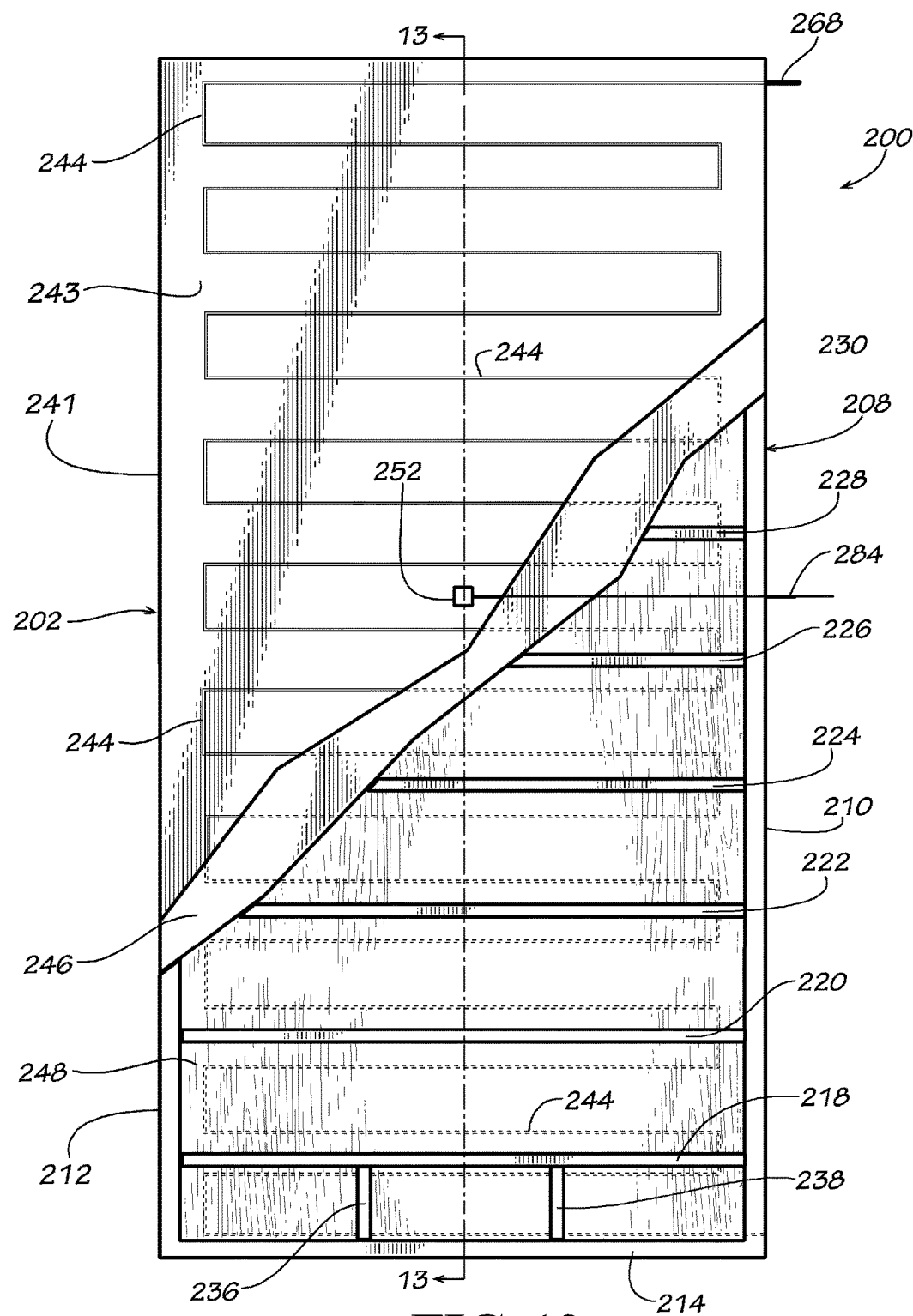
FIG. 12 is a partially broken away front view of the electrically heated concrete slip form shown in FIG. 11.

When greater control of the temperature of the electrically heated concrete slip forms 200, 250 is desired, a first temperature sensor 252 in thermal contact with the second primary surface 243 of the first panel 241 of the electrically heated concrete slip form 200 is preferably used (FIGS. 11, 12 and 15). The first temperature sensor 252 is connected to a computing device 254 by an electric circuit, such as by the wires 256. The electrically heated concrete slip form 250 also preferably includes a temperature sensor 258 in thermal contact with the second primary surface 243 of the first panel 241 (FIG. 15). The temperature sensor 258 is connected to the computing device 254 by an electric circuit, such as by the wires 260. The temperature sensors 252, 258 allow the computing device 254 to continuously, or periodically, read and store the temperature of the panel 202 on each of the electrically heated concrete slip forms 200, 250. The computing device 254 is connected to a panel/blanket temperature controller 262 by an electric circuit, such as by the wires 264. The temperature controller 262 is connected to a source of electricity, such as 12, 24, 48, 120 or 220 volts AC or 12 or 24 volts DC electric current, by wires (not shown). The lower voltages are desirable as they eliminate the chances of electrocution by a worker touching the metal frame in a wet environment. The temperature controller 262 is also connected to the electric resistance heating wire 244 of the electrically heated concrete slip form 200 by an electric circuit, such as by the wires 268. The temperature controller 262 is also connected to the electric resistance heating wire 244 of the electrically heated concrete slip form 250 by an electric circuit, such as by the wires 270. The computing device 254 and the temperature controller 262 are configured and programmed such that the computing device controls the amount of heat produced by the electrical resistance heating wire 244 in each of the electrically heated concrete slip forms 200, 250. Thus, the computing device 254 controls the amount of heat that is provided to plastic concrete disposed between the electrically heated concrete slip forms 200, 250. A third temperature 272 sensor is optionally placed adjacent the electrically heated concrete slip forms 200, 250. The third temperature sensor 272 is connected to the computing device 256 by an electric circuit, such as by the wires 274. The third temperature sensor 272 measures the ambient temperature of the air surrounding the electrically heated concrete slip forms 200, 250.

Operation of the electrically heated concrete slip forms 200, 250 in various modes will now be considered. In its simplest mode, the electrically heated concrete slip forms 200, 250 (FIGS. 8-12) are operated in an on/off mode. In this mode, a constant amount of electricity is provided to the electric resistance heating wire 244 of each of the electrically heated concrete slip forms 200, 250 (FIGS. 8-14) so that a constant amount of heat is provided to the panel 202 of each of the electrically heated concrete slip forms 200, 250. Thus, an operator can turn the heat on and turn the heat off. For this mode of operation, no computing device and no temperature sensors are required; a simple controller 262 with an on/off switch (not shown) will suffice.

In the next mode of operation, various fixed amounts of electricity are provided to the electric resistance heating wire 244 of each of the electrically heated concrete slip forms 200, 250, such as a low amount, a medium amount and a high amount or the electric resistance heating wire is energized for different periods of time, such as a short, medium and long time. This can be done by providing a different voltage to the electric resistance heating wire 244 or by changing the amount of time that the electric resistance heating wire is energized in each of the electrically heated concrete slip forms 200, 250 (FIGS. 8-12). Thus, an operator can select one of several predetermined amounts of heat provided to the panel 902 of each of the electrically heated concrete slip forms 200, 250. For this mode of operation, no computing device and no temperature sensors are required; a simple controller 262 with a selector switch (not shown) will suffice.

The next mode of operation is for the panel 202 of each of the electrically heated concrete slip forms 200, 250 to be held at a constant desired temperature. For this more of operation, the computing device 254 is programmed to perform the process shown in FIG. 16.

Figure 16:
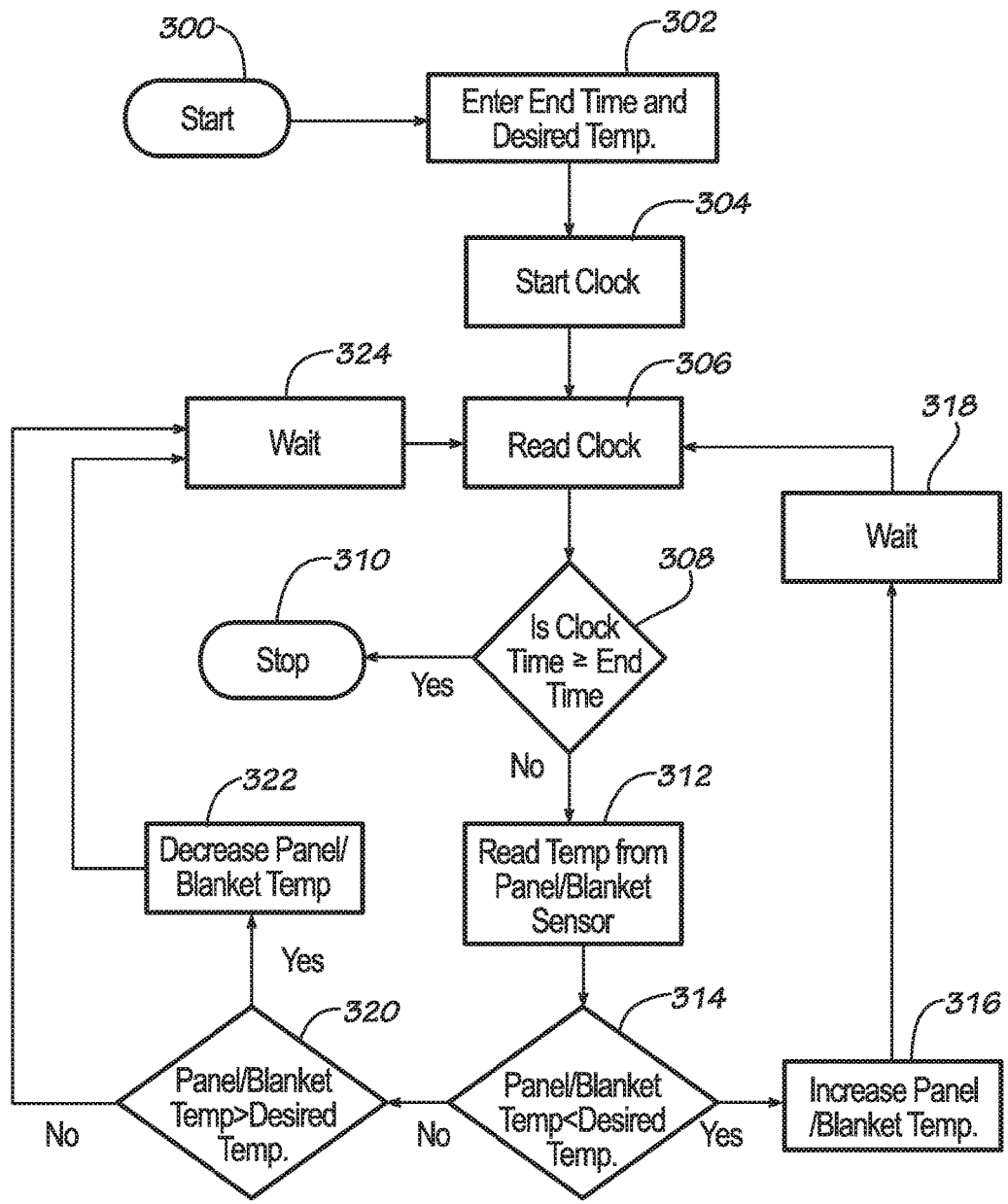
FIG. 16 is a flow diagram of a disclosed embodiment of a temperature controlled concrete curing process utilizing an electrically heated concrete slip form assembly in accordance with the present invention.

As shown in FIG. 16, the process starts at the block 300 and proceeds to the block 302 where a desired end time and a desired temperature are entered. These values are stored in memory locations, such as in the RAM memory of the computing device 254. The end time is the desired amount of temperature controlled curing time for the concrete between the electrically heated concrete slip forms 200, 250. The desired temperature is the temperature at which the panel 202 of each of the electrically heated concrete slip forms 200, 250 will be maintained even though the ambient temperature may change. Any desired temperature can be selected. However, it is preferred that the desired temperature is preferably about 50° C.; more preferably about 55° C.; most preferably about 60° C.; especially about 65° C.; more especially about 70° C.; most especially about 63° C. The process proceeds from the block 302 to the block 304 where the clock is initialized to time equal to zero and the clock is started. The clock measures the elapsed time from when the plastic concrete between the electrically heated concrete slip forms 200, 250 is subjected to the controlled temperature curing process.

The process proceeds from the block 304 to the block 306 where the clock is read. The time that is read from the clock is then stored in a memory location, such as in the RAM memory of the computing device 254. The process proceeds from the block 306 to the decision block 308. A desired end time for terminating the process, such as 1 hour to 7 days, is entered into a memory location in the computing device 254 at the block 302. At the block 308, the clock time stored in the memory location is compared to the end time stored in the memory location of the computing device 254. If the clock time is less than the end time, the process proceeds to the block 312. If the clock time is greater than or equal to the end time, the process proceeds to the block 310 where the process is terminated.

At the block 312, the temperature from the panel temperature sensors 252, 258 is read and stored in memory locations, such as in the RAM memory of the computing device 254. The process then proceeds from the block 312 to the decision block 314. At the decision block 314, the temperature from the panel temperature sensors 252, 258 is compared to the stored desired temperature. If the measured panel temperature is less than the stored desired temperature, the process proceeds to the block 316. When this condition is encountered, the panel temperature is less than the desired temperature, so it is necessary to provide additional heat to the panel 202 of each of the electrically heated concrete slip forms 200, 250 (FIGS. 8-12). At the block 316 the temperature of the panel 202 of each of the electrically heated concrete slip forms 200, 250 is increased. This can be done by the computing device 254 sending a signal to the panel/blanket temperature controller 262 providing an increased electrical voltage to the electrical resistance heating wire 244 or by increasing the time that the electrical resistance heating wire is energized of each of the electrically heated concrete slip forms 200, 250. The process then proceeds from the block 316 to the block 318. At the block 318, a predetermined wait time is executed before the process proceeds from the block 318 to the block 306. The wait time can be any desired time that is suitable for the panel temperature being measured, such as one second or ten seconds or 30 seconds or one minute or one hour. If the actual measured panel temperature is greater than or equal to the desired temperature, the process proceeds from the decision block 314 to the decision block 320.

At the decision block 320, if the actual measured panel temperature is greater than the stored desired temperature, the process proceeds to the block 322. At the block 322, the temperature of the panel 202 of each of the electrically heated concrete slip forms 200, 250 is decreased. This can be done by the computing device 254, sending a signal to the panel/blanket temperature controller 256, to decrease the temperature of the electrical resistance heating wire 244 in each of the electrically heated concrete slip forms 200, 250 (FIG. 8-12). This can be done by the temperature controller 262 providing a reduced electrical voltage to the electrical resistance heating wire 244 or by reducing the time that the electrical resistance heating wire is energized for of each of the electrically heated concrete slip forms 200, 250. The process then proceeds from the block 322 to the block 324. At the block 324, a predetermined wait time is executed before the process proceeds from the block 324 to the block 306. The wait time can be any desired time that is suitable for the temperature of the panel 202 being measured, such as one second or ten seconds or 30 seconds or one minute or one hour. If the actual measured panel temperature is not greater than the stored desired temperature, the process proceeds to the block 324. At the decision block 320, if the actual measured panel temperature is less than or equal to the stored desired temperature, the process proceeds to the block 322. At the block 322, the temperature of the panel 202 of each of the electrically heated concrete slip forms 200, 250 is decreased. This can be done by the computing device 254 sending a signal to the panel/blanket temperature controller 262 providing a reduced electrical voltage to the electrical resistance heating wire 244 or by reducing the time that the electrical resistance heating wire is energized of each of the electrically heated concrete slip forms 200, 250. The process then proceeds from the block 322 to the block 324.

FIG. 14 shows a graph of a disclosed embodiment of a desired curing temperature profile for concrete as a function of time. In this graph, the temperature of the concrete is shown on the vertical axis and elapsed concrete curing time is shown on the horizontal axis. The intersection of the vertical and horizontal axes represents 0° C. concrete temperature and zero elapsed concrete curing time. Ambient temperature is also shown on this graph. The peaks and troughs of the ambient temperature represent the daily (i.e., day to night) fluctuation of ambient temperature. As can be seen in this graph, the temperature of the concrete initially increases quite rapidly over a relatively short time, such as 1 to 3 days. After a period of time, the concrete temperature reaches a maximum and then slowly drops to ambient temperature over an extended period, such as 1 to 7 days, preferably 1 to 14 days, more preferably 1 to 28 days, especially 3 to 5 days or more especially 5 to 7 days. The maximum temperature will vary depending on the composition of the concrete mix. However, it is desirable that the maximum temperature is at least 35° C., preferably, at least 40° C., at least 45° C., at least 50° C., at least 55° C., at least 60° C. or at least 65° C. The maximum concrete temperature should not exceed about 70° C. The maximum concrete temperature is preferably about 70° C., about 69° C., about 68° C., about 67° C., about 66° C., about 65° C., about 64° C., about 63° C., about 62° C., about 61° C., about 60° C. or about 60 to about 70° C. Furthermore, it is desirable that the temperature of the concrete is maintained above approximately 30° C., approximately 35° C., approximately 40° C., approximately 45° C., approximately 50° C., approximately 55° C. or approximately 60° C. for 1 to approximately 4 days from the time of concrete placement, preferably 1 to approximately 3 days from the time of concrete placement, more preferably about 1 hour to about 3 days from the time of concrete placement, most preferably about 1 hour to about 2 days from the time of concrete placement, especially about 1 hour to about 24 hours. It is also desirable that the temperature of the concrete is maintained above approximately 30° C. for 1 to approximately 7 days from the time of concrete placement, preferably above approximately 35° C. for 1 to approximately 7 days from the time of concrete placement, more preferably above approximately 40° C. for 1 to approximately 7 days from the time of concrete placement, most preferably above approximately 45° C. for 1 to approximately 7 days from the time of concrete placement. It is also desirable that the temperature of the concrete be maintained above ambient temperature for 1 to approximately 3 days from the time of concrete placement; 1 to approximately 5 days from the time of concrete placement, for 1 to approximately 7 days from the time of concrete placement, for 1 to approximately 14 days from the time of concrete placement, preferably approximately 3 to approximately 14 days from the time of concrete placement, especially approximately 7 to approximately 14 days from the time of concrete placement. It is also desirable that the temperature of the concrete be maintained above ambient temperature for approximately 3 days, approximately 5 days, approximately 7 days or approximately 14 days from the time of concrete placement. It is further desirable that the temperature of the concrete be reduced from the maximum temperature to ambient temperature gradually, such as in increments of approximately 0.5 to approximately 5° C. per day, preferably approximately 1 to approximately 2° C. per day, especially approximately 1° C. per day. The electrically heated concrete slip form is preferably kept on the curing concrete until the concrete is strong enough such that cracking due to temperature shrinkage will not occur from further cooling. Different curing temperature profiles may apply to different concrete mix designs and/or different materials used for the cementitious portion of the concrete mix in order to achieve a desired concrete strength or a desired concrete strength within a desired period of time in different weather conditions. However, all curing temperature profiles in accordance with the present invention will have the same general shape as shown in FIG. 14 relative to ambient temperature. Thus, as used herein the term "temperature profile" includes increasing the concrete temperature above ambient temperature over a period of time followed by decreasing the concrete temperature over a period of time, preferably to ambient temperature, wherein the slope of a line plotting temperature versus time during the temperature increase phase is greater than the absolute value of the slope of a line plotting temperature versus time during the temperature decrease phase. Furthermore, the absolute value of the slope of a line plotting temperature versus time during the temperature decrease phase of the temperature profile in a concrete form in accordance with the present invention is less than the absolute value of the slope of a line plotting temperature versus time if all added heat were stopped and the concrete were simply allowed to cool in a conventional concrete form; i.e., an uninsulated concrete form, under the same conditions. The term "temperature profile" includes the specific ranges of temperature increase and ranges of temperature decrease over ranges of time as set forth above with respect to FIG. 17. The term "temperature profile" includes increasing the temperature of curing concrete in a concrete form or mold to a maximum temperature at least 10% greater than the maximum temperature the same concrete mix would have reached in a conventional (i.e., non-insulated) concrete form or mold of the same configuration. The term "temperature profile" also includes reducing the temperature of curing concrete in a concrete form or mold from its maximum temperature at a rate slower than the rate the same concrete mix would reduce from its maximum temperature in a conventional (i.e., non-insulated) concrete form or mold of the same configuration. The principle behind concrete maturity is the relationship between strength, time, and temperature in young concrete. Maturity is a powerful and accurate means to predict early strength gain. Concrete maturity is measured as "equivalent age" and is given in temperature degrees×hours (either ° C.-Hrs or ° F.-Hrs). The term "temperature profile" includes controlling the temperature of curing concrete so that at 3 days it has a concrete maturity or equivalent age at least 25% greater than the same concrete mix would have in a conventional (i.e., non-insulated) concrete form or mold of the same configuration under the same conditions; preferably at least 30% greater, more preferably at least 35% greater, most preferably at least 40% greater, especially at least 45% greater, more especially at least 50% greater. The term "temperature profile" includes controlling the temperature of curing concrete so that at 3 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" includes controlling the temperature of curing concrete so that at 7 days it has a concrete maturity or equivalent age about 70% greater than the same concrete mix would have when cured in accordance with ASTM C-39; preferably at least 75% greater, more preferably at least 80% greater, most preferably at least 85% greater, especially at least 90% greater, more especially at least 95% greater, most especially at least 100% greater. The term "temperature profile" specifically does not include adding a constant amount of heat to the concrete followed by stopping adding heat to the concrete, such as would be involved when turning an electrically heated blanket or heated concrete form on and then turning the heated blanket or heated concrete form off. The term "temperature profile" specifically does not include maintaining the concrete at a constant temperature followed by stopping adding heat to the concrete, such as would be involved when turning an electrically heated blanket or heated concrete form on and then turning the heated blanket or heated concrete form off. The term "temperature profile" also specifically does not include heating the concrete to a desired temperature and then stopping adding heat to the concrete.

Figure 17:
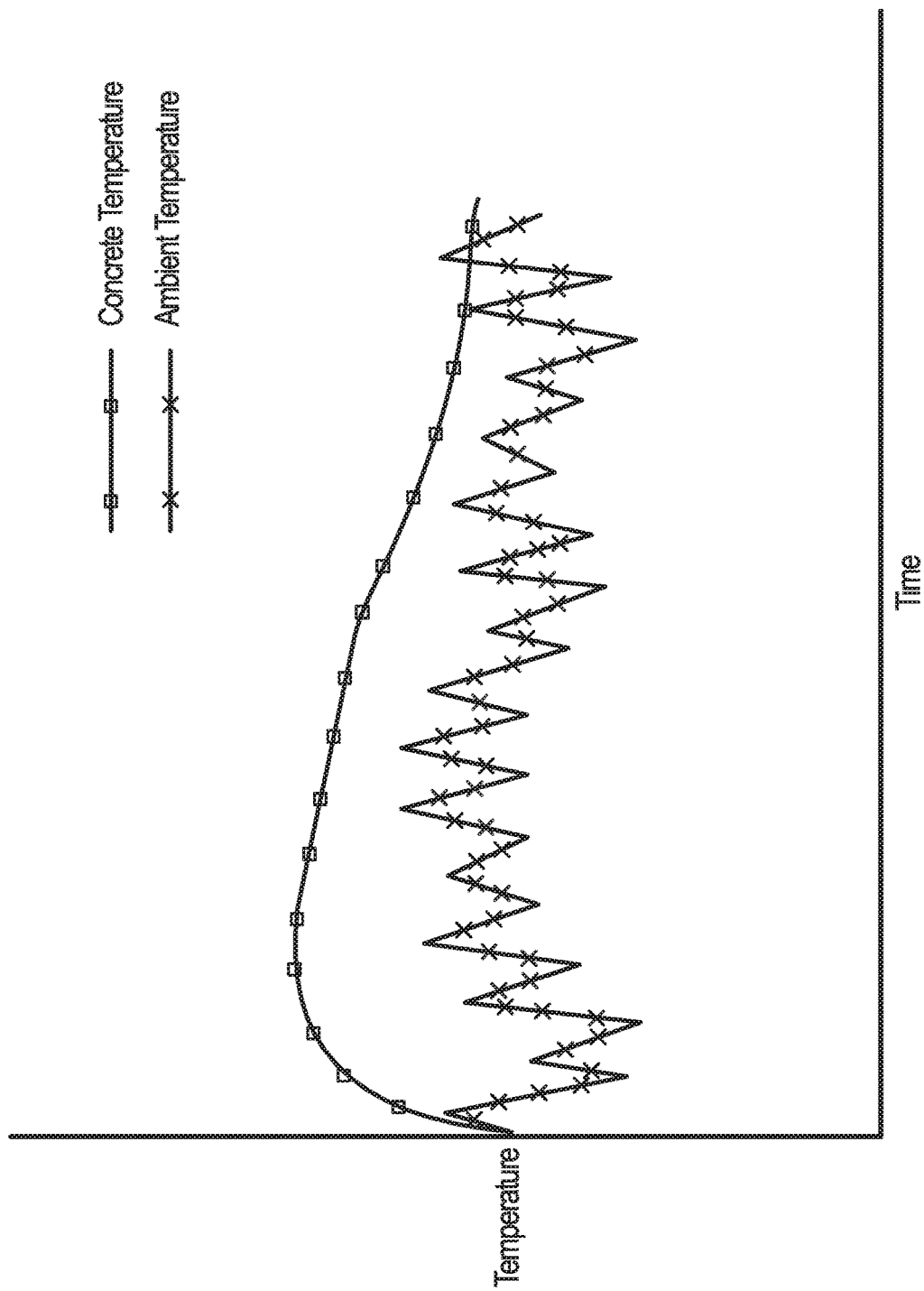
FIG. 17 is a graph of concrete temperature versus elapsed concrete curing time of a disclosed embodiment of a curing temperature profile for concrete in accordance with the present invention. An example of ambient temperature is also shown on the graph.
Figure 18:
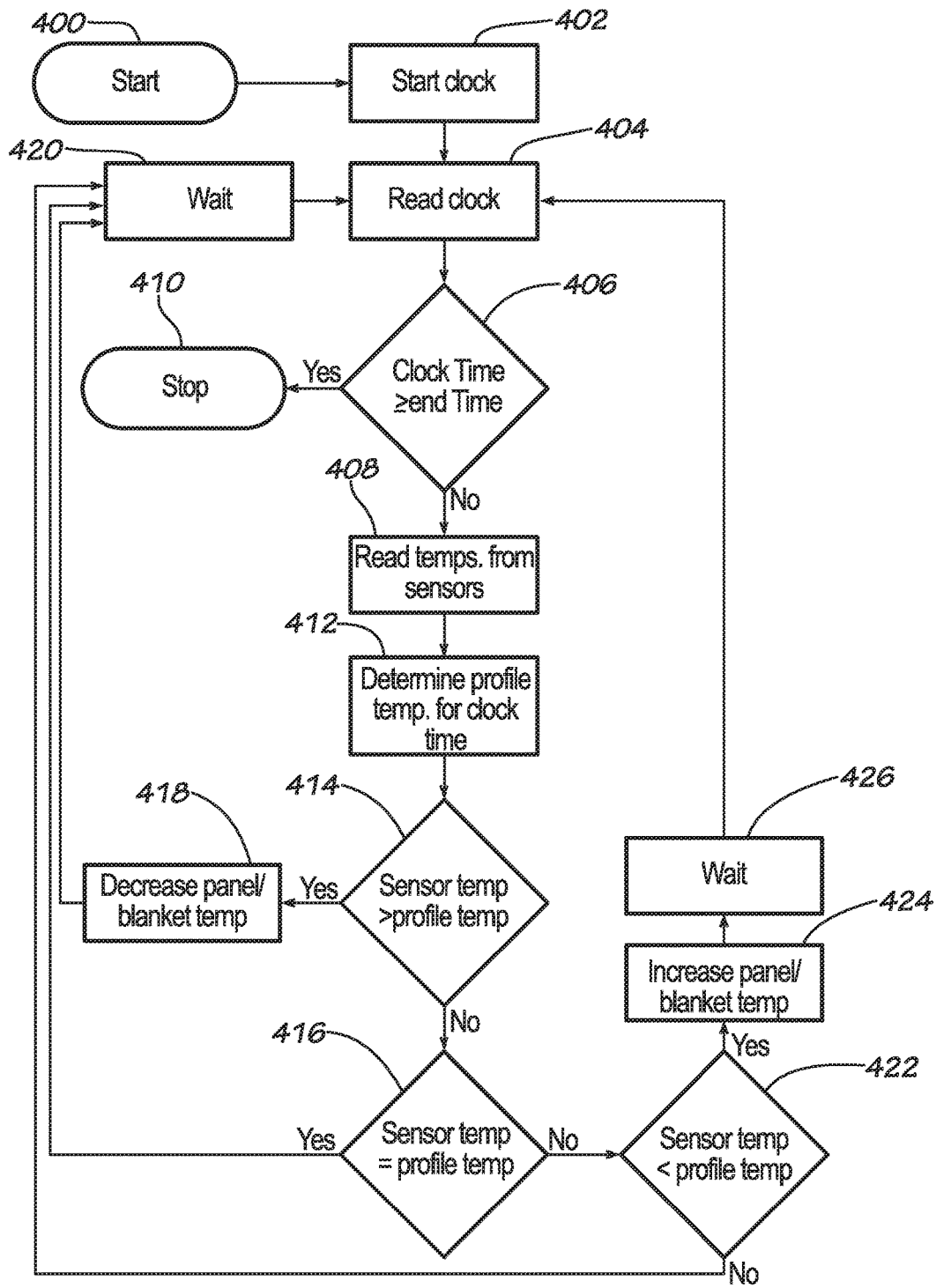
FIG. 18 is a flow diagram of another disclosed embodiment of a temperature controlled concrete curing process utilizing an electrically heated concrete slip form assembly in accordance with the present invention.

FIG. 18 shows an alternate disclosed embodiment of a flow diagram for a process for controlling the heat provided to concrete so that the temperature of the concrete can be controlled to follow a desired predetermined temperature profile, such as that shown in FIG. 17, using the electrically heated concrete slip forms 200, 250 (FIGS. 8-15). The computing device 254 is programmed so that it will perform the process shown by this flow diagram.

The process starts at the block 400 and proceeds to the block 402 where a clock is initialized to time equal to zero and the clock is started. The clock measures the elapsed time from when the concrete is placed into the insulated concrete form or mold. This elapsed time therefore is a measure of the elapsed time for the curing of the concrete.

The process proceeds from the block 402 to the block 404 where the clock is read. The time that is read from the clock is then stored in a memory location, such as in the RAM memory of the computing device 254. The process proceeds from the block 404 to the decision block 406. A desired end time for terminating the process, such as 1 hour to 7 days, is preprogrammed into a memory location in the computing device 254. At the block 406, the clock time stored in the memory location is compared to the end time stored in the memory location of the computing device 254. If the clock time is less than the end time, the process proceeds to the block 408. If the clock time is greater than or equal to the end time, the process proceeds to the block 410 where the process is terminated.

At the block 408, the temperature from the temperature sensor 252, 258 on second primary surface 206 of the plate 202 of each of the electrically heated concrete slip forms 200, 250 (FIGS. 8-15) is read and stored in a memory location, such as in the RAM memory of the computing device 254. The process then proceeds from the block 408 to the block 412.

At the block 412 the temperature from the predetermined temperature profile is determined for the clock time stored in the memory location. This can be done from the temperature profile curve, such as the curve shown in FIG. 17. The clock time is found on the horizontal axis and the temperature is determined by finding the vertical axis component of the curve for the time corresponding to the clock time. When this temperature is determined, it is stored in a memory location, such as in the RAM memory of the computing device 254. In an alternate disclosed embodiment, instead of using a graph, such as shown in FIG. 17, the temperature profile can be in the form of a lookup table. The lookup table lists a range of times and a profile temperature corresponding to each range of time. The process then proceeds from the block 412 to the decision block 414.

At the decision block 414 the temperature of the concrete, which in this case is assumed to be the temperature of the plate 202 of each of the electrically heated concrete slip forms 200, 250 (FIGS. 8-15) as measured by the sensors 252, 258, is compared to the profile temperature corresponding to the stored clock time. If the plate 202 temperature is greater than the profile temperature, the process proceeds to the block 418. When this condition is encountered, the temperature of the concrete is greater than the profile temperature, so it is not necessary to provide additional heat to the concrete so that the temperature of the concrete will equal the profile temperature. Therefore, at the block 418 the temperature of the plate 202 on each of the electrically heated concrete slip forms 200, 250 (FIGS. 8-15) is decreased. This can be done by the computing device 254 sending a signal to the temperature controller 262 to reduce the temperature of the plate 202 of each of the electrically heated concrete slip forms 200, 250 (FIGS. 8-15). This is done by the temperature controller 262 providing a reduced electrical voltage to the electrical resistance heating wire 244 of each of the electrically heated concrete slip forms 200, 250 (FIGS. 8-15) or reducing the time that the electrical resistance heating wire is energized. The process then proceeds from the block 418 to the block 420. At the block 420, a predetermined wait time is executed before the process proceeds from the block 420 to the block 404. The wait time can be any desired time that is suitable for the concrete temperature being measured, such as one second or ten seconds or 30 seconds or one minute or one hour. If the plate 202 temperature of each of the electrically heated concrete slip forms 200, 250 (FIGS. 8-15) is less than or equal to the profile temperature, the process proceeds to the decision block 416.

At the decision block 416, the plate 202 temperature of each of the electrically heated concrete slip forms 200, 250 (FIGS. 8-15) is compared to the profile temperature corresponding to the stored clock time. If the plate 202 temperature is equal to the profile temperature, the process proceeds from the block 416 to the block 420. If the plate 202 temperature is not equal to the profile temperature, the process proceeds to the decision block 422.

At the decision block 422, the plate 202 temperature is compared to the profile temperature. If the plate 202 temperature is greater than or equal to the profile temperature, the process proceeds to the block 420. If the plate 202 temperature is less than the profile temperature, the process proceeds to the block 424.

At the block 424 the temperature of the plate 202 of each of the electrically heated concrete slip forms 200, 250 (FIGS. 8-15) is increased. This can be done by the computing device 254 sending a signal to the temperature controller 262 to increase the temperature of the plate 202 of each of the electrically heated concrete slip forms 200, 250 (FIGS. 8-15). This can be done by the temperature controller 262 providing a greater electrical voltage to the electrical resistance heating wire 244 of each of the electrically heated concrete slip forms 200, 250 (FIGS. 8-15) or increasing the time that the electrical resistance heating wire is energized. The process then proceeds from the block 424 to the block 426.

At the decision block 426, a predetermined wait time is executed before the process proceeds from the block 426 to the block 404. The wait time can be any desired time that is suitable for the concrete temperature being measured, such as one second or ten seconds or 30 seconds or one minute or one hour. The process then proceeds from the block 426 to the block 404 where a new clock time is read.

The foregoing process regulates the heat provided by the electrically heated concrete slip forms 200, 250 (FIGS. 8-15) so that the temperature of the concrete is equal to the profile temperature at any given time. When the temperature of the concrete is less than the profile temperature at a given time, the electrically heated concrete slip forms 200, 250 (FIGS. 8-15) provide heat to the concrete until the temperature of the concrete is equal to the profile temperature. When the temperature of the concrete is greater than the profile temperature at a given time, no additional heat, or a reduced amount of heat, is provided to the concrete. Thus, the concrete temperature is continuously monitored and adjusted so that over time the concrete temperature will follow the predetermined temperature profile. Thus, over a predetermined time period the concrete temperature will be maintained at predetermined levels and then gradually reduce to ambient temperature at a predetermined rate.

After the concrete has achieved a desired amount or degree of cure, the electrically heated concrete slip forms, 200, 250 are moved; i.e., raised, to a desired height and additional plastic concrete 274 is placed in the next concrete lift between the electrically heated concrete slip forms. As with the insulated concrete slip forms 100-106, a layer of insulating material 500, 502, identical to the layers of insulating material 110-116, is attached to the bottom of each of the electrically heated concrete slip forms, 200, 250 so that the layers of insulating material cover and/or surround the concrete 276 exposed when the electrically heated concrete slip forms are raised. As with the embodiment disclosed above, the layer of insulating material 500, 502 attached to the bottom of the electrically heated concrete slip forms, 200, 250 is preferably a concrete insulating blanket. In another embodiment, the layer of insulating material 500, 502 attached to the bottom of either each of the insulated concrete slip forms 100-106 or each of the electrically heated concrete slip forms, 200, 250 are preferably electrically heated blankets. An electrically heated blanket suitable for use in the present invention is disclosed in U.S. Pat. Nos. 7,183,524 and 7,230,213 (the disclosures of which are both incorporated herein by reference in their entirety). Infrared or far infrared heating blankets also can be used due to their relatively low voltage and relatively low power consumption characteristics. The lower voltages are preferred as they reduce or eliminate the chances of electrocution by a worker.

While the plastic concrete 274 of the top or most recent pour lift in the electrically heated concrete slip forms 200, 250 is poured fresh, it will reach its maximum temperature and maintain that temperature for a desired amount of time; while the concrete 276 from the previous concrete pour lift bellow the electrically heated concrete slip forms and surrounded by the layers of insulating material 500, 502 will either maintain the maximum temperature and/or gradually reduce the temperature of the concrete. Therefore, as the electrically heated concrete slip form 200, 250 assembly elevates one lift at a time, the hottest concrete 274 is at the top of the electrically heated concrete slip forms where the most recent concrete lift is placed. Below, the concrete 276 is gradually cooled from its maximum temperature to ambient temperature over a period of time, such as several hours to several days. If the length of the layers of insulated material 500, 502 is the same as the length of the electrically heated concrete slip forms, 200, 250, the concrete 276 bellow the most recently poured concrete 274 will also retain some of the concrete's heat of hydration. As the electrically heated concrete slip forms 200, 250 advance upwardly, the concrete 276 lift pour bellow the concrete 274 is exposed to the environment at the point where it would have achieved the desired cure and strength properties. Once the concrete 276 lift pour bellow the layers of insulating material 500, 502 is exposed to the environment, it will loose the heat of hydration and moisture at an accelerated rate, thereby slowing the curing and maturity process. If the concrete 276 lift pour bellow the concrete 274 has not achieved the desired amount or degree of cure or the desired properties and therefore cannot yet be exposed to the environment and allowed to lose its heat and moisture, the layers of insulated material 500, 502 can be made of a greater length than the length of the electrically heated concrete slip forms 200, 250. For example, if the layers of insulating material 500, 502 are twice the length of the electrically heated concrete slip forms 200, 250, two previous concrete pour lifts would be covered by the layers of insulating material thereby preventing heat and moisture loss for a longer period of time. The purpose of the electrically heated concrete slip forms 200, 250 in combination with the layers of insulating material 500, 502 is to retain as much of the heat of hydration and moisture within the curing concrete 274, 276 structure for as long as possible, to accelerate concrete curing and reduce temperature shrinkage cracking. Also, as the entire concrete form assembly moves vertically upwardly, it will allow for a gradual exposure of the curing concrete to the environment, so that the loss of heat and moisture will not adversely impact the concrete curing and concrete properties in the same manner as conventional concrete slip forms. By causing the concrete to follow a predetermined temperature profile and by retaining the heat of hydration, the concrete matures faster thereby achieving its maximum properties much earlier than it would in a conventional (non-insulated) slip form. By gradually reducing the temperature of the top concrete 274 lift of most recent concrete pour to the concrete 276 lift bellow, the concrete is cooled after it has achieved far greater strength than in a conventional slip form. Therefore, the gradual cooling achieved by the electrically heated concrete slip forms 200, 250 and the layers of insulating material 500, 502 of the present invention reduces, or completely eliminates, temperature shrinkage cracking associated with conventional concrete curing while accelerating concrete curing and strength gain.

When electrically heated blankets are used as the layers of insulating material 500, 502 with either the insulated concrete slip forms 100-106 or the electrically heated concrete slip forms, 200, 250, the electrically heated blankets can be operated in several different modes. In its simplest mode, the electrically heated blankets 500, 502 (FIG. 15) are operated in an on/off mode. In this mode, a constant amount of electricity is provided to the electrical resistance heating wire of each of the electrically heated blankets so that a constant amount of heat is provided to the concrete 276. Thus, an operator can turn the heat on and turn the heat off. For this mode of operation, no computing device and no temperature sensors are required; a simple controller with an on/off switch will suffice.

In the next mode of operation, various fixed amounts of electricity are provided to the electrical resistance heating wire of each of the electrically heated blankets 500, 502, such as a low amount, a medium amount and a high amount. This can be done by providing a different voltage to the resistance heating wire or by changing the amount of time that the resistance heating wire is energized in each of the electrically heated blankets 500, 502. Thus, an operator can select one of several predetermined amounts of heat provided to the electrically heated blankets 500, 502. For this mode of operation, no computing device and no temperature sensors are required; a simple controller with a selector switch will suffice.

The next mode of operation is for the electrically heated blankets 500, 502 to be held at a constant desired temperature. For this mode of operation, the computing device 254 is programmed to perform the process shown in FIG. 16, as described above, except the computing device and the temperature controller 262 control the electrically heated blankets 500, 502 in addition to controlling the electrically heated concrete slip forms 200, 250. The electrically heated blanket 500 includes a fourth temperature sensor 504 connected to the computing device 254 by an electric circuit, such as by the wires 506. The electrically heated blanket 502 includes a fifth temperature sensor 508 connected to the computing device 254 by an electric circuit, such as by the wires 510. The panel/blanket temperature controller 262 is connected to the electrical resistance heating wire of the electrically heated blanket 500 by an electric circuit, such as by the wires 512. The panel/blanket temperature controller 262 is connected to the electrical resistance heating wire of the electrically heated blanket 502 by an electric circuit, such as by the wires 514. Thus, when the computing device 254 is programmed to perform the process of FIG. 16, the process regulates the heat provided by the electrically heated blankets 500, 502 so that the temperature of the concrete is maintained at a constant temperature. In this case the temperature of the electrically heated blankets 500, 502 will preferably be lower than the temperature of the electrically heated concrete slip forms 200, 250.

The next mode of operation is for the temperature of the electrically heated blankets 500, 502 to follow a predetermined temperature profile. FIG. 18 shows a flow diagram for a process for controlling the heat provided to concrete so that the temperature of the concrete can be controlled to match a desired predetermined temperature profile, such as that shown in FIG. 17, using the electrically heated blankets 500, 502. The computing device 254 is programmed so that it will perform the process shown by this flow diagram.

Thus, when the computing device is programmed to perform the process of FIG. 18, the process regulates the heat provided by the electrically heated concrete slip forms 200, 250 and the electrically heated blankets 500, 502 so that the temperature of the concrete 274, 276 is equal to the profile temperature at any given time. When the temperature of the concrete 274 is less than the profile temperature at a given time, the electrically heated concrete slip forms 200, 250 provide heat to the concrete until the temperature of the concrete is equal to the profile temperature. Similarly, when the temperature of the concrete 276 is less than the profile temperature at a given time, the electrically heated blankets 500, 502 provide heat to the concrete until the temperature of the concrete is equal to the profile temperature. When the temperature of the concrete 274, 276 is greater than the profile temperature at a given time, no additional heat, or a reduced amount of heat, is provided to the concrete. Thus, the temperature of the two portions of concrete 274, 276 is separately and continuously monitored and separately adjusted so that over time the temperature of the two portions of concrete will follow the predetermined temperature profile for each of their respective time periods. Thus, over a predetermined time period the temperature of each portions of the concrete 274, 276 will be separately maintained at predetermined levels and then the temperature of the concrete will gradually be reduced to ambient temperature at a predetermined rate.

When both the electrically heated concrete slip forms 200, 250 and the electrically heated blankets 500, 502 are used together, the computing device 254 is programmed so that it can control the temperature of the electrically heated concrete slip forms and the electrically heated blankets separately and independently. Also, the concrete curing time for the concrete 274 disposed between the electrically heated concrete slip forms 200, 250 is kept separate from the concrete curing time for the concrete 276 disposed between the electrically heated blankets 500, 502. Thus, the concrete 274 disposed between the electrically heated concrete slip forms 200, 250 will be on a different portion of the predetermined temperature profile (preferably at a higher temperature) than the concrete 276 disposed between the electrically heated blankets 500, 502 (preferably at a lower temperature). Thus, the temperature of the electrically heated concrete slip forms 200, 250 can be different than the temperature of the electrically heated blankets 500, 502, depending on where each portion of the curing concrete fits on the predetermined concrete temperature profile.

The predetermined time associated with the predetermined concrete temperature profile is equal to the length of time that the electrically heated concrete slip forms 200, 250 stay in place before they are moved (i.e., raised) for the next concrete lift pour above. If a construction schedule requires a shorter time for each lift pour then the layers of insulating material 500, 502 bellow the electrically heated concrete slip forms 200, 250 can be electrically heated blankets. The electrically heated blankets can be independently controlled by another controller, or by the same controller 262 as the electrically heated concrete slip forms 200, 250. In this configuration the electrically heated concrete slip forms 200, 250 will be controlled so that the top most recent concrete 274 lift follows the predetermined temperature profile of the initial period up to the time that the electrically heated concrete slip forms are moved upwardly, while the concrete 276 covered by the electrically heated blankets 500, 502 covering the concrete 276 lift bellow the electrically heated concrete slip forms 200, 250 follows the predetermined temperature profile for the time period corresponding to the time after which the electrically heated concrete slip forms are moved upwardly until the next time the electrically heated concrete slip forms are moved upwardly. This can be achieved using the same temperature profile with a dual controller for both the electrically heated concrete slip forms 200, 250 and the electrically heated blankets 500, 502, or separate temperature profiles associated with the concrete 274 and the concrete 276 and separate controllers (not shown).

As described above, the electrically heated concrete slip forms 200, 250 and the electrically heated blankets 500, 502 are moved intermittently with each new lift of concrete. However, it is specifically contemplated that the electrically heated concrete slip forms 200, 250 and the electrically heated blankets 500, 502 can be moved continuously as plastic concrete is continuously added to the heated concrete slip forms. In this mode of operation, the electrically heated concrete slip forms 200, 250 and the electrically heated blankets 500, 502 are held at a constant temperature, with the electrically heated blankets being at a lower temperature than the electrically heated concrete slip forms. In this mode of operation, it is desired that the electrically heated electrically heated blankets 500, 502 be approximately 5° C. lower than the temperature of the electrically heated concrete slip forms 200, 250, preferably approximately 10° C. lower, more preferably approximately 15° C. lower, most preferably approximately 20° C. lower. Of course, the size of the electrically heated concrete slip forms 200, 250, the length of the electrically heated blankets 500, 502 and the speed that the electrically heated concrete slip forms and the electrically heated blankets move will determine the amount of time that the concrete is exposed to these two different heating zones.

In the electrically heated blankets 500, 502 and the electrically heated concrete slip forms 200, 250 the electrical resistance heating element, such as the electric resistance heating wire 244, can be substituted with an infrared producing device, such as disclosed in U.S. Pat. No. 4,602,238 and U.S. Patent Application Publication No. 2009/0324811 (the disclosures of which are both incorporated herein by reference) or a far infrared producing device, such as disclosed in U.S. Pat. Nos. 7,009,155 and 7,827,675 and U.S. Patent Application Publication Nos. 2003/0049473; 2003/

0155347; 2009/0312822 and 2010/0062667 (the disclosures of which are all incorporated herein by reference in their entirety).

While the present invention can be used with conventional concrete mixes; i.e., concrete in which portland cement is the only cementitious material used in the concrete, it is preferred as a part of the present invention to use the concrete or mortar mixes disclosed below or disclosed in applicant's co-pending patent application Pub. No. US 2013/0119576 (the disclosure of which is incorporated herein by reference in its entirety). Specifically, the concrete mix in accordance with the present invention comprises cementitious material, aggregate and water sufficient to hydrate the cementitious material. The amount of cementitious material used relative to the total weight of the concrete varies depending on the application and/or the strength of the concrete desired. Generally speaking, however, the cementitious material comprises approximately 25% to approximately 40% by weight of the total weight of the concrete, exclusive of the water, or 300 lbs/yd$^3$ (177 kg/m$^3$) of cement to 1,200 lbs/yd$^3$ (710 kg/m$^3$) of cement. In Ultra High Performance Concrete, the cementitious material exceeds the 40% by weight of the total weight of the concrete. The water-to-cement ratio by weight is usually approximately 0.25 to approximately 0.7. Relatively low water-to-cement materials ratios by weight lead to higher strength but lower workability, while relatively high water-to-cement materials ratios by weight lead to lower strength, but better workability. For high performance concrete and ultra high performance concrete, lower water-to-cement ratios are used, such as approximately 0.15 to approximately 0.25. Aggregate usually comprises 70% to 80% by volume of the concrete. In Ultra High Performance concrete the aggregate is less than 70% of the concrete by volume. However, the relative amounts of cementitious material to aggregate to water are not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more. In particular, Ultra High Performance concrete, concrete panels or concrete elements with compressive strengths of over 20,000 psi can be cast and cured using the method of the present invention.

The aggregate used in the concrete used with the present invention is not critical and can be any aggregate typically used in concrete. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The reinforcement of the concrete used with the present invention is not a critical aspect of the present invention and thus any type of reinforcement required by design requirements can be used. Such types of concrete reinforcement include, but are not limited to, deformed steel bars, cables, post tensioned cables, pre-stressed cables, fibers, steel fibers, mineral fibers, synthetic fibers, carbon fibers, steel wire fibers, mesh, lath, and the like.

The preferred cementitious material for use with the present invention comprises portland cement; preferably portland cement and one or more pozzolans; and more preferably portland cement, slag cement and one or more pozzolans. The cementitious material preferably comprises a reduced amount of portland cement and increased amounts of recycled supplementary cementitious materials; i.e., slag cement and/or fly ash. This results in cementitious material and concrete that is more environmentally friendly. The portland cement can also be replaced, in whole or in part, by one or more pozzolanic materials. Portland cement is a hydraulic cement. Hydraulic cements harden because of a hydration process; i.e., a chemical reaction between the anhydrous cement powder and water. Thus, hydraulic cements can harden underwater or when constantly exposed to wet weather. The chemical reaction results in hydrates that are substantially water-insoluble and so are quite durable in water. Hydraulic cement is a material that can set and harden submerged in water by forming insoluble products in a hydration reaction. Other hydraulic cements include, but are not limited to, belite cement (dicalcium silicate), phosphate cements and anhydrous gypsum. However, the preferred hydraulic cement is portland cement.

Another preferred cementitious material for use with the present invention comprises portland cement; preferably portland cement and one of slag cement or fly ash; and more preferably portland cement, slag cement and fly ash. Slag cement is also known as ground granulated blast-furnace slag (GGBFS). The cementitious material preferably comprises a reduced amount of or no portland cement and increased amounts of recycled supplementary cementitious materials; e.g., slag cement, fly ash, energetically modified cement and/or volcanic ash. This results in cementitious material and concrete that is more environmentally friendly. The portland cement can also be replaced, in whole or in part, by one or more cementitious materials other than portland cement, slag cement or fly ash. Such other cementitious or pozzolanic materials include, but are not limited to, silica fume; metakaolin; rice hull (or rice husk) ash; ground burnt clay bricks; brick dust; bone ash; animal blood; clay; volcanic ash, energetically modified cement, other siliceous, aluminous or aluminosiliceous materials that react with calcium hydroxide in the presence of water; hydroxide-containing compounds, such as sodium hydroxide, magnesium hydroxide, or any other compound having reactive hydrogen groups, other hydraulic cements, other pozzolanic materials and combinations thereof. The portland cement can also be replaced, in whole or in part, by one or more inert or filler materials other than portland cement, slag cement or fly ash. Such other inert or filler materials include, but are not limited to limestone powder; calcium carbonate; titanium dioxide; quartz; or other finely divided minerals that densify the hydrated cement paste.

Slag cement, also known as ground granulated blast-furnace slag (GGBFS) and fly ash are both pozzolans. Pozzolan is a siliceous or siliceous and aluminous material which, in itself, possesses little or no cementitious value but which will, in finely divided form and in the presence of water, react chemically with calcium hydroxide at ordinary temperature to form compounds possessing cementitious properties. Such pozzolanic materials include, but are not limited to, volcanic ash, silica fume; metakaolin; rice hull (or rice husk) ash; ground burnt clay bricks; brick dust; bone ash; calcined shale; calcined clay; other siliceous, aluminous or aluminosiliceous materials that react with calcium hydroxide in the presence of water; hydroxide-containing compounds, such as sodium hydroxide, magnesium hydroxide, or any other compound having reactive hydrogen groups. The portland cement can also be replaced, in whole or in part, by one or more inert or filler materials other than portland cement, slag cement or pozzolanic material. Such other inert or filler materials include, but are not limited to limestone powder; calcium carbonate; titanium dioxide; quartz; or other finely divided minerals that densify the hydrated cement paste. In one disclosed embodiment, the cementitious material for use with the present invention comprises one or more hydraulic cements and one or more pozzolans.

The preferred cementitious material for use with a disclosed embodiment of the present invention comprises 0% to approximately 100% by weight portland cement. The range of 0% to approximately 100% by weight portland cement includes all of the intermediate percentages; such as, 5%, 10%, 15%, 20%, 25%, 30%, 35%, 40%, 45%, 50%, 55%, 60%, 65%, 70%, 75%, 80%, 85%, 90% and 95%. The cementitious material of the present invention can also comprise 0% to approximately 90% by weight portland cement, preferably 0% to approximately 80% by weight portland cement, preferably 0% to approximately 70% by weight portland cement, more preferably 0% to approximately 60% by weight portland cement, most preferably 0% to approximately 50% by weight portland cement, especially 0% to approximately 40% by weight portland cement, more especially 0% to approximately 30% by weight portland cement, most especially 0% to approximately 20% by weight portland cement, or 0% to approximately 10% by weight portland cement. In one disclosed embodiment, the cementitious material comprises approximately 10% to approximately 45% by weight portland cement, more preferably approximately 10% to approximately 40% by weight portland cement, most preferably approximately 10% to approximately 35% by weight portland cement, especially approximately 33⅓% by weight portland cement, most especially approximately 10% to approximately 30% by weight portland cement. In another disclosed embodiment of the present invention, the cementitious material can comprise approximately 5% by weight portland cement, approximately 10% by weight portland cement, approximately 15% by weight portland cement, approximately 20% by weight portland cement, approximately 25% by weight portland cement, approximately 30% by weight portland cement, approximately 35% by weight portland cement, approximately 40% by weight portland cement, approximately 45% by weight portland cement or approximately 50% by weight portland cement or any sub-combination thereof.

The preferred cementitious material for use in one disclosed embodiment of the present invention also comprises 0% to approximately 80% by weight of one or more pozzolans, preferably approximately 10% to approximately 80% by weight one or more pozzolans, preferably approximately 10% to approximately 75% by weight one or more pozzolans, preferably approximately 10% to approximately 70% by weight one or more pozzolans, preferably approximately 10% to approximately 65% by weight one or more pozzolans, preferably approximately 10% to approximately 60% by weight one or more pozzolans, preferably approximately 10% to approximately 55% by weight one or more pozzolans, preferably approximately 10% to approximately 80% by weight one or more pozzolans, preferably approximately 10% to approximately 45% by weight one or more pozzolans, more preferably approximately 10% to approximately 40% by weight one or more pozzolans, most preferably approximately 10% to approximately 35% by weight one or more pozzolans, especially approximately 33⅓% by weight one or more pozzolans. In another disclosed embodiment of the present invention, the preferred cementitious material comprises 0% by weight one or more pozzolans, approximately 5% by weight one or more pozzolans, approximately 10% by weight one or more pozzolans, approximately 15% by weight one or more pozzolans, approximately 20% by weight one or more pozzolans, approximately 25% by weight one or more pozzolans, approximately 30% by weight one or more pozzolans, approximately 35% by weight one or more pozzolans, approximately 40% by weight one or more pozzolans, approximately 45% by weight one or more pozzolans or approximately 80% by weight one or more pozzolans, approximately 55% by weight one or more pozzolans, approximately 60% by weight one or more pozzolans, approximately 65% by weight one or more pozzolans, approximately 70% by weight one or more pozzolans or approximately 75% by weight one or more pozzolans, approximately 80% by weight one or more pozzolans or any sub-combination thereof. Preferably the one or more pozzolans has an average particle size of <10 μm; more preferably 90% or more of the particles have a particles size of <10 μm.

The preferred cementitious material for use in one disclosed embodiment of the present invention also comprises 0% to approximately 90% by weight slag cement, preferably approximately 10% to approximately 90% by weight slag cement, preferably approximately 20% to approximately 90% by weight slag cement, more preferably approximately 30% to approximately 80% by weight slag cement, most preferably approximately 30% to approximately 70% by weight slag cement, especially approximately 30% to approximately 60% by weight slag cement, more especially approximately 30% to approximately 50% by weight slag cement, most especially approximately 30% to approximately 40% by weight slag cement. In another disclosed embodiment the cementitious material comprises approximately 33⅓% by weight slag cement. In another disclosed embodiment of the present invention, the cementitious material can comprise approximately 5% by weight slag cement, approximately 10% by weight slag cement, approximately 15% by weight slag cement, approximately 20% by weight slag cement, approximately 25% by weight slag cement, approximately 30% by weight slag cement, approximately 35% by weight slag cement, approximately 40% by weight slag cement, approximately 45% by weight slag cement, approximately 50% by weight slag cement, approximately 55% by weight slag cement, approximately 60% by weight slag cement, approximately 65%, approximately 70% by weight slag cement, approximately 75% by weight slag cement, approximately 80% by weight slag cement, approximately 85% by weight slag cement or approximately 90% by weight slag cement or any sub-combination thereof.

In one disclosed embodiment, the preferred pozzolans are fly ash or volcanic ash. Thus, preferred cementitious material for use in one disclosed embodiment of the present invention also comprises 0% to approximately 80% by weight of one or more pozzolans, preferably fly ash or volcanic ash, preferably approximately 10% to approximately 80% by weight fly ash or volcanic ash, preferably approximately 10% to approximately 75% by weight fly ash or volcanic ash, preferably approximately 10% to approximately 70% by weight fly ash or volcanic ash, preferably approximately 10% to approximately 65% by weight fly ash or volcanic ash, preferably approximately 10% to approximately 60% by weight fly ash or volcanic ash, preferably approximately 10% to approximately 55% by weight fly ash or volcanic ash, preferably approximately 10% to approximately 80% by weight fly ash or volcanic ash, preferably approximately 10% to approximately 45% by weight fly ash or volcanic ash, more preferably approximately 10% to approximately 40% by weight fly ash or volcanic ash, most preferably approximately 10% to approximately 35% by weight fly ash or volcanic ash, especially approximately 33⅓% by weight fly ash or volcanic ash. In another disclosed embodiment of the present invention, the preferred cementitious material comprises 0% by weight fly ash or volcanic ash, approximately 5% by weight fly ash or volcanic ash, approximately 10% by weight fly ash or volcanic ash, approximately 15% by weight fly ash or volcanic ash, approximately 20% by weight fly ash or volcanic ash, approximately 25% by weight fly ash or volcanic ash, approximately 30% by weight fly ash or volcanic ash, approximately 35% by weight fly ash or volcanic ash, approximately 40% by weight fly ash or volcanic ash, approximately 45% by weight fly ash or volcanic ash, approximately 55% by weight fly ash or volcanic ash, approximately 60% by weight fly ash or volcanic ash, approximately 65% by weight fly ash or volcanic ash, approximately 70% by weight fly ash or volcanic ash, approximately 75% by weight fly ash or volcanic ash, approximately 80% by weight fly ash or volcanic ash or any sub-combination thereof. Preferably the fly ash or volcanic ash has an average particle size of <10 μm; more preferably 90% or more of the particles have a particles size of <10 μm.

The cementitious material for use in one disclosed embodiment of the present invention can optionally include 0.1% to approximately 20% by weight Wollastonite, preferably 0.1% to approximately 10% by weight Wollastonite. Wollastonite is a calcium inosilicate mineral ($CaSiO_3$) that may contain small amounts of iron, magnesium, and manganese substituted for calcium. In addition the cementitious material can optionally include 0.1-35% calcium oxide (quick lime), calcium hydroxide (hydrated lime), calcium carbonate or latex or polymer admixtures, either mineral or synthetic, that have reactive hydroxyl groups or mixtures or combinations thereof.

The cementitious material for use in one disclosed embodiment of the present invention can also optionally include inert fillers, such as limestone powder; calcium carbonate; titanium dioxide; quartz; or other finely divided minerals that densify the hydrated cement paste. Specifically, inert fillers optionally can be used in the cementitious material of the present invention in amounts of 0% to approximately 40% by weight; preferably, approximately 1% to approximately 30% by weight. In one disclosed embodiment, the cementitious material for use with the present invention comprises 0% to approximately 100% by weight portland cement, approximately 10% to approximately 90% by weight slag cement, approximately 5% to approximately 80% by weight one or more pozzolans and 0% to approximately 40% by weight inert filler. In another disclosed embodiment, the cementitious material for use with the present invention comprises 10% to approximately 100% by weight portland cement; approximately 5% to approximately 80% by weight one or more pozzolans; and 1% to approximately 40% by weight inert filler.

In one disclosed embodiment, the preferred cementitious material for use with the present invention comprises approximately equal parts by weight of portland cement, slag cement and one or more pozzolans; i.e., approximately 33⅓% by weight portland cement, approximately 33⅓% by weight slag cement and approximately 33⅓% by weight one or more pozzolans. In another disclosed embodiment, a preferred cementitious material for use with the present invention has a weight ratio of portland cement to slag cement to one or more pozzolans of 1:1:1. In another disclosed embodiment, the preferred cementitious material for use with the present invention has a weight ratio of portland cement to slag cement to one or more pozzolans of approximately 0.85-1.15:0.85-1.15:0.85-1.15, preferably approximately 0.9-1.1:0.9-1.1:0.9-1.1, more preferably approximately 0.95-1.05:0.95-1.05:0.95-1.05.

In one disclosed embodiment, the cementitious material for use with the present invention comprises approximately 10% to approximately 100% by weight portland cement, approximately 10% to approximately 90% by weight slag cement, and approximately 5% to approximately 80% by weight one or more pozzolans preferably fly ash or volcanic ash. In one disclosed embodiment, the cementitious material for use with the present invention comprises approximately 10% to approximately 80% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 70% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 60% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 50% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises less than 50% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 45% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 40% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises approximately 10% to approximately 35% by weight portland cement, approximately 10% to approximately 90% by weight slag cement, and approximately 5% to approximately 80% by weight one or more pozzolans preferably fly ash or volcanic ash.

In one disclosed embodiment, the cementitious material for use with the present invention comprises 0% to approximately 100% by weight portland cement, approximately 10% to approximately 90% by weight slag cement, and approximately 5% to approximately 80% by weight one or more pozzolans preferably fly ash or volcanic ash. In one disclosed embodiment, the cementitious material for use with the present invention comprises 0% to approximately 80% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 70% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 60% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 50% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 45% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 40% by weight portland cement, approximately 10% to approximately 90% by weight slag cement, and approximately 5% to approximately 80% by weight one or more pozzolans preferably fly ash or volcanic ash. In another disclosed embodiment, the cementitious material for use with the present invention comprises 0% to approximately 35% by weight portland cement, approximately 10% to approximately 90% by weight slag cement, and approximately 5% to approximately 80% by weight one or more pozzolans preferably fly ash or volcanic ash.

In another disclosed embodiment, the cementitious material for use with the present invention comprises approximately 10% to approximately 100% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 90% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 80% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 70% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 60% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 50% by weight portland cement and at least one of approximately 10% to approximately 90% by weight slag cement and approximately 5% to approximately 80% by weight one or more pozzolans preferably fly ash. In another disclosed embodiment, the cementitious material for use with the present invention comprises approximately 10% to approximately 40% by weight portland cement and at least one of approximately 10% to approximately 90% by weight slag cement and approximately 5% to approximately 80% by weight one or more pozzolans preferably fly ash.

In another disclosed embodiment, the cementitious material for use with the present invention comprises approximately 10% to approximately 90% by weight portland cement; approximately 10% to approximately 90% by weight slag cement; 0% to approximately 80% by weight one or more pozzolans preferably fly ash or volcanic ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises approximately 10% to approximately 80% by weight portland cement; approximately 10% to approximately 90% by weight slag cement; 0% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 70% by weight portland cement; approximately 10% to approximately 90% by weight slag cement; 0% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 60% by weight portland cement; approximately 10% to approximately 90% by weight slag cement; 0% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 50% by weight portland cement; approximately 10% to approximately 90% by weight slag cement; 0% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; approximately 10% to approximately 90% by weight slag cement; approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 45% by weight portland cement; approximately 10% to approximately 90% by weight slag cement; 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 40% by weight portland cement; approximately 10% to approximately 90% by weight slag cement; approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises approximately 10% to approximately 35% by weight portland cement; approximately 10% to approximately 90% by weight slag cement; approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises at least one of approximately 10% to approximately 100% by weight portland cement, approximately 10% to approximately 90% by weight slag cement or approximately 5% to approximately 80% by weight one or more pozzolans preferably fly ash or volcanic ash; 0% to 10% by weight Wollastonite; and 0% to approximately 25% by weight calcium oxide, calcium hydroxide, or latex or polymer admixtures, either mineral or synthetic, that have reactive hydroxyl groups, or mixtures thereof. In one disclosed embodiment, the cementitious material for use with the present invention comprises at least one of approximately 10% to approximately 80% by weight portland cement, approximately 10% to approximately 90% by weight slag cement or approximately 5% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 70% by weight portland cement, approximately 10% to approximately 90% by weight slag cement or approximately 5% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 60% by weight portland cement, approximately 10% to approximately 90% by weight slag cement or approximately 5% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 50% by weight portland cement, approximately 10% to approximately 90% by weight slag cement or approximately 5% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises less than 50% by weight portland cement; approximately 10% to approximately 90% by weight slag cement; approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 45% by weight portland cement, approximately 10% to approximately 90% by weight slag cement or approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 40% by weight portland cement, approximately 10% to approximately 90% by weight slag cement or approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof. In another disclosed embodiment, the cementitious material for use with the present invention comprises at least one of approximately 10% to approximately 35% by weight portland cement, approximately 10% to approximately 90% by weight slag cement or approximately 10% to approximately 80% by weight one or more pozzolans preferably fly ash or volcanic ash; 0% to approximately 10% by weight Wollastonite; and 0% to approximately 25% by weight calcium oxide, calcium hydroxide, or latex or polymer admixtures, either mineral or synthetic, that have reactive hydroxyl groups, or mixtures thereof.

In another disclosed embodiment, the cementitious material for use with the present invention comprises approximately 10% to approximately 90% by weight portland cement; at least one of approximately 10% to approximately 90% by weight slag cement or approximately 5% to approximately 80% by weight one or more pozzolans preferably fly ash or volcanic ash; and 0.1% to 10% by weight Wollastonite. In one disclosed embodiment, the cementitious material for use with the present invention comprises approximately 10% to approximately 80% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 70% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 60% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 50% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises less than 50% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 45% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 40% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite. In another disclosed embodiment, the cementitious material for use with the present invention comprises approximately 10% to approximately 35% by weight portland cement; at least one of approximately 10% to approximately 90% by weight slag cement or approximately 5% to approximately 80% by weight one or more pozzolans preferably fly ash or volcanic ash; and 0.1% to approximately 10% by weight Wollastonite.

In one disclosed embodiment, the cementitious material for use with the present invention comprises approximately 10% to approximately 100% by weight portland cement, approximately 10% to approximately 90% by weight slag cement, and approximately 5% to approximately 80% by weight volcanic ash. In one disclosed embodiment, the cementitious material for use with the present invention comprises approximately 10% to approximately 80% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 70% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 60% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 50% by weight portland cement, approximately 10% to approximately 90% by weight slag cement, and approximately 5% to approximately 80% by weight volcanic ash. In another disclosed embodiment, the cementitious material for use with the present invention comprises less than 50% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 45% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 40% by weight portland cement, approximately 10% to approximately 90% by weight slag cement, and approximately 5% to approximately 80% by weight volcanic ash. In another disclosed embodiment, the cementitious material for use with the present invention comprises approximately 10% to approximately 35% by weight portland cement, approximately 10% to approximately 90% by weight slag cement, and approximately 5% to approximately 80% by weight volcanic ash.

In one disclosed embodiment, the cementitious material for use with the present invention comprises approximately 10% to approximately 100% by weight portland cement, approximately 10% to approximately 90% by weight slag cement, approximately 5% to approximately 80% by weight volcanic ash and approximately 1% to approximately 25% by weight lime. In one disclosed embodiment, the cementitious material for use with the present invention comprises approximately 10% to approximately 80% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 70% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 60% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 50% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises less than 50% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 45% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 40% by weight portland cement, approximately 10% to approximately 90% by weight slag cement, approximately 5% to approximately 80% by weight volcanic ash and approximately 1% to approximately 25% by weight lime. In another disclosed embodiment, the cementitious material for use with the present invention comprises approximately 10% to approximately 35% by weight portland cement, approximately 10% to approximately 90% by weight slag cement, approximately 5% to approximately 80% by weight volcanic ash and approximately 1% to approximately 25% by weight lime.

In one disclosed embodiment, the cementitious material for use with the present invention comprises approximately 10% to approximately 100% by weight portland cement, approximately 10% to approximately 90% by weight slag cement, and approximately 5% to approximately 30% by weight silica fume. In one disclosed embodiment, the cementitious material for use with the present invention comprises approximately 10% to approximately 80% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 70% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 60% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 50% by weight portland cement, approximately 10% to approximately 90% by weight slag cement, and approximately 5% to approximately 30% by weight silica fume. In another disclosed embodiment, the cementitious material for use with the present invention comprises less than 50% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 45% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 40% by weight portland cement, approximately 10% to approximately 90% by weight slag cement, and approximately 5% to approximately 30% by weight silica fume. In another disclosed embodiment, the cementitious material for use with the present invention comprises approximately 10% to approximately 35% by weight portland cement, approximately 10% to approximately 90% by weight slag cement, and approximately 5% to approximately 30% by weight silica fume. In one disclosed embodiment, the cementitious material for use with the present invention comprises approximately 10% to approximately 90% by weight portland cement, 0% to approximately 90% by weight slag cement, and approximately 1% to approximately 40% by weight silica fume.

In one disclosed embodiment, the cementitious material for use with the present invention comprises approximately 10% to approximately 100% by weight portland cement, approximately 10% to approximately 90% by weight slag cement, and approximately 5% to approximately 40% by weight silica fume. In one disclosed embodiment, the cementitious material for use with the present invention comprises approximately 10% to approximately 80% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 70% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 60% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 50% by weight portland cement, approximately 10% to approximately 90% by weight slag cement, and approximately 5% to approximately 40% by weight silica fume. In another disclosed embodiment, the cementitious material for use with the present invention comprises less than 50% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 45% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 40% by weight portland cement, approximately 10% to approximately 90% by weight slag cement, and approximately 5% to approximately 40% by weight silica fume. In another disclosed embodiment, the cementitious material for use with the present invention comprises approximately 10% to approximately 35% by weight portland cement, approximately 10% to approximately 90% by weight slag cement, and approximately 5% to approximately 40% by weight silica fume. In one disclosed embodiment, the cementitious material for use with the present invention comprises approximately 10% to approximately 90% by weight portland cement, 0% to approximately 90% by weight slag cement, and approximately 1% to approximately 40% by weight silica fume.

In one disclosed embodiment, the cementitious material for use with the present invention comprises approximately 10% to approximately 100% by weight portland cement, approximately 10% to approximately 90% by weight slag cement, approximately 5% to approximately 40% by weight silica fume and approximately 1% to approximately 25% by weight lime. In one disclosed embodiment, the cementitious material for use with the present invention comprises approximately 10% to approximately 80% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 70% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 60% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 50% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises less than 50% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 45% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 40% by weight portland cement, approximately 10% to approximately 90% by weight slag cement, approximately 5% to approximately 40% by weight silica fume and approximately 1% to approximately 25% by weight lime. In another disclosed embodiment, the cementitious material for use with the present invention comprises approximately 10% to approximately 35% by weight portland cement, approximately 10% to approximately 90% by weight slag cement, approximately 5% to approximately 40% by weight silica fume and approximately 1% to approximately 25% by weight lime. In one disclosed embodiment, the cementitious material for use with the present invention comprises approximately 10% to approximately 90% by weight portland cement, 0% to approximately 90% by weight slag cement, approximately 1% to approximately 40% by weight silica fume and approximately 1% to approximately 25% by weight lime.

In one disclosed embodiment, the cementitious material for use with the present invention comprises 0% to approximately 80% by weight portland cement, 0% to approximately 80% by weight slag cement, and approximately 20% to approximately 90% by weight fly ash.

In one disclosed embodiment, the cementitious material for use with the present invention comprises 0% to approximately 80% by weight portland cement, 0% to approximately 80% by weight slag cement, and approximately 20% to approximately 90% by weight volcanic ash.

In one disclosed embodiment, the cementitious material for use with the present invention comprises 0% to approximately 80% by weight portland cement, 0% to approximately 80% by weight slag cement, and approximately 20% to approximately 90% by weight silica fume.

In one disclosed embodiment, the cementitious material for use with the present invention comprises approximately 5% to approximately 95% by weight one or more pozzolans and approximately 1% to approximately 25% by weight calcium hydroxide.

In one disclosed embodiment, the cementitious material for use with the present invention comprises approximately 5% to approximately 75% by weight one or more pozzolans and approximately 1% to approximately 25% by weight calcium hydroxide.

In one disclosed embodiment, the cementitious material for use with the present invention comprises approximately 5% to approximately 95% by weight one or more pozzolans and approximately 1% to approximately 25% by weight calcium oxide, calcium hydroxide, or latex or polymer admixtures, either mineral or synthetic, that have reactive hydroxyl groups, or mixtures thereof.

In one disclosed embodiment, the cementitious material for use with the present invention comprises approximately 5% to approximately 75% by weight one or more pozzolans and approximately 1% to approximately 25% by weight calcium oxide, calcium hydroxide, or latex or polymer admixtures, either mineral or synthetic, that have reactive hydroxyl groups, or mixtures thereof.

In one disclosed embodiment, the cementitious material for use with the present invention comprises 0% to approximately 80% by weight portland cement, 0% to approximately 80% by weight slag cement, and approximately 5% to approximately 40% by weight silica fume.

In one disclosed embodiment, the cementitious material for use with the present invention comprises approximately 5% to approximately 95% by weight one or more pozzolans and approximately 1% to approximately 25% by weight lime.

In one disclosed embodiment, the cementitious material for use with the present invention comprises approximately 5% to approximately 75% by weight one or more pozzolans and approximately 1% to approximately 25% by weight lime.

In one disclosed embodiment, the cementitious material for use with the present invention comprises approximately 5% to approximately 95% by weight one or more pozzolans and approximately 1% to approximately 25% by weight of a compound that produces calcium hydroxide in the presence of water such that the calcium hydroxide reacts with the one or more pozzolans to form a cementitious material.

In another disclosed embodiment, the cementitious material for use with the present invention comprises approximately 10% to approximately 80% by weight portland cement and the remaining cementitious material comprising one or more supplementary cementitious materials selected from slag cement and fly ash. In another disclosed embodiment, the cementitious material for use with the present invention comprises approximately 10% to approximately 70% by weight portland cement and the remaining cementitious material comprising one or more supplementary cementitious materials selected from slag cement and fly ash. In another disclosed embodiment, the cementitious material for use with the present invention comprises approximately 10% to approximately 60% by weight portland cement and the remaining cementitious material comprising one or more supplementary cementitious materials selected from slag cement and fly ash. In another disclosed embodiment, the cementitious material for use with the present invention comprises approximately 10% to approximately 50% by weight portland cement and the remaining cementitious material comprising one or more supplementary cementitious materials selected from slag cement and fly ash.

In another disclosed embodiment, the cementitious material for use with the present invention comprises approximately 10% to approximately 80% by weight portland cement and the remaining cementitious material comprising one or more supplementary cementitious materials selected from slag cement, fly ash, silica fume, rice husk ash, metakaolin, and other siliceous, aluminous or aluminosiliceous materials that react with calcium hydroxide in the presence of water. In another disclosed embodiment, the cementitious material for use with the present invention comprises approximately 10% to approximately 70% by weight portland cement and the remaining cementitious material comprising one or more supplementary cementitious materials selected from slag cement, fly ash, silica fume, rice husk ash, metakaolin, and other siliceous, aluminous or aluminosiliceous materials that react with calcium hydroxide in the presence of water. In another disclosed embodiment, the cementitious material for use with the present invention comprises approximately 10% to approximately 60% by weight portland cement and the remaining cementitious material comprising one or more supplementary cementitious materials selected from slag cement, fly ash, silica fume, rice husk ash, metakaolin, and other siliceous, aluminous or aluminosiliceous materials that react with calcium hydroxide in the presence of water. In another disclosed embodiment, the cementitious material for use with the present invention comprises approximately 10% to approximately 50% by weight portland cement and the remaining cementitious material comprising one or more supplementary cementitious materials selected from slag cement, fly ash, silica fume, rice husk ash, metakaolin, and other siliceous, aluminous or aluminosiliceous materials that react with calcium hydroxide in the presence of water.

In another disclosed embodiment, the cementitious material for use with the present invention comprises approximately 10% to approximately 80% by weight portland cement and the remaining cementitious material comprising one or more pozzolanic materials. In another disclosed embodiment, the cementitious material for use with the present invention comprises approximately 10% to approximately 70% by weight portland cement and the remaining cementitious material comprising one or more pozzolanic materials. In another disclosed embodiment, the cementitious material for use with the present invention comprises approximately 10% to approximately 60% by weight portland cement and the remaining cementitious material comprising one or more pozzolanic materials. In another disclosed embodiment, the cementitious material for use with the present invention comprises approximately 10% to approximately 50% by weight portland cement and the remaining cementitious material comprising one or more pozzolanic materials. In another disclosed embodiment, the foregoing cementitious materials further comprise approximately 0.1% to approximately 10% by weight Wollastonite.

In another disclosed embodiment, the cementitious material for use with the present invention comprises one or more pozzolans and a sufficient amount of calcium hydroxide, or a compound that produces calcium hydroxide in the presence of water such that the calcium hydroxide reacts with the one or more pozzolans to form a cementitious material.

In another disclosed embodiment, the cementitious material for use with the present invention comprises one or more hydraulic cements and one or more pozzolans, wherein the one or more hydraulic cements are in an amount sufficient to produces calcium hydroxide in the presence of water sufficient to react with the one or more pozzolans to form a supplementary cementitious material.

In another disclosed embodiment, the cementitious material for use with the present invention comprises one or more hydraulic cements and volcanic ash, wherein the one or more hydraulic cements are in an amount sufficient to produces calcium hydroxide in the presence of water sufficient to react with the volcanic ash to form a supplementary cementitious material.

In another disclosed embodiment, the cementitious material for use with the present invention comprises one or more hydraulic cements and rice husk ash, wherein the one or more hydraulic cements are in an amount sufficient to produces calcium hydroxide in the presence of water sufficient to react with the rice husk ash to form a supplementary cementitious material.

In another disclosed embodiment, the cementitious material for use with the present invention comprises one or more hydraulic cements and metakaolin, wherein the one or more hydraulic cements are in an amount sufficient to produces calcium hydroxide in the presence of water sufficient to react with the metakaolin to form a supplementary cementitious material.

In another disclosed embodiment, the cementitious material for use with the present invention comprises one or more hydraulic cements and silica fume, wherein the one or more hydraulic cements are in an amount sufficient to produces calcium hydroxide in the presence of water sufficient to react with the silica fume to form a supplementary cementitious material.

In another disclosed embodiment, the cementitious material for use with the present invention comprises portland cement and one or more pozzolans, wherein the portland cement is in an amount sufficient to produces calcium hydroxide in the presence of water sufficient to react with the one or more pozzolans to form a supplementary cementitious material.

In another disclosed embodiment, the cementitious material for use with the present invention comprises portland cement, slag cement and one or more pozzolans, wherein the portland cement and slag cement are in an amounts sufficient to produce calcium hydroxide in the presence of water sufficient to react with the one or more pozzolans to form a supplementary cementitious material.

The portland cement, slag cement and/or one or more pozzolans can be combined physically or mechanically in any suitable manner and is not a critical feature. For example, the portland cement, slag cement and/or one or more pozzolans can be mixed together to form a uniform blend of dry material prior to combining with the aggregate and water. Or, the portland cement, slag cement and/or one or more pozzolans can be added separately to a conventional concrete mixer, such as the transit mixer of a ready-mix concrete truck, at a batch plant. The water and aggregate can be added to the mixer before the cementitious material, however, it is preferable to add the cementitious material first, the water second, the aggregate third and any makeup water last.

Chemical admixtures can also be used with the preferred concrete for use with the present invention. Such chemical admixtures include, but are not limited to, accelerators, retarders, air entrainments, plasticizers, superplasticizers, coloring pigments, corrosion inhibitors, bonding agents and pumping aid. Although chemical admixtures can be used with the concrete of the present invention, it is believed that chemical admixtures are not necessary.

Mineral admixtures can also be used with the concrete of the present invention. Although mineral admixtures can be used with the concrete of the present invention, it is believed that mineral admixtures are not necessary. However, in some embodiments it may be desirable to include a water reducing admixture, such as a superplasticizer.

The concrete mix cured in an insulated concrete slip form in accordance with the present invention, produces concrete with superior early strength and ultimate strength properties compared to the same concrete mix cured in a conventional form without the use of any chemical additives to accelerate or otherwise alter the curing process. Thus, in one disclosed embodiment of the present invention, the preferred cementitious material comprises at least two of portland cement, slag cement and one or more pozzolans in amounts such that at three to seven days the concrete mix cured in accordance with the present invention has a compressive strength at least 50% greater than the same concrete mix would have after the same amount of time in a conventional (i.e., non-insulated) concrete form under ambient conditions. In another disclosed embodiment, the preferred concrete mix cured in accordance with the present invention has a compressive strength at least 25%, at least 50%, at least 75%, at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement, slag cement and one or more pozzolans in amounts such that at three to seven days the concrete mix cured in accordance with the present invention has a compressive strength at least 25% or at least 50% greater than the same concrete mix would have after three days in a conventional concrete form under ambient conditions. In another disclosed embodiment the preferred concrete mix cured in accordance with the present invention has a compressive strength at least 25%, at least 50%, at least 75%, at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement and slag cement in amounts such that at three to seven days the concrete mix cured in accordance with the present invention has a compressive strength at least 25% or at least 50% greater than the same concrete mix would have after the same time period in a conventional concrete form under ambient conditions. In another disclosed embodiment, the preferred concrete mix cured in accordance with the present invention has a compressive strength at least 100%, at least 150%, at least 200%, at least 250% or at least 300% greater than the same concrete mix would have after the same amount of time in a conventional (i.e., non-insulated) concrete form under the same conditions.

In another disclosed embodiment of the present invention, the preferred cementitious material comprises portland cement and one or more pozzolans in amounts such that at three to seven days the concrete mix cured in accordance with the present invention has a compressive strength at least 25% or at least 50% greater than the same concrete mix would have after the same time period in a conventional concrete form under ambient conditions. In another disclosed embodiment the preferred concrete mix cured in accordance with the present invention has a compressive strength at least 100%, at least 150%, at least 200%, at least 250% or at least 300% greater than the same concrete mix would have after the same amount of time in a conventional (i.e., non-insulated) concrete form under the same conditions.

The present invention can also be used to accelerate the curing of high performance concrete mixes and ultra high performance concrete mixes. High performance concrete has a compressive strength of approximately 10,000 psi to approximately 20,000 psi. Ultra high performance concrete has a compressive strength greater than approximately 20,000 psi.

The present invention can be used to form any type of concrete structure or object, either cast in place or precast. The present invention can be used to form footings, retaining walls, exterior walls of buildings, load-bearing interior walls, columns, piers, parking deck slabs, elevated slabs, roofs, bridges, or any other structures or objects. Also, the present invention can be used to form precast structures or objects, tilt-up concrete panels for exterior walls of buildings, load-bearing interior walls, columns, piers, parking deck slabs, elevated slab, roofs and other similar precast structures and objects. Additionally, the present invention can be used to form precast structures including, but not limited to, walls, floors, decking, beams, railings, pipes, vaults, underwater infrastructure, modular paving products, retaining walls, storm water management products, culverts, bridge systems, railroad ties, traffic barriers, tunnel segments, light pole beams, light pole bases, transformer pads, and the like.

It should be understood, of course, that the foregoing relates only to certain disclosed embodiments of the present invention and that numerous modifications or alterations may be made therein without departing from the spirit and scope of the invention.

What is claimed is:
1. A concrete forming system comprising:
a first movable concrete form spaced from a second movable concrete form thereby defining a concrete receiving space therebetween;
each of the first and second movable concrete forms comprising a sandwich panel attached to a reinforcing frame structure;

each sandwich panel comprising;
   a first rigid panel member;
   a second rigid panel member;
   an intermediate layer of foam insulating material disposed between the first and second rigid panel members; and
an insulating blanket adjacent each of the first and second movable concrete forms.

2. The concrete forming system of claim 1, wherein the sandwich panel defines a plane and wherein the insulating blanket is substantially in the plane defined by the sandwich panel.

3. The concrete forming system of claim 1, wherein the intermediate layer of foam insulating material has an R-value of greater than 1.5.

4. The concrete forming system of claim 1, wherein the intermediate layer of foam insulating material has an R-value of greater than 4.

5. The concrete forming system of claim 1, wherein the intermediate layer of foam insulating material has an R-value of greater than 8.

6. The concrete forming system of claim 1, wherein the insulating blanket has an R-value of greater than 1.5.

7. The concrete forming system of claim 1, wherein the insulating blanket has an R-value of greater than 4.

8. The concrete forming system of claim 1, wherein the insulating blanket has an R-value of greater than 8.

9. The concrete forming system of claim 1 further comprising an electric heating element in thermal contact with the first rigid panel member.

10. The concrete forming system of claim 1 further comprising an electric heating element in the insulating blanket.

11. The concrete forming system of claim 1 wherein the reinforcing frame structure comprises a plurality of bracing members oriented transversely with respect to the sandwich panel, the frame providing sufficient reinforcement to the sandwich panel such that the sandwich panel withstands the hydrostatic pressure of plastic concrete contacting the sandwich panel.

12. A concrete forming system comprising:
   a first movable concrete form spaced from a second movable concrete form thereby defining a concrete receiving space therebetween;
   each of the first and second movable concrete forms comprising a sandwich panel attached to a reinforcing frame structure;
   each sandwich panel comprising;
      a first rigid panel member;
      a second rigid panel member;
      an intermediate layer of foam insulating material disposed between the first and second rigid panel members; and
   a layer of insulating material adjacent each of the first and second movable concrete forms.

13. The concrete forming system of claim 12, wherein the intermediate layer of foam insulating material has an R-value of greater than 1.5.

14. The concrete forming system of claim 12, wherein the intermediate layer of foam insulating material has an R-value of greater than 4.

15. The concrete forming system of claim 12, wherein the intermediate layer of foam insulating material has an R-value of greater than 8.

16. The concrete forming system of claim 12, wherein the layer of insulating material has an R-value of greater than 1.5.

17. The concrete forming system of claim 12, wherein the layer of insulating material has an R-value of greater than 4.

18. The concrete forming system of claim 12, wherein the layer of insulating material has an R-value of greater than 8.

* * * * *